(12) United States Patent
Sekita et al.

(10) Patent No.: US 6,498,687 B1
(45) Date of Patent: Dec. 24, 2002

(54) ZOOM LENS AND OPTICAL APPARATUS HAVING THE SAME

(75) Inventors: Makoto Sekita, Yokohama (JP); Hiroyuki Hamano, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/678,251

(22) Filed: Oct. 3, 2000

(30) Foreign Application Priority Data

| Oct. 6, 1999 | (JP) | 11-285335 |
| Jan. 26, 2000 | (JP) | 2000-016798 |
| Apr. 14, 2000 | (JP) | 2000-113181 |
| Apr. 14, 2000 | (JP) | 2000-113182 |
| May 16, 2000 | (JP) | 2000-143806 |
| Jul. 19, 2000 | (JP) | 2000-218644 |

(51) Int. Cl.$^7$ ................................ G02B 15/14
(52) U.S. Cl. .................. 359/680; 359/687; 359/690
(58) Field of Search ........................ 359/680, 681, 359/682, 691, 684, 686, 689, 690

(56) References Cited

U.S. PATENT DOCUMENTS

| 4,647,160 A | 3/1987 | Ikemori |
| 4,810,072 A | 3/1989 | Takahashi |
| 4,828,372 A | 5/1989 | Betensky et al. |
| 4,832,471 A | 5/1989 | Hamano .................... 359/683 |
| 4,838,666 A | 6/1989 | Shiraishi |
| 4,859,042 A | 8/1989 | Tanaka ...................... 359/684 |
| 4,934,796 A | 6/1990 | Sugiura et al. ............ 359/683 |
| 4,988,174 A | 1/1991 | Horiuchi et al. ........... 359/683 |
| 4,991,942 A | 2/1991 | Fujibayashi et al. ....... 359/690 |
| 4,998,809 A | 3/1991 | Tsuji et al. ................. 359/557 |
| 4,999,077 A | 3/1991 | Aoki et al. |
| 5,009,492 A | 4/1991 | Hamano .................... 359/684 |
| 5,050,972 A | 9/1991 | Mukaiya et al. ........... 359/683 |
| 5,103,343 A | 4/1992 | Sekita ....................... 359/684 |
| 5,132,848 A | 7/1992 | Nishio et al. .............. 359/686 |
| 5,134,524 A | 7/1992 | Hamano et al. ........... 359/687 |
| 5,138,492 A | 8/1992 | Hamano et al. ........... 359/684 |
| 5,189,558 A | 2/1993 | Ishii et al. ................. 359/687 |
| 5,253,113 A | 10/1993 | Sekita et al. ............... 359/680 |
| 5,262,897 A | 11/1993 | Kawamura |
| 5,270,863 A | 12/1993 | Uzawa |
| 5,299,064 A | 3/1994 | Hamano et al. ........... 359/684 |
| 5,424,869 A | 6/1995 | Nanjo ....................... 359/687 |

(List continued on next page.)

FOREIGN PATENT DOCUMENTS

| JP | 62-24213 | 2/1987 |
| JP | 62-206516 | 9/1987 |
| JP | 62-215225 | 9/1987 |
| JP | 62-247317 | 10/1987 |
| JP | 63-135913 | 6/1988 |
| JP | 3-288113 | 12/1991 |
| JP | 4-43311 | 2/1992 |
| JP | 5-72472 | 3/1993 |
| JP | 6-34882 | 2/1994 |
| JP | 6-40170 | 5/1994 |
| JP | 7-3507 | 1/1995 |
| JP | 7-261083 | 10/1995 |
| JP | 9-21950 | 1/1997 |
| JP | 10-62687 | 3/1998 |

*Primary Examiner*—Georgia Epps
*Assistant Examiner*—David N. Spector
(74) *Attorney, Agent, or Firm*—Fitzpatrick, Cella, Harper & Scinto

(57) ABSTRACT

A zoom lens includes a lens unit A of negative refractive power, and a lens unit B of positive refractive power disposed on an image side of the lens unit A. The lens unit B includes two cemented lens components and consists of not more than five lens elements. Then, the separation between the lens unit A and the lens unit B varies during zooming.

29 Claims, 49 Drawing Sheets

U.S. PATENT DOCUMENTS

| | | | |
|---|---|---|---|
| 5,430,576 A | 7/1995 | Hamano | 359/684 |
| 5,521,758 A | 5/1996 | Hamano | 359/557 |
| 5,546,230 A | 8/1996 | Sato et al. | 359/684 |
| 5,572,364 A | 11/1996 | Toide et al. | 359/649 |
| 5,600,490 A | 2/1997 | Sugawara et al. | 359/690 |
| 5,638,216 A | 6/1997 | Horiuchi et al. | 359/683 |
| 5,677,792 A | 10/1997 | Hamano | 359/557 |
| 5,682,269 A | 10/1997 | Kimura et al. | 359/770 |
| 5,751,496 A | 5/1998 | Hamano | 359/677 |
| 5,771,123 A | 6/1998 | Hamano | 359/557 |
| 5,774,275 A | 6/1998 | Hamano | 359/687 |
| 5,818,646 A | 10/1998 | Hamano | 359/684 |
| 5,905,530 A | 5/1999 | Yokota et al. | 348/240 |
| 5,933,283 A | 8/1999 | Hamano | 359/687 |
| 5,963,378 A | 10/1999 | Tochigi et al. | 359/687 |
| 5,973,858 A | 10/1999 | Sekita | 359/729 |
| 5,991,093 A * | 11/1999 | Murata et al. | 359/691 |
| 5,995,287 A | 11/1999 | Sekita | 359/599 |
| 6,016,228 A | 1/2000 | Uzawa | 359/687 |
| 6,021,004 A | 2/2000 | Sekita et al. | 359/676 |
| 6,124,986 A | 9/2000 | Sekita et al. | 359/691 |
| 6,166,866 A | 12/2000 | Kimura et al. | 359/729 |

* cited by examiner

FIG.2A  FIG.2B  FIG.2C  FIG.2D
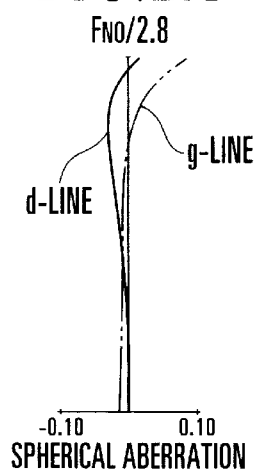
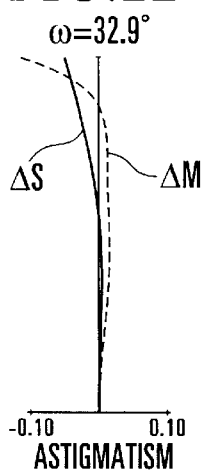
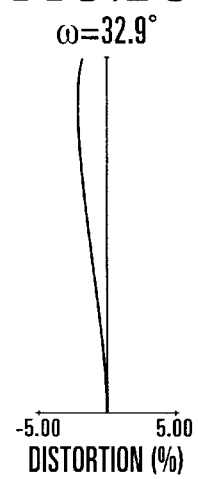
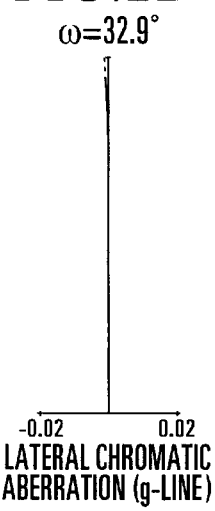
FIG.3A  FIG.3B  FIG.3C  FIG.3D
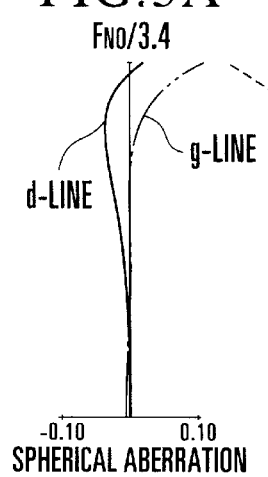
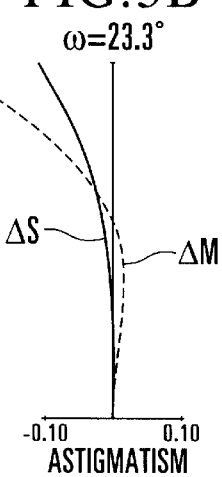
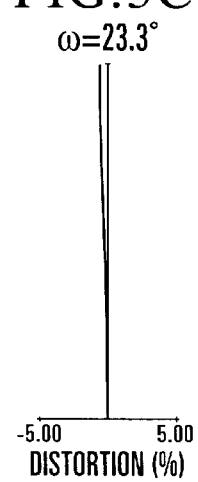
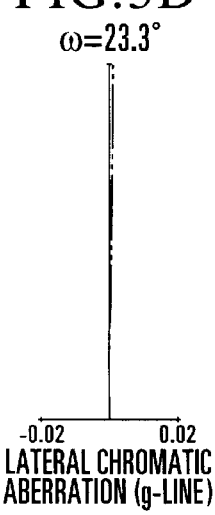
FIG.4A  FIG.4B  FIG.4C  FIG.4D
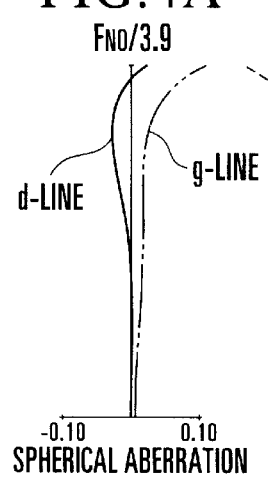
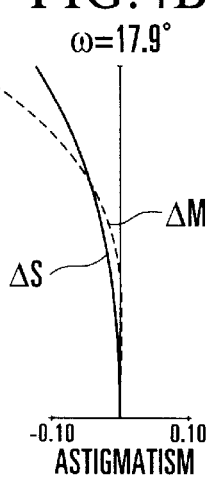
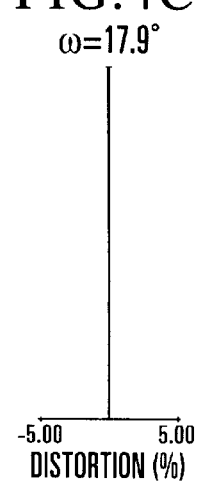
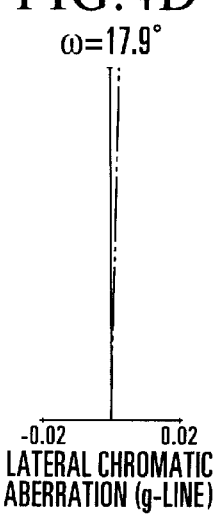

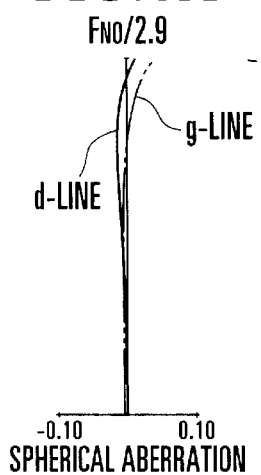
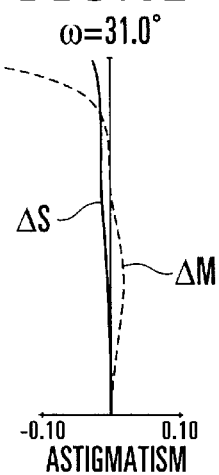
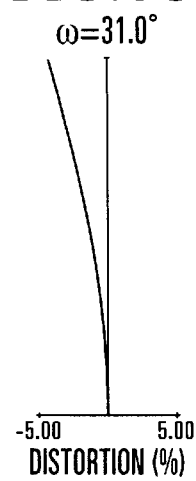
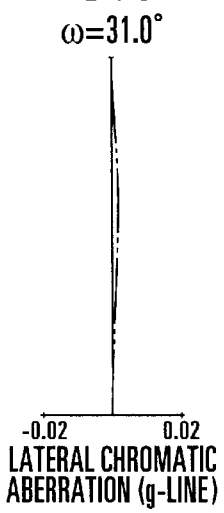
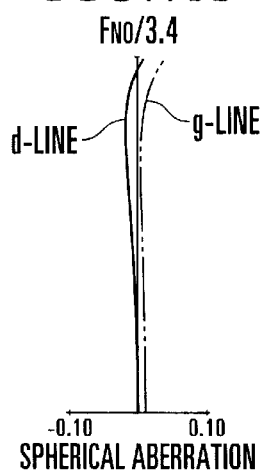
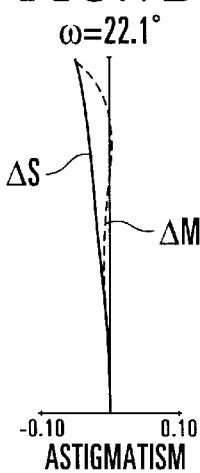
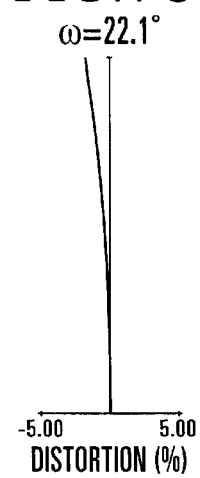
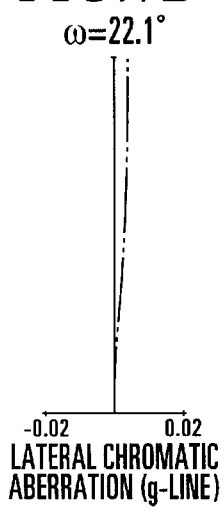
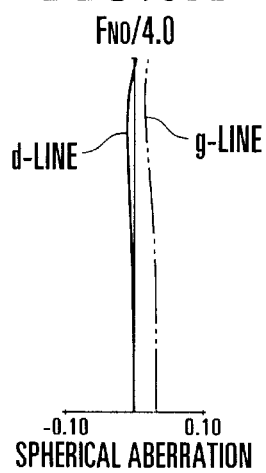
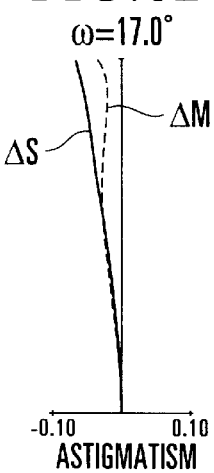
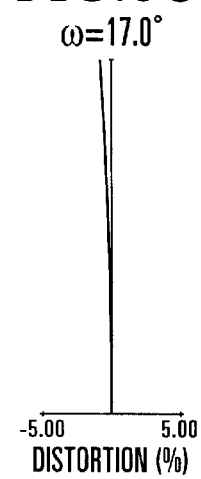
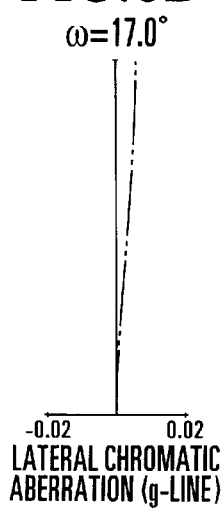

F$_{NO}$/2.59
SPHERICAL ABERRATION

ω=31.0°
ASTIGMATISM

ω=31.0°
DISTORTION (%)

ω=31.0°
LATERAL CHROMATIC ABERRATION (g-LINE)

F$_{NO}$/2.95
SPHERICAL ABERRATION

ω=24.8°
ASTIGMATISM

ω=24.8°
DISTORTION (%)

ω=24.8°
LATERAL CHROMATIC ABERRATION (g-LINE)

F$_{NO}$/4.43
SPHERICAL ABERRATION

ω=13.5°
ASTIGMATISM

ω=13.5°
DISTORTION (%)

ω=13.5°
LATERAL CHROMATIC ABERRATION (g-LINE)

F_{NO}/2.80

ω=33.5°

ω=33.5°

ω=33.5°

F_{NO}/3.39

ω=21.9°

ω=21.9°

ω=21.9°

F_{NO}/4.01

ω=18.0°

ω=18.0°

ω=18.0°

F$_{NO}$/2.82
SPHERICAL ABERRATION

ω=30.8°
ASTIGMATISM

ω=30.8°
DISTORTION (%)

ω=30.8°
LATERAL CHROMATIC ABERRATION (g-LINE)

F$_{NO}$/3.27
SPHERICAL ABERRATION

ω=23.7°
ASTIGMATISM

ω=23.7°
DISTORTION (%)

ω=23.7°
LATERAL CHROMATIC ABERRATION (g-LINE)

F$_{NO}$/4.01
SPHERICAL ABERRATION

ω=17.2°
ASTIGMATISM

ω=17.2°
DISTORTION (%)

ω=17.2°
LATERAL CHROMATIC ABERRATION (g-LINE)

FNO/2.61

-0.10   0.10
SPHERICAL ABERRATION

ω=33.4°

-0.10   0.10
ASTIGMATISM

ω=33.4°

-5.00   5.00
DISTORTION (%)

ω=33.4°

-0.02   0.02
LATERAL CHROMATIC
ABERRATION (g-LINE)

FNO/2.83

-0.10   0.10
SPHERICAL ABERRATION

ω=22.0°

-0.10   0.10
ASTIGMATISM

ω=22.0°

-5.00   5.00
DISTORTION (%)

ω=22.0°

-0.02   0.02
LATERAL CHROMATIC
ABERRATION (g-LINE)

FNO/4.01

-0.10   0.10
SPHERICAL ABERRATION

ω=14.8°

-0.10   0.10
ASTIGMATISM

ω=14.8°

-5.00   5.00
DISTORTION (%)

ω=14.8°

-0.02   0.02
LATERAL CHROMATIC
ABERRATION (g-LINE)

FNo/2.87

-0.10　0.10
SPHERICAL ABERRATION

ω=32.5°

-0.10　0.10
ASTIGMATISM

ω=32.5°

-5.00　5.00
DISTORTION (%)

ω=32.5°

-0.02　0.02
LATERAL CHROMATIC
ABERRATION (g-LINE)

FNo/3.59

-0.10　0.10
SPHERICAL ABERRATION

ω=22.7°

-0.10　0.10
ASTIGMATISM

ω=22.7°

-5.00　5.00
DISTORTION (%)

ω=22.7°

-0.02　0.02
LATERAL CHROMATIC
ABERRATION (g-LINE)

FNo/3.99

-0.10　0.10
SPHERICAL ABERRATION

ω=17.8°

-0.10　0.10
ASTIGMATISM

ω=17.8°

-5.00　5.00
DISTORTION (%)

ω=17.8°

-0.02　0.02
LATERAL CHROMATIC
ABERRATION (g-LINE)

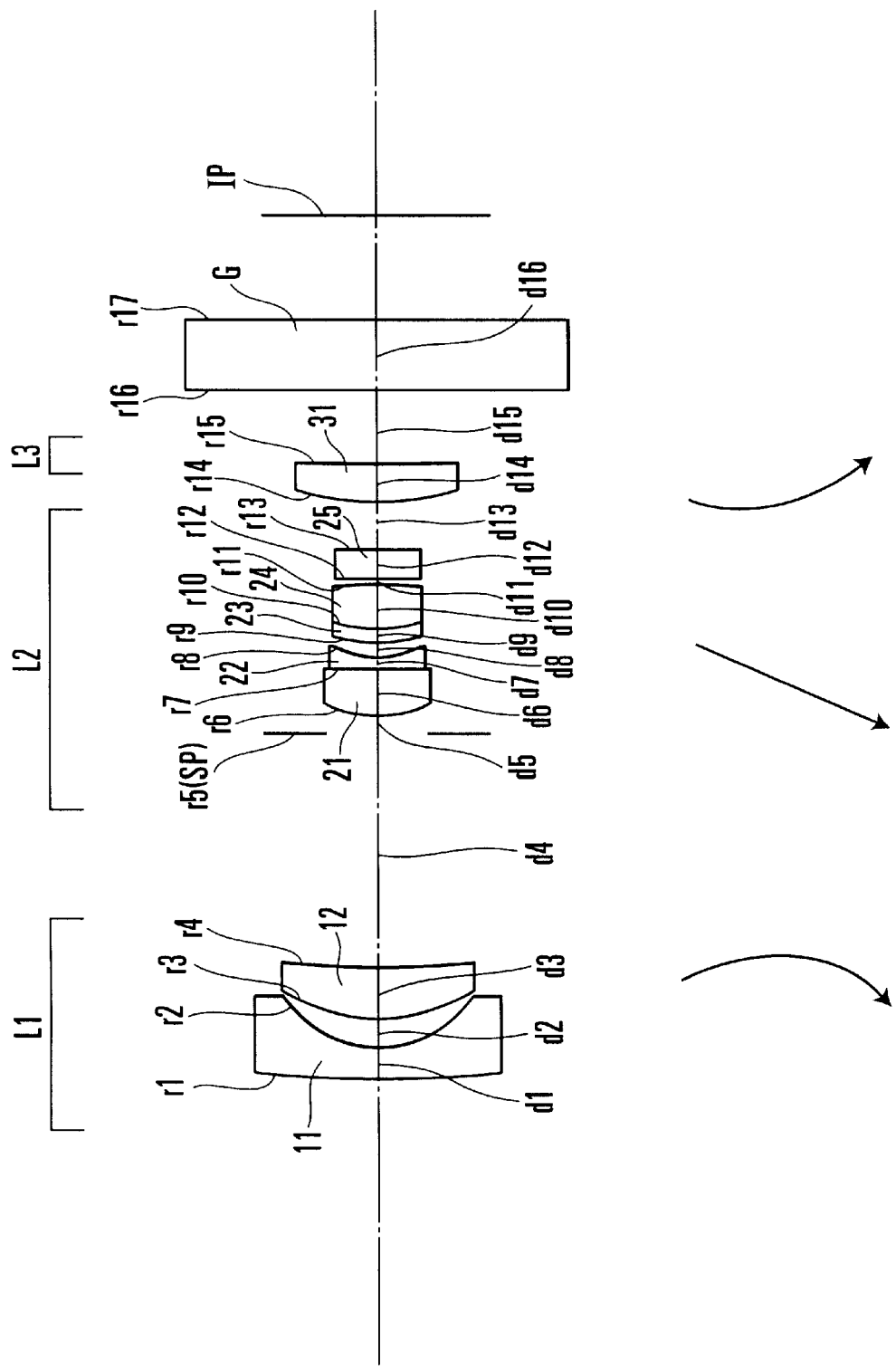

FNO/2.8

-0.10  0.10
SPHERICAL ABERRATION

ω=30.8°

-0.10  0.10
ASTIGMATISM

ω=30.8°

-5.00  5.00
DISTORTION (%)

ω=30.8°

-0.02  0.02
LATERAL CHROMATIC ABERRATION (g-LINE)

FNO/3.3

-0.10  0.10
SPHERICAL ABERRATION

ω=21.3°

-0.10  0.10
ASTIGMATISM

ω=21.3°

-5.00  5.00
DISTORTION (%)

ω=21.3°

-0.02  0.02
LATERAL CHROMATIC ABERRATION (g-LINE)

FNO/4.0

-0.10  0.10
SPHERICAL ABERRATION

ω=16.6°

-0.10  0.10
ASTIGMATISM

ω=16.6°

-5.00  5.00
DISTORTION (%)

ω=16.6°

-0.02  0.02
LATERAL CHROMATIC ABERRATION (g-LINE)

FIG.34A
$F_{NO}/2.7$
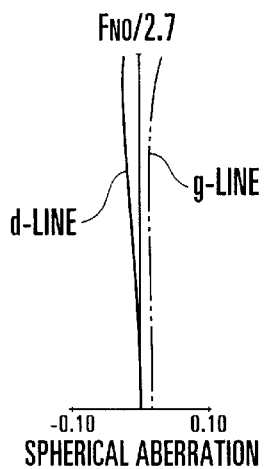
-0.10　0.10
SPHERICAL ABERRATION

FIG.34B
$\omega=30.8°$
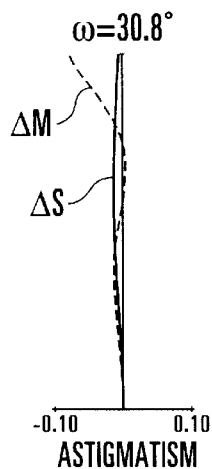
-0.10　0.10
ASTIGMATISM

FIG.34C
$\omega=30.8°$
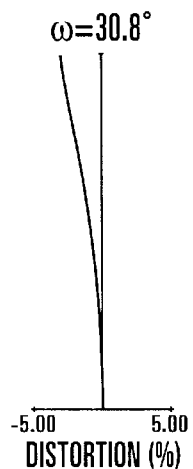
-5.00　5.00
DISTORTION (%)

FIG.34D
$\omega=30.8°$
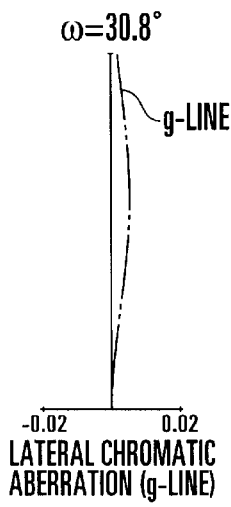
-0.02　0.02
LATERAL CHROMATIC
ABERRATION (g-LINE)

FIG.35A
$F_{NO}/3.6$
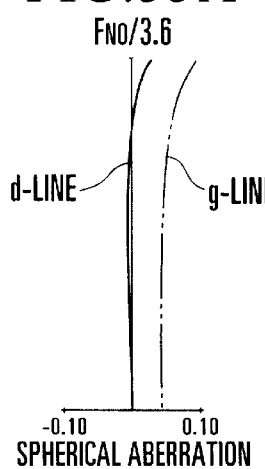
-0.10　0.10
SPHERICAL ABERRATION

FIG.35B
$\omega=17.2°$
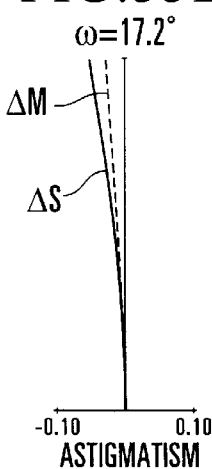
-0.10　0.10
ASTIGMATISM

FIG.35C
$\omega=17.2°$
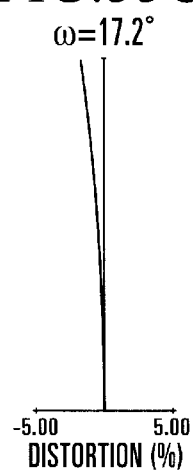
-5.00　5.00
DISTORTION (%)

FIG.35D
$\omega=17.2°$
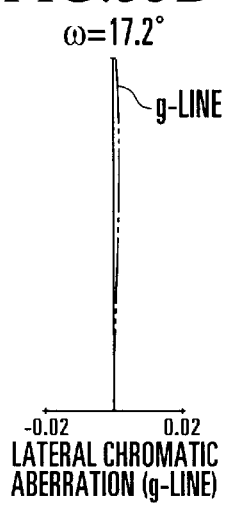
-0.02　0.02
LATERAL CHROMATIC
ABERRATION (g-LINE)

FIG.36A
$F_{NO}/4.8$
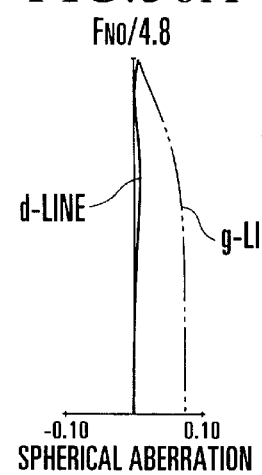
-0.10　0.10
SPHERICAL ABERRATION

FIG.36B
$\omega=11.4°$
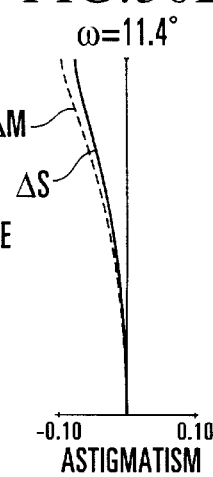
-0.10　0.10
ASTIGMATISM

FIG.36C
$\omega=11.4°$
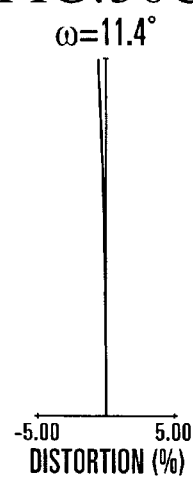
-5.00　5.00
DISTORTION (%)

FIG.36D
$\omega=11.4°$
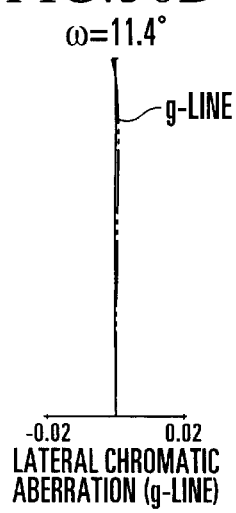
-0.02　0.02
LATERAL CHROMATIC
ABERRATION (g-LINE)

FIG.38A
FNO/2.6
d-LINE
g-LINE
-0.10  0.10
SPHERICAL ABERRATION
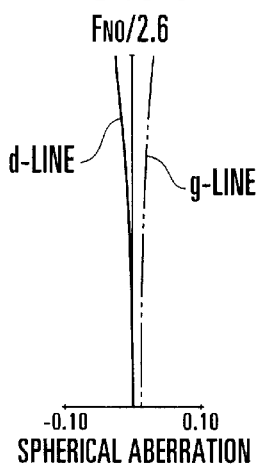

FIG.38B
ω=33.2°
ΔS
ΔM
-0.10  0.10
ASTIGMATISM
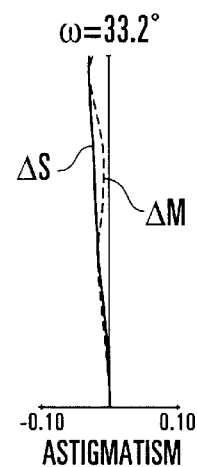

FIG.38C
ω=33.2°
-5.00  5.00
DISTORTION (%)
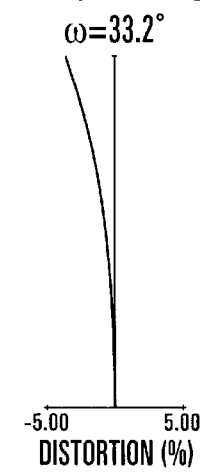

FIG.38D
ω=33.2°
g-LINE
-0.02  0.02
LATERAL CHROMATIC
ABERRATION (g-LINE)
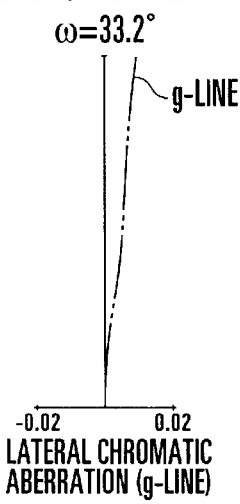

FIG.39A
FNO/3.7
d-LINE
g-LINE
-0.10  0.10
SPHERICAL ABERRATION
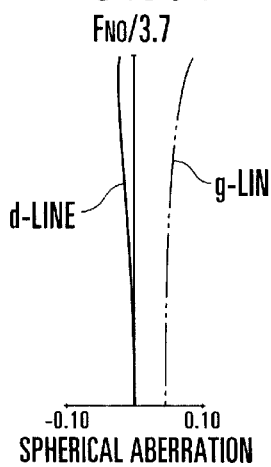

FIG.39B
ω=18.5°
ΔS
ΔM
-0.10  0.10
ASTIGMATISM
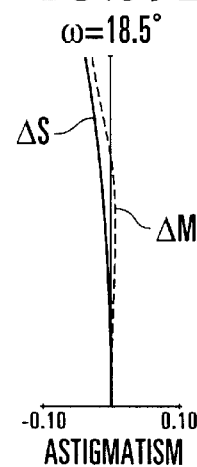

FIG.39C
ω=18.5°
-5.00  5.00
DISTORTION (%)
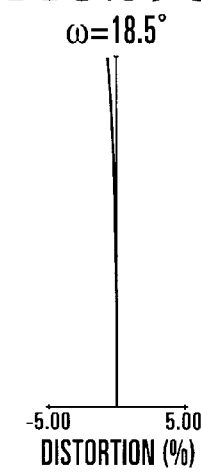

FIG.39D
ω=18.5°
g-LINE
-0.02  0.02
LATERAL CHROMATIC
ABERRATION (g-LINE)
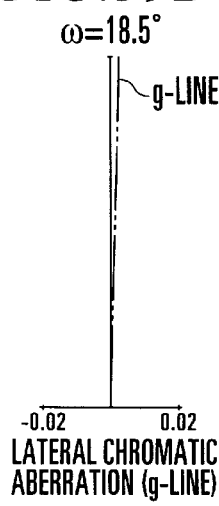

FIG.40A
FNO/2.7
d-LINE
g-LINE
-0.10  0.10
SPHERICAL ABERRATION
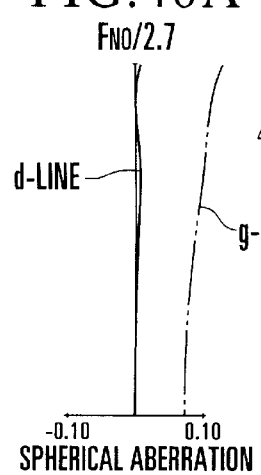

FIG.40B
ω=30.8°
ΔM  ΔS
-0.10  0.10
ASTIGMATISM
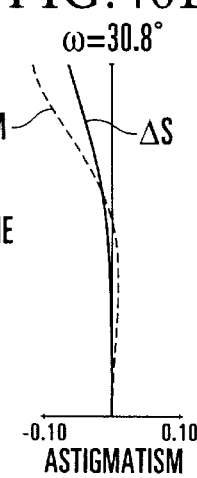

FIG.40C
ω=30.8°
-5.00  5.00
DISTORTION (%)
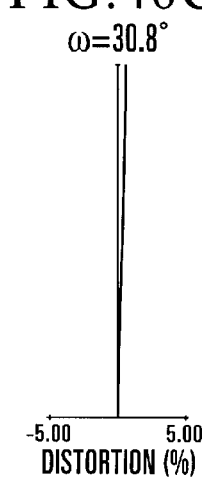

FIG.40D
ω=30.8°
g-LINE
-0.02  0.02
LATERAL CHROMATIC
ABERRATION (g-LINE)
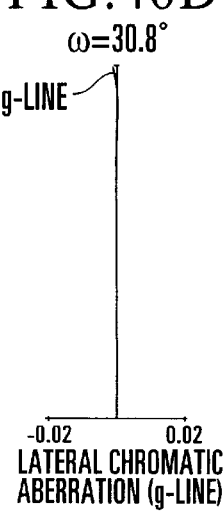

F_NO/2.7

SPHERICAL ABERRATION

ω=30.2°

ASTIGMATISM

ω=30.2°

DISTORTION (%)

ω=30.2°

LATERAL CHROMATIC ABERRATION (g-LINE)

F_NO/3.7

SPHERICAL ABERRATION

ω=16.6°

ASTIGMATISM

ω=16.6°

DISTORTION (%)

ω=16.6°

LATERAL CHROMATIC ABERRATION (g-LINE)

F_NO/4.8

SPHERICAL ABERRATION

ω=11.2°

ASTIGMATISM

ω=11.2°

DISTORTION (%)

ω=11.2°

LATERAL CHROMATIC ABERRATION (g-LINE)

FNO/2.87
d-LINE, g-LINE
-0.014    0.014
SPHERICAL ABERRATION

ω=29.7°
ΔM, ΔS
-0.014    0.014
ASTIGMATISM

ω=29.7°
-5.00    5.00
DISTORTION (%)

ω=29.7°
-0.0028    0.0028
LATERAL CHROMATIC ABERRATION (g-LINE)

FNO/3.84
d-LINE, g-LINE
-0.014    0.014
SPHERICAL ABERRATION

ω=16.8°
ΔS, ΔM
-0.014    0.014
ASTIGMATISM

ω=16.8°
-5.00    5.00
DISTORTION (%)

ω=16.8°
-0.0028    0.0028
LATERAL CHROMATIC ABERRATION (g-LINE)

FNO/4.90
g-LINE, d-LINE
-0.014    0.014
SPHERICAL ABERRATION

ω=11.4°
ΔM, ΔS
-0.014    0.014
ASTIGMATISM

ω=11.4°
-5.00    5.00
DISTORTION (%)

ω=11.4°
-0.0028    0.0028
LATERAL CHROMATIC ABERRATION (g-LINE)

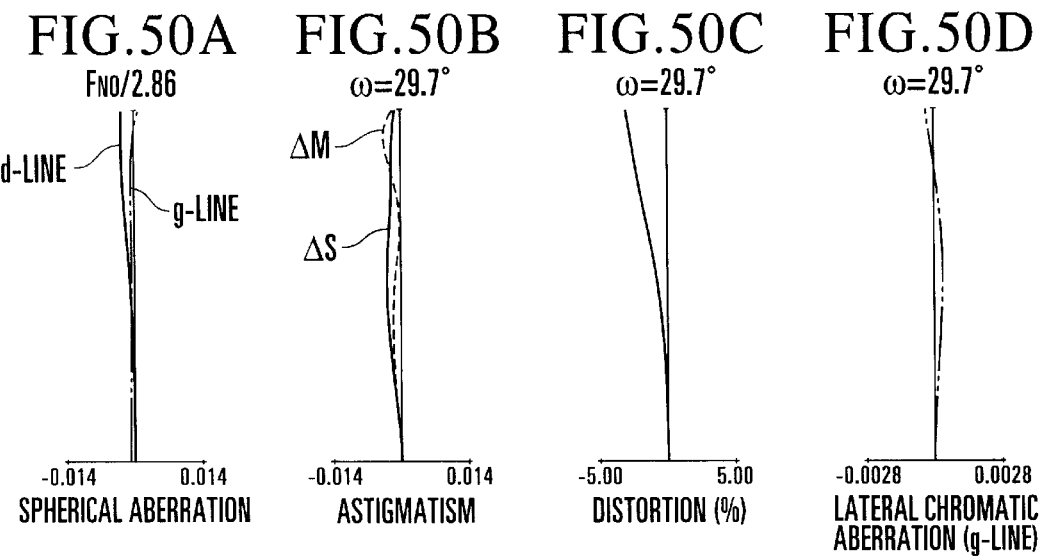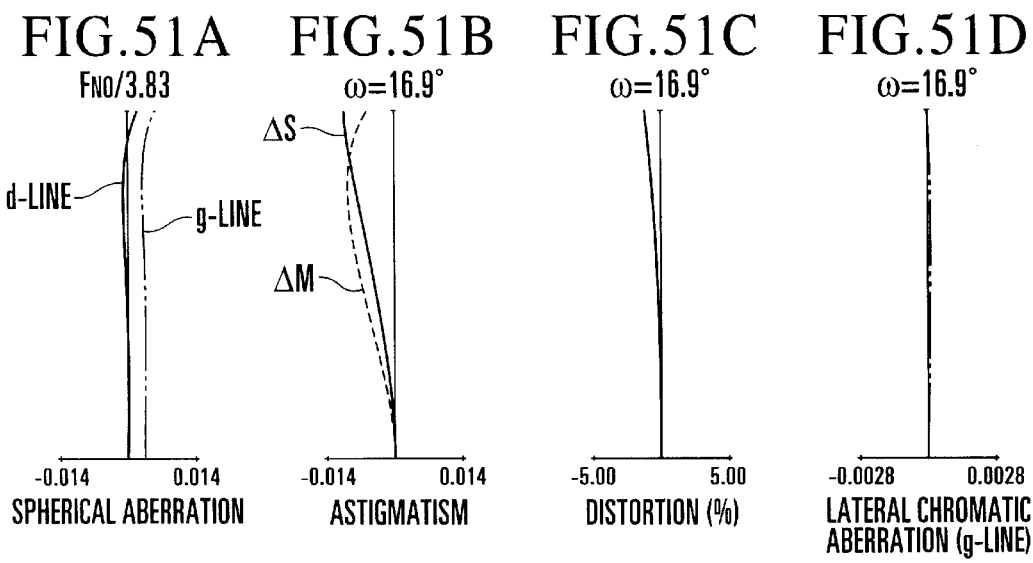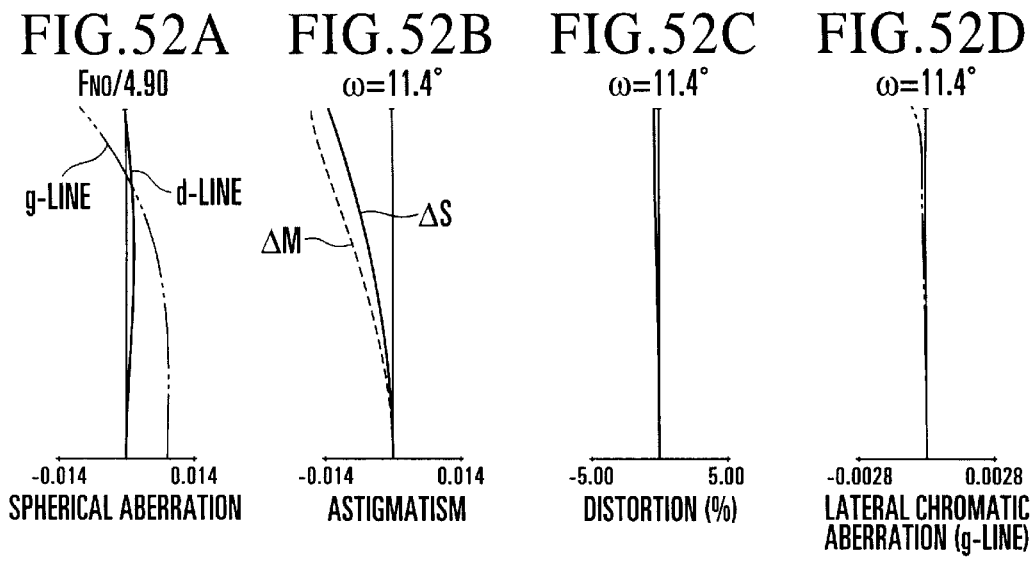

FNo/2.86

-0.014  0.014
SPHERICAL ABERRATION

ω=29.0°

-0.014  0.014
ASTIGMATISM

ω=29.0°

-5.00  5.00
DISTORTION (%)

ω=29.0°

-0.0028  0.0028
LATERAL CHROMATIC
ABERRATION (g-LINE)

FNo/3.83

-0.014  0.014
SPHERICAL ABERRATION

ω=16.6°

-0.014  0.014
ASTIGMATISM

ω=16.6°

-5.00  5.00
DISTORTION (%)

ω=16.6°

-0.0028  0.0028
LATERAL CHROMATIC
ABERRATION (g-LINE)

FNo/4.90

-0.014  0.014
SPHERICAL ABERRATION

ω=11.1°

-0.014  0.014
ASTIGMATISM

ω=11.1°

-5.00  5.00
DISTORTION (%)

ω=11.1°

-0.0028  0.0028
LATERAL CHROMATIC
ABERRATION (g-LINE)

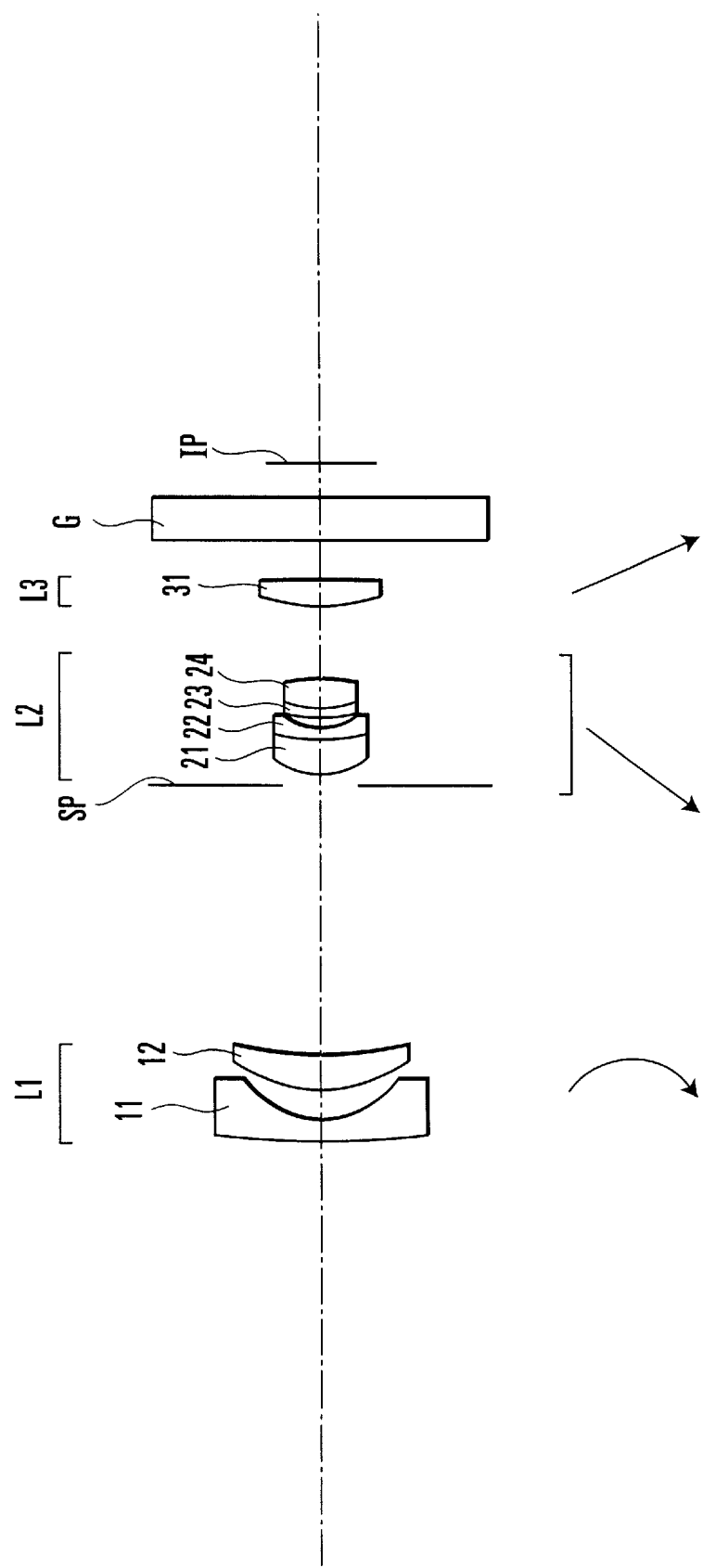

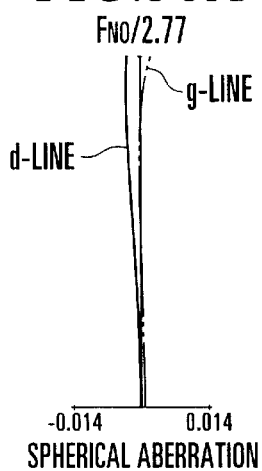
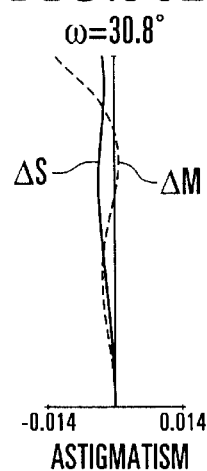
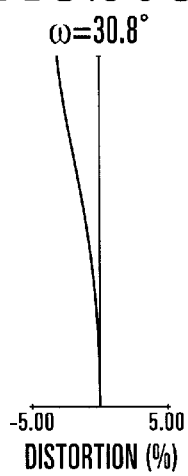
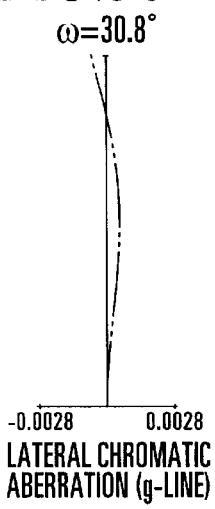
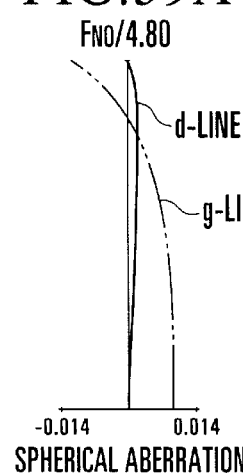
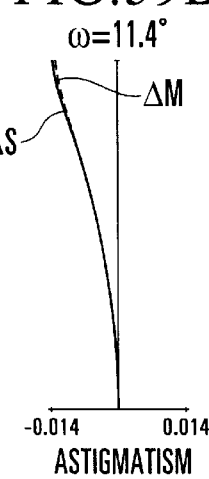
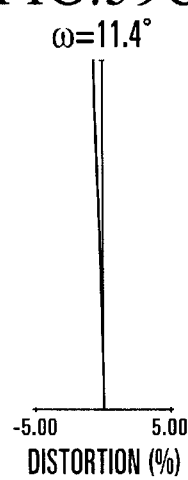
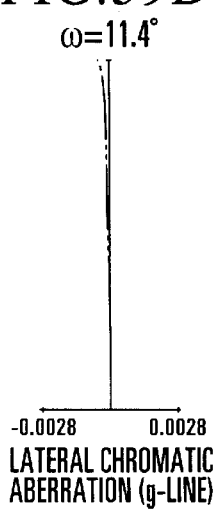
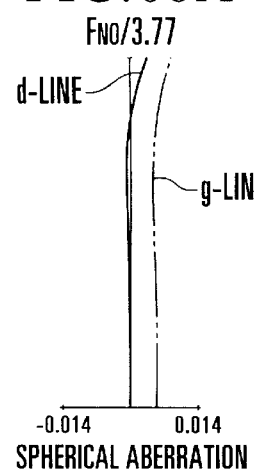
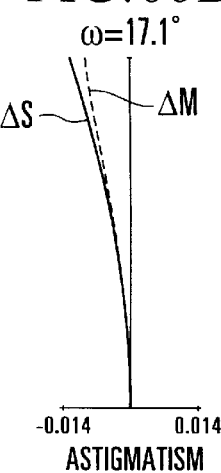
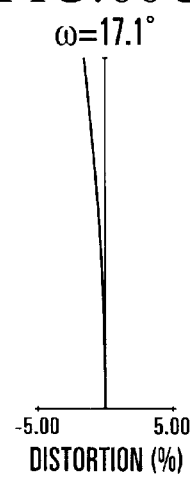
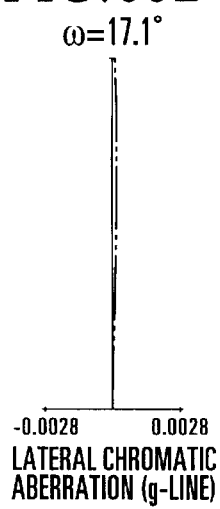

FNO/2.5

-0.10　　0.10
SPHERICAL ABERRATION d-LINE, g-LINE

ω=25.7°

-0.10　　0.10
ASTIGMATISM

ΔS, ΔM

ω=25.7°

-5.00　　5.00
DISTORTION (%)

ω=25.7°

-0.02　　0.02
LATERAL CHROMATIC ABERRATION (g-LINE)

FNO/2.8

-0.10　　0.10
SPHERICAL ABERRATION d-LINE, g-LINE

ω=16.9°

-0.10　　0.10
ASTIGMATISM

ΔM, ΔS

ω=16.9°

-5.00　　5.00
DISTORTION (%)

ω=16.9°

-0.02　　0.02
LATERAL CHROMATIC ABERRATION (g-LINE)

FNO/2.7

-0.10　　0.10
SPHERICAL ABERRATION d-LINE, g-LINE

ω=9.7°

-0.10　　0.10
ASTIGMATISM

ΔS, ΔM

ω=9.7°

-5.00　　5.00
DISTORTION (%)

ω=9.7°

-0.02　　0.02
LATERAL CHROMATIC ABERRATION (g-LINE)

FNO/2.8
d-LINE, g-LINE

-0.10  0.10
SPHERICAL ABERRATION

ω=26.1°
ΔS, ΔM

-0.10  0.10
ASTIGMATISM

ω=26.1°

-5.00  5.00
DISTORTION (%)

ω=26.1°

-0.02  0.02
LATERAL CHROMATIC ABERRATION (g-LINE)

FNO/3.1
d-LINE, g-LINE

-0.10  0.10
SPHERICAL ABERRATION

ω=15.5°
ΔS, ΔM

-0.10  0.10
ASTIGMATISM

ω=15.5°

-5.00  5.00
DISTORTION (%)

ω=15.5°

-0.02  0.02
LATERAL CHROMATIC ABERRATION (g-LINE)

FNO/3.0
d-LINE, g-LINE

-0.10  0.10
SPHERICAL ABERRATION

ω=9.7°
ΔS, ΔM

-0.10  0.10
ASTIGMATISM

ω=9.7°

-5.00  5.00
DISTORTION (%)

ω=9.7°

-0.02  0.02
LATERAL CHROMATIC ABERRATION (g-LINE)

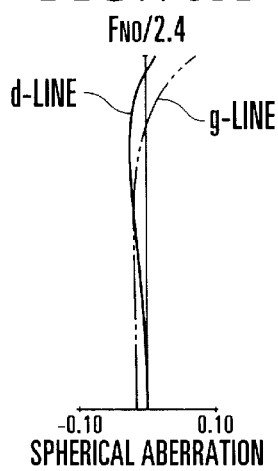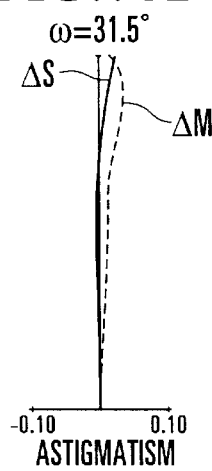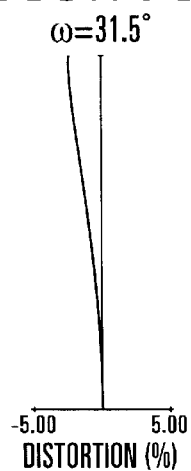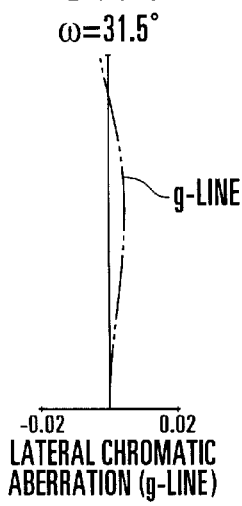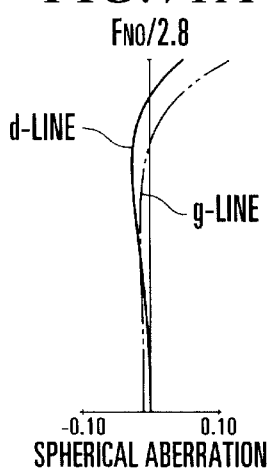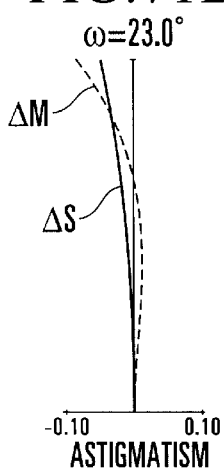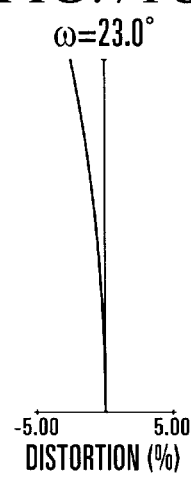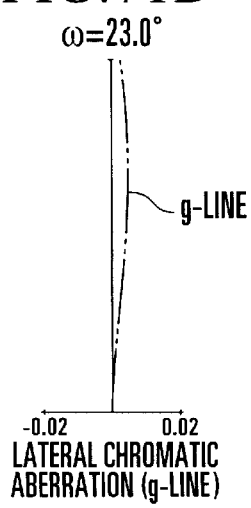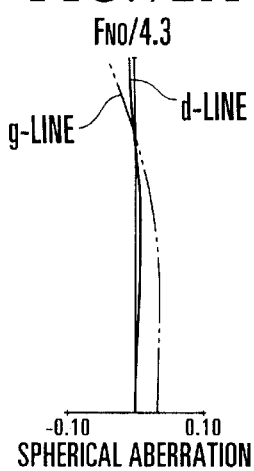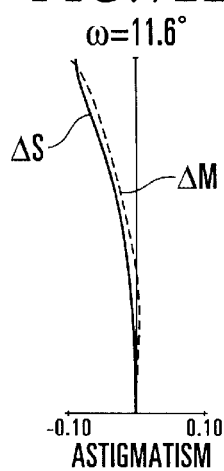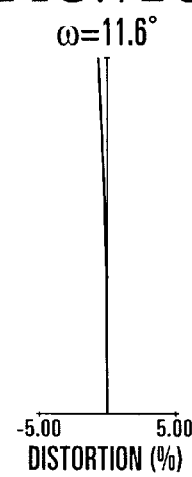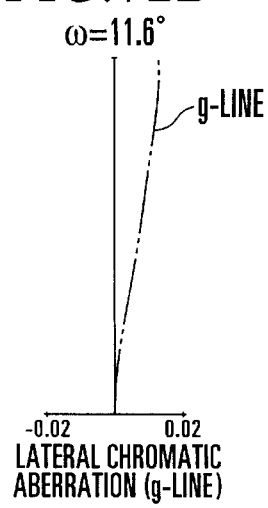

FIG.74A
FNO/2.6
d-LINE
g-LINE
-0.10  0.10
SPHERICAL ABERRATION
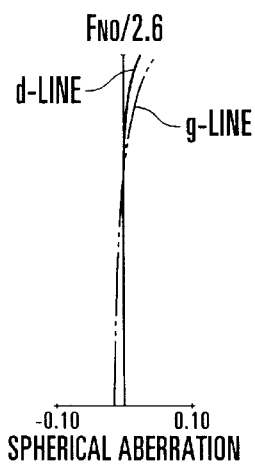

FIG.74B
ω=31.3°
ΔS  ΔM
-0.10  0.10
ASTIGMATISM

FIG.74C
ω=31.3°
-5.00  5.00
DISTORTION (%)
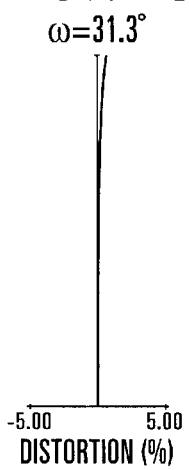

FIG.74D
ω=31.3°
g-LINE
-0.02  0.02
LATERAL CHROMATIC
ABERRATION (g-LINE)
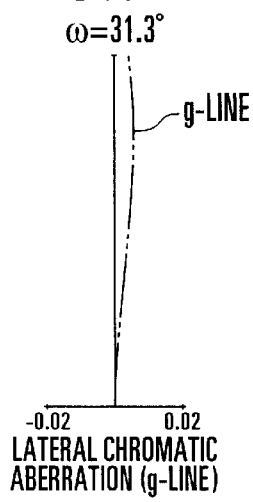

FIG.75A
FNO/3.1
d-LINE
g-LINE
-0.10  0.10
SPHERICAL ABERRATION
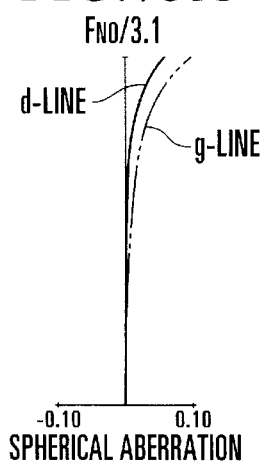

FIG.75B
ω=22.2°
ΔS
ΔM
-0.10  0.10
ASTIGMATISM
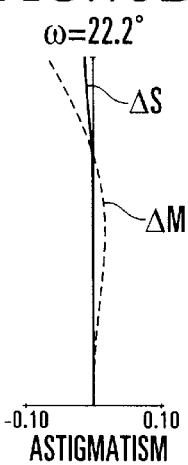

FIG.75C
ω=22.2°
-5.00  5.00
DISTORTION (%)
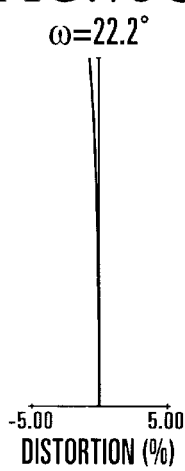

FIG.75D
ω=22.2°
g-LINE
-0.02  0.02
LATERAL CHROMATIC
ABERRATION (g-LINE)
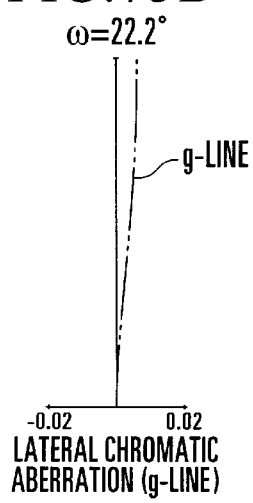

FIG.76A
FNO/4.5
g-LINE  d-LINE
-0.10  0.10
SPHERICAL ABERRATION
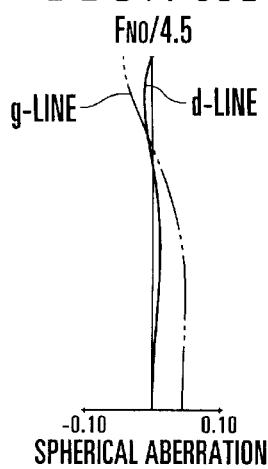

FIG.76B
ω=11.6°
ΔS
ΔM
-0.10  0.10
ASTIGMATISM
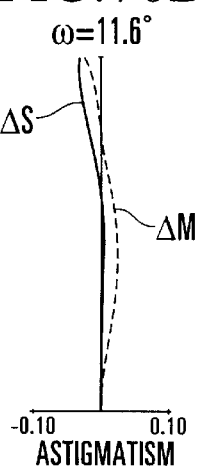

FIG.76C
ω=11.6°
-5.00  5.00
DISTORTION (%)
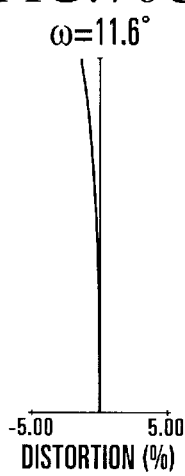

FIG.76D
ω=11.6°
g-LINE
-0.02  0.02
LATERAL CHROMATIC
ABERRATION (g-LINE)
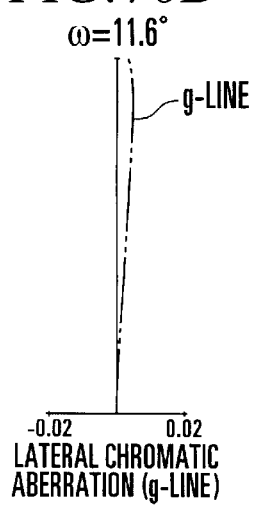

FIG.78A
FNO/2.8
FIG.78B
ω=29.6°
FIG.78C
ω=29.6°
FIG.78D
ω=29.6°
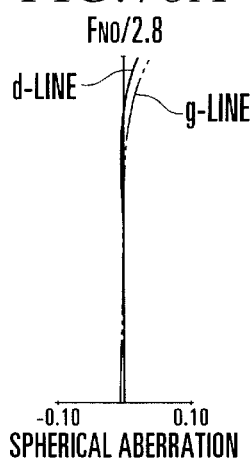
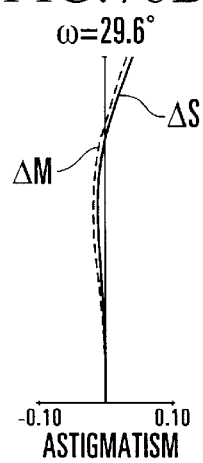
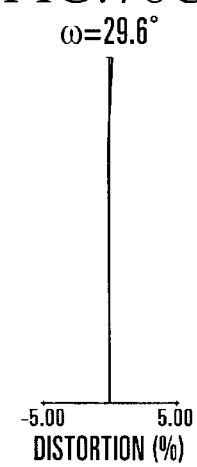
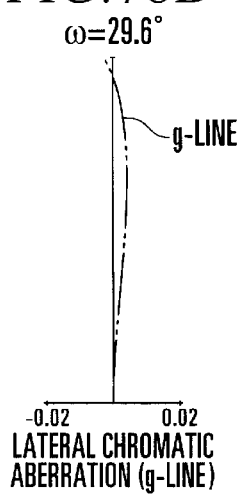
SPHERICAL ABERRATION | ASTIGMATISM | DISTORTION (%) | LATERAL CHROMATIC ABERRATION (g-LINE)
FIG.79A
FNO/3.3
FIG.79B
ω=21.8°
FIG.79C
ω=21.8°
FIG.79D
ω=21.8°
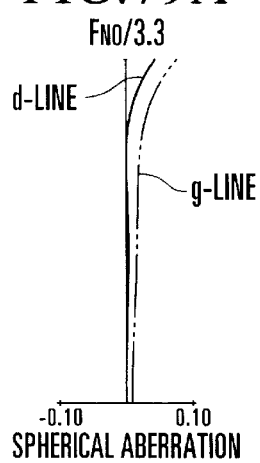
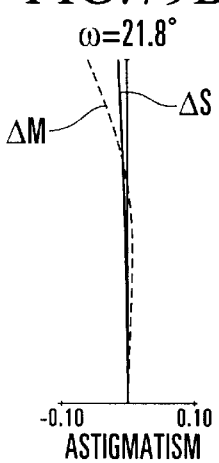
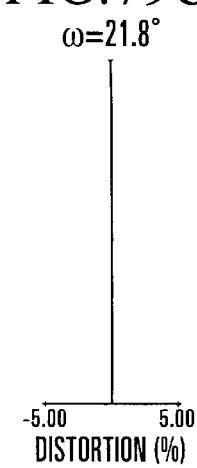
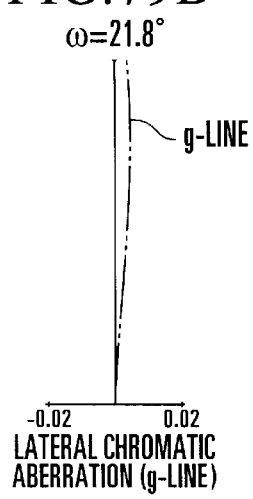
SPHERICAL ABERRATION | ASTIGMATISM | DISTORTION (%) | LATERAL CHROMATIC ABERRATION (g-LINE)
FIG.80A
FNO/4.8
FIG.80B
ω=10.8°
FIG.80C
ω=10.8°
FIG.80D
ω=10.8°
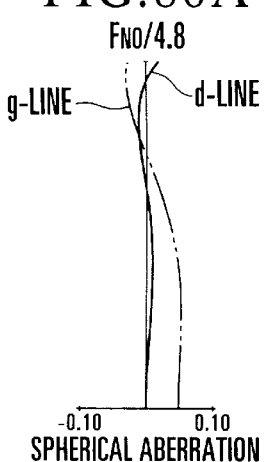
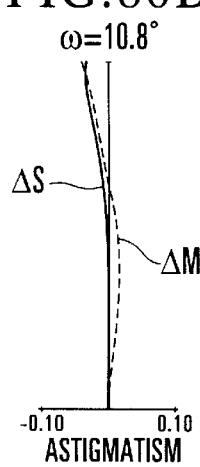
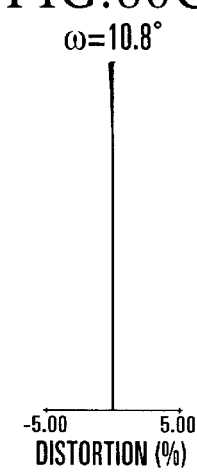
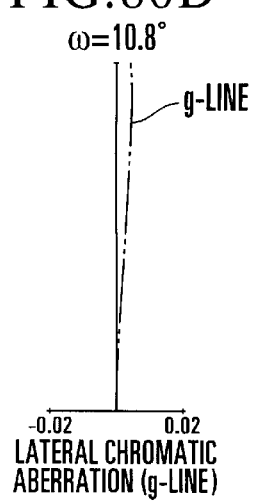
SPHERICAL ABERRATION | ASTIGMATISM | DISTORTION (%) | LATERAL CHROMATIC ABERRATION (g-LINE)

FNO/2.8

SPHERICAL ABERRATION

ω=31.5°

ASTIGMATISM

ω=31.5°

DISTORTION (%)

ω=31.5°

LATERAL CHROMATIC ABERRATION (g-LINE)

FNO/3.6

SPHERICAL ABERRATION

ω=17.1°

ASTIGMATISM

ω=17.1°

DISTORTION (%)

ω=17.1°

LATERAL CHROMATIC ABERRATION (g-LINE)

FNO/4.6

SPHERICAL ABERRATION

ω=11.6°

ASTIGMATISM

ω=11.6°

DISTORTION (%)

ω=11.6°

LATERAL CHROMATIC ABERRATION (g-LINE)

F$_{NO}$/2.83

-0.015  0.015
SPHERICAL ABERRATION

ω=31.2°

-0.015  0.015
ASTIGMATISM

ω=31.2°

-5.00  5.00
DISTORTION (%)

ω=31.2°

-0.003  0.003
LATERAL CHROMATIC
ABERRATION (g-LINE)

F$_{NO}$/3.2

-0.015  0.015
SPHERICAL ABERRATION

ω=22.4°

-0.015  0.015
ASTIGMATISM

ω=22.4°

-5.00  5.00
DISTORTION (%)

ω=22.4°

-0.003  0.003
LATERAL CHROMATIC
ABERRATION (g-LINE)

F$_{NO}$/4.80

-0.015  0.015
SPHERICAL ABERRATION

ω=11.6°

-0.015  0.015
ASTIGMATISM

ω=11.6°

-5.00  5.00
DISTORTION (%)

ω=11.6°

-0.003  0.003
LATERAL CHROMATIC
ABERRATION (g-LINE)

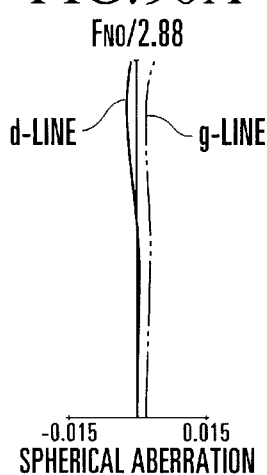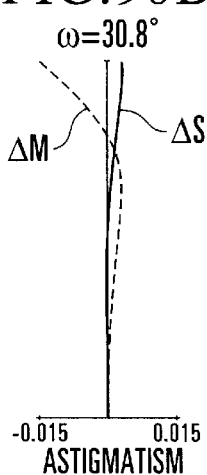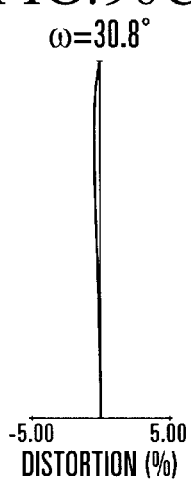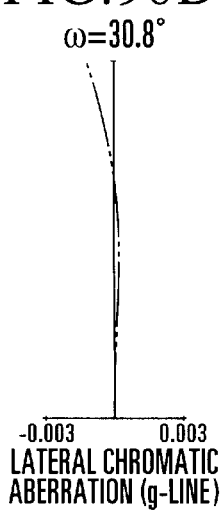
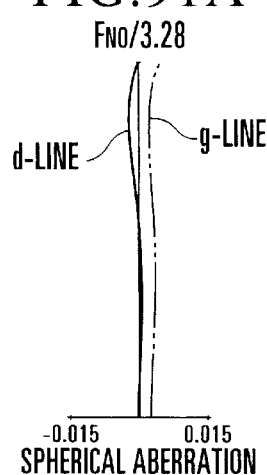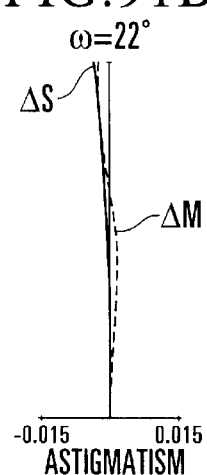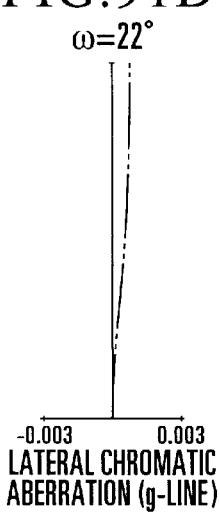
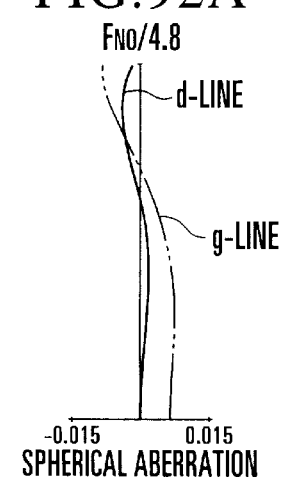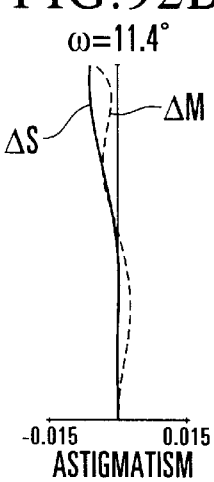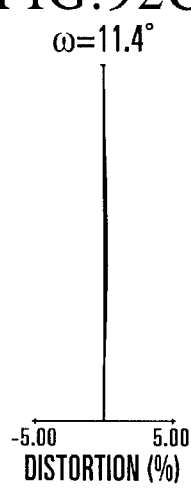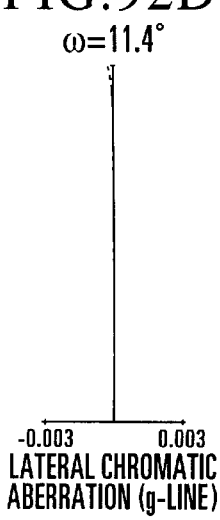

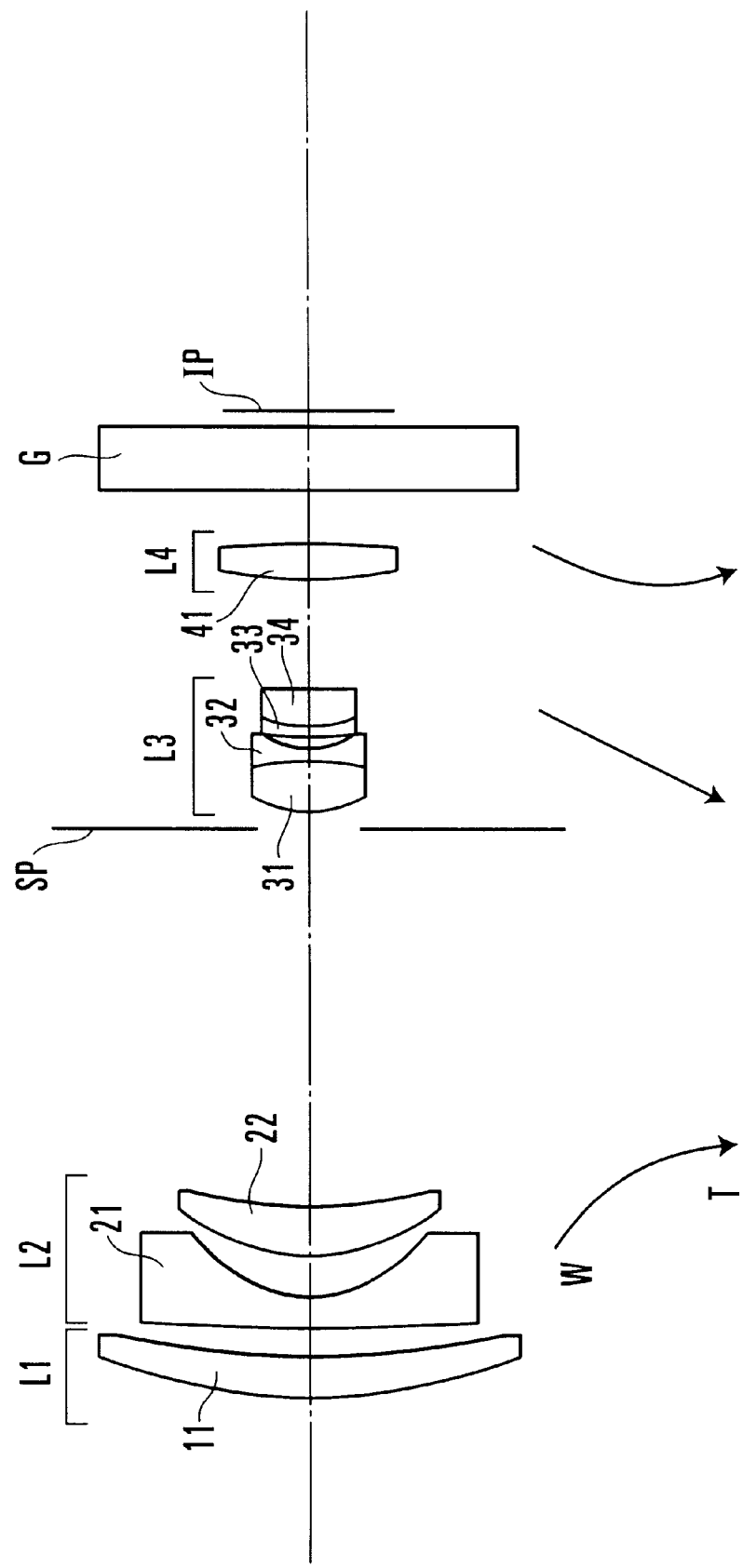

FNO/2.88

-0.015  0.015
SPHERICAL ABERRATION

ω=31.2°

-0.015  0.015
ASTIGMATISM

ω=31.2°

-5.00  5.00
DISTORTION (%)

ω=31.2°

-0.003  0.003
LATERAL CHROMATIC ABERRATION (g-LINE)

FNO/3.18

-0.015  0.015
SPHERICAL ABERRATION

ω=22.4°

-0.015  0.015
ASTIGMATISM

ω=22.4°

-5.00  5.00
DISTORTION (%)

ω=22.4°

-0.003  0.003
LATERAL CHROMATIC ABERRATION (g-LINE)

FNO/4.80

-0.015  0.015
SPHERICAL ABERRATION

ω=11.4°

-0.015  0.015
ASTIGMATISM

ω=11.4°

-5.00  5.00
DISTORTION (%)

ω=11.4°

-0.003  0.003
LATERAL CHROMATIC ABERRATION (g-LINE)

ZOOM LENS AND OPTICAL APPARATUS HAVING THE SAME

BACKGROUND OF THE INVENTION

1. Field of the Invention

The present invention relates to a zoom lens and an optical apparatus having the zoom lens, and more particularly to a zoom lens suited for a video camera, digital still camera, a silver-halide film camera, a broadcasting camera or the like, which has a relatively small number of constituent lens elements to make the entirety of a lens system thereof reduced in size while having a high variable magnification ratio, and an optical apparatus having such a zoom lens.

2. Description of Related Art

In recent years, with the advancement of high performance of an image pickup apparatus (camera), such as a video camera or a digital still camera, using a solid-state image sensor, such a CCD or an MOS, a zoom lens having a large aperture ratio including a wide angle of view is desired for the purpose of being used for an optical system of such an image pickup apparatus.

Since, in such an image pickup apparatus, a variety of optical members, including a low-pass filter, a color correction filter, etc., are disposed between the rearmost portion of the zoom lens and the image sensor, a lens system having a relatively long back focal distance is required for the optical system. In addition, in the case of a color camera using an image sensor for color images, a zoom lens excellent in telecentricity on the image side is desired for an optical system of the color camera so as to prevent color shading.

As one method for achieving the above-mentioned requirements, heretofore, there have been proposed a variety of two-unit zoom lenses of the so-called negative lead type each of which is composed of a first lens unit of negative refractive power and a second lens unit of positive refractive power, the separation between the first lens unit and the second lens unit being varied to effect the variation of magnification. In such a zoom optical system of the negative type, the variation of magnification is effected by moving the second lens unit of positive refractive power, and the compensation for the shift of an image plane due to the variation of magnification is effected by moving the first lens unit of negative refractive power. In such a lens construction composed of two lens units, to keep optical performance well, the upper limit of a variable magnification ratio is 2x or thereabout.

Further, in order to make the entirety of a lens system in a compact form while having a high variable magnification ratio greater than 2x, there have been proposed, for example, in Japanese Patent Publication No. Hei 7-3507 (corresponding to U.S. Pat. No. 4,810,072), Japanese Patent Publication No. Hei 6-40170 (corresponding to U.S. Pat. No. 4,647,160), etc., the so-called three-unit zoom lenses in each of which a third lens unit of negative or positive refractive power is disposed on the image side of the two-unit zoom lens so as to correct the various aberrations occurring due to the high variable magnification.

Further, in U.S. Pat. Nos. 4,828,372 and 5,262,897, there is disclosed a three-unit zoom lens composed of three lens units of negative, positive and positive refractive powers, respectively, in which the second lens unit is composed of six lens elements, as a whole, including two cemented lenses.

However, since the above-stated kind of three-unit zoom lens is designed mainly for 35-mm film photographic cameras, it is hard to say that the length of the back focal distance required for an optical system using a solid-state image sensor and the excellent telecentricity are made compatible with each other.

Three-unit zoom lenses of the negative lead type satisfying both the back focal distance and the telecentric characteristic have been proposed in, for example, Japanese Laid-Open Patent Application No. Sho 63-135913 (corresponding to U.S. Pat. No. 4,838,666), Japanese Laid-Open Patent Application No. Hei 7-261083, etc. In addition, in Japanese Laid-Open Patent Application No. Hei 3-288113 (corresponding to U.S. Pat. No. 5,270,863), there is disclosed a three-unit zoom lens in which a first lens unit of negative refractive power is fixed and a second lens unit of positive refractive power and a third lens unit of positive refractive power are moved to effect the variation of magnification.

However, in these zoom lenses, there are such tendencies that the number of constituent lens elements of each lens unit is relatively large, the total length of the lens system is great, and the production cost is high.

Further, in recent years, there has been widely used the so-called barrel-retractable zoom lens in which, in order to make the compactness of a camera and the high magnification of a lens system compatible with each other, the separation between the respective adjacent lens units at the time of nonuse of the camera is reduced up to the separation different from that at the time of use of the camera, thereby lessening the amount of protrusion of the zoom lens from the camera body. However, in a case where, as in the conventional zoom lenses, the number of constituent lens elements of each lens unit is large and, as a result, the length of each lens unit on the optical axis is great, or in a case where the amount of movement of each lens unit during zooming and during focusing is large and the total lens length is, therefore, great, it is sometimes impossible to attain the desired length of the zoom lens as retracted.

Further, in the zoom lens disclosed in Japanese Laid-Open Patent Application No. Hei 7-261083, a convex lens (positive lens) is disposed on the most object side of the first lens unit of negative refractive power, so that an increase of the outer diameter of the zoom lens when made to have a wide angle is inevitable.

In addition, in this zoom lens, since the focusing onto a close object is effected by moving the first lens unit of negative refractive power, there is such a tendency that the construction of a lens mounting mechanism is complicated in combination with the movement for zooming.

Further, in U.S. Pat. No. 4,999,007, there is disclosed a three-unit zoom lens in which each of the first lens unit and the second lens unit is composed of a single lens.

However, in this zoom lens, the total lens length at the wide-angle end is relatively great, and, because the distance between the first lens unit and the stop at the wide-angle end is large, the height of incidence of an off-axial ray of light is large to increase the diameter of a lens element of the first lens unit. Therefore, there is such a tendency that the entirety of a lens system becomes large.

Further, as a problem peculiar to a case where an angle of view at the wide-angle end is enlarged, there is the insufficiency for correcting distortion. In addition, in order to use a zoom lens in association with a high-pixel-density image sensor whose sensitivity is relatively low, the zoom lens is required to have a larger aperture ratio.

On the other hand, as one method of attaining a higher variable magnification ratio while making the length of the back focal distance and the excellent telecentricity compatible with each other, there has also been widely used a zoom lens of the so-called positive lead type in which a first lens unit of positive refractive power is disposed on the most object side.

Among the zoom lenses of the positive lead type, there are disclosed, in Japanese Laid-Open Patent Application No. Sho 62-206516, Japanese Laid-Open Patent Application No. Sho 62-215225 (corresponding to U.S. Pat. No. 4,859,042), Japanese Laid-Open Patent Application No. Sho 62-24213, Japanese Laid-Open Patent Application No. Hei 4-43311 (corresponding to U.S. Pat. No. 5,189,558), Japanese Laid-Open Patent Application No. Hei 5-72472 (corresponding to U.S. Pat. No. 5,572,364), Japanese Laid-Open Patent Application No. Hei 6-34882 (corresponding to U.S. Pat. No. 5,424,869), etc., zoom lenses of the so-called rear focus type, each of which comprises, in order from an object side to an image side, a first lens unit of positive refractive power, a second lens unit of negative refractive power, a third lens unit of positive refractive power and a fourth lens unit of positive refractive power, the second lens unit being moved to effect the variation of magnification, and the fourth lens unit being moved to compensate for the shift of an image plane caused by the variation of magnification and to effect focusing.

In general, the zoom lens of the rear focus type has the effective aperture of the first lens unit smaller than that of a zoom lens in which focusing is effected by moving the first lens unit, thereby making it easy to reduce the size of the entire lens system. In addition, the zoom lens of the rear focus type makes close-up photography possible. Further, in the zoom lens of the rear focus type, since a relatively small and light lens unit is moved for focusing, a small driving force is sufficient for driving the focusing lens unit, so that a rapid focusing operation can be attained.

Further, in the general four-unit zoom lens composed of lens units of positive, negative, positive and positive refractive powers, respectively, a high magnification varying action can be performed by moving the second lens unit along the optical axis. For reducing the total length of the zoom lens, it is most effective to decrease the amount of movement of the second lens unit on the optical axis. However, in order to decrease the amount of movement, the refractive power of the second lens unit must be strengthened, so that there is a fear of the deterioration of the image forming performance (optical performance) of the zoom lens due to the strengthening of the refractive power.

Further, in the general four-unit zoom lens composed of lens units of positive, negative, positive and positive refractive powers, respectively, in many cases, the first lens unit, which is the largest one in lens diameter among the four lens units, is composed of three lenses, i.e., one negative lens (concave lens) and two positive lenses (convex lenses), so that the compactness in the radial direction and the optical axis direction of the first lens unit is hindered.

Further, among the zoom lenses of the positive lead type, there are disclosed, in Japanese Laid-Open Patent Application No. Sho 62-247317, Japanese Laid-Open Patent Application No. Hei 10-62687 (corresponding to U.S. Pat. No. 6,016,228), etc., four-unit zoom lenses, in each of which the first lens unit, which would be ordinarily composed of three lenses, i.e., one negative lens and two positive lenses, is composed of one positive lens.

Among the above four-unit zoom lenses, the zoom lens disclosed in Japanese Laid-Open Patent Application No. Sho 62-247317 comprises a first lens unit of positive refractive power arranged to be stationary during the variation of magnification and composed of a single positive lens, a second lens unit of negative refractive power consisting of one cemented lens composed of one positive lens of meniscus form and one negative lens of bi-concave form cemented together and arranged to move monotonically toward the image side during the variation of magnification from the wide-angle end to the telephoto end, a third lens unit of positive refractive power consisting of one cemented lens and one positive lens and arranged to move monotonically toward the object side during the variation of magnification from the wide-angle end to the telephoto end, and a fourth lens unit of positive refractive power arranged to be stationary during the variation of magnification.

However, in the zoom lens disclosed in Japanese Laid-Open Patent Application No. Sho 62-247317, since the second lens unit is arranged to move monotonically toward the image side during the variation of magnification from the wide-angle end to the telephoto end, the above-mentioned inconveniences are still not dissolved.

Further, in the zoom lens disclosed in Japanese Laid-Open Patent Application No. Hei 10-62687, the second, third and fourth lens units are moved during the variation of magnification to make the second, third and fourth lens units share a magnification varying action with each other, so that the amount of movement of each of the second, third and fourth lens units can be made small without deteriorating the image forming performance. However, since the second lens unit still has a main portion of the magnification varying action, the above-mentioned arrangement is insufficient for reducing the total length of the zoom lens.

BRIEF SUMMARY OF THE INVENTION

In view of the above-mentioned drawbacks of the conventional zoom lenses, an object of the invention is to provide a zoom lens which is suited for a photographic system using a solid-state image sensor, has a high variable magnification ratio despite being compact and small in diameter with less constituent lens elements, and has excellent optical performance, and to provide an optical apparatus having the zoom lens.

To attain the above object, in accordance with an aspect of the invention, there is provided a zoom lens comprising a lens unit A of negative refractive power, and a lens unit B of positive refractive power disposed on an image side of the lens unit A, the lens unit B comprising two cemented lens components and consisting of not more than five lens elements, wherein the separation between the lens unit A and the lens unit B varies during zooming.

The above and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 2A to 2D are graphs showing aberration curves at the wide-angle end in the zoom lens according to the numerical example 1 of the invention.

FIGS. 3A to 3D are graphs showing aberration curves at the middle focal length position in the zoom lens according to the numerical example 1 of the invention.

FIGS. 4A to 4D are graphs showing aberration curves at the telephoto end in the zoom lens according to the numerical example 1 of the invention.

FIGS. 6A to 6D are graphs showing aberration curves at the wide-angle end in the zoom lens according to the numerical example 2 of the invention.

FIGS. 7A to 7D are graphs showing aberration curves at the middle focal length position in the zoom lens according to the numerical example 2 of the invention.

FIGS. 8A to 8D are graphs showing aberration curves at the telephoto end in the zoom lens according to the numerical example 2 of the invention.

FIG. 29 is a lens block diagram showing a zoom lens at the wide-angle end according to a numerical example 8 of the invention.

FIGS. 34A to 34D are graphs showing aberration curves at the wide-angle end in the zoom lens according to the numerical example 9 of the invention.

FIGS. 35A to 35D are graphs showing aberration curves at the middle focal length position in the zoom lens according to the numerical example 9 of the invention.

FIGS. 36A to 36D are graphs showing aberration curves at the telephoto end in the zoom lens according to the numerical example 9 of the invention.

FIGS. 38A to 38D are graphs showing aberration curves at the wide-angle end in the zoom lens according to the numerical example 10 of the invention.

FIGS. 39A to 39D are graphs showing aberration curves at the middle focal length position in the zoom lens according to the numerical example 10 of the invention.

FIGS. 40A to 40D are graphs showing aberration curves at the telephoto end in the zoom lens according to the numerical example 10 of the invention.

FIGS. 50A to 50D are graphs showing aberration curves at the wide-angle end in the zoom lens according to the numerical example 13 of the invention.

FIGS. 51A to 51D are graphs showing aberration curves at the middle focal length position in the zoom lens according to the numerical example 13 of the invention.

FIGS. 52A to 52D are graphs showing aberration curves at the telephoto end in the zoom lens according to the numerical example 13 of the invention.

FIG. 57 is a lens block diagram showing a zoom lens at the wide-angle end according to a numerical example 15 of the invention.

FIGS. 58A to 58D are graphs showing aberration curves at the wide-angle end in the zoom lens according to the numerical example 15 of the invention.

FIGS. 59A to 59D are graphs showing aberration curves at the middle focal length position in the zoom lens according to the numerical example 15 of the invention.

FIGS. 60A to 60D are graphs showing aberration curves at the telephoto end in the zoom lens according to the numerical example 15 of the invention.

FIGS. 70A to 70D are graphs showing aberration curves at the wide-angle end in the zoom lens according to the numerical example 18 of the invention.

FIGS. 71A to 71D are graphs showing aberration curves at the middle focal length position in the zoom lens according to the numerical example 18 of the invention.

FIGS. 72A to 72D are graphs showing aberration curves at the telephoto end in the zoom lens according to the numerical example 18 of the invention.

FIGS. 74A to 74D are graphs showing aberration curves at the wide-angle end in the zoom lens according to the numerical example 19 of the invention.

FIGS. 75A to 75D are graphs showing aberration curves at the middle focal length position in the zoom lens according to the numerical example 19 of the invention.

FIGS. 76A to 76D are graphs showing aberration curves at the telephoto end in the zoom lens according to the numerical example 19 of the invention.

FIGS. 78A to 78D are graphs showing aberration curves at the wide-angle end in the zoom lens according to the numerical example 20 of the invention.

FIGS. 79A to 79D are graphs showing aberration curves at the middle focal length position in the zoom lens according to the numerical example 20 of the invention.

FIGS. 80A to 80D are graphs showing aberration curves at the telephoto end in the zoom lens according to the numerical example 20 of the invention.

FIGS. 90A to 90D are graphs showing aberration curves at the wide-angle end in the zoom lens according to the numerical example 23 of the invention.

FIGS. 91A to 91D are graphs showing aberration curves at the middle focal length position in the zoom lens according to the numerical example 23 of the invention.

FIGS. 92A to 92D are graphs showing aberration curves at the telephoto end in the zoom lens according to the numerical example 23 of the invention.

FIG. 93 is a lens block diagram showing a zoom lens at the wide-angle end according to a numerical example 24 of the invention.

DETAILED DESCRIPTION OF THE INVENTION

Hereinafter, preferred embodiments of the invention will be described in detail with reference to the drawings.

According to an embodiment 1, there is provided a zoom lens comprising two lens units of negative and positive refractive powers, respectively, in order from the object side to the image side. The detailed lens construction according to the embodiment 1 is disclosed in numerical examples 1 and 2 to be described later.

Figure 1:
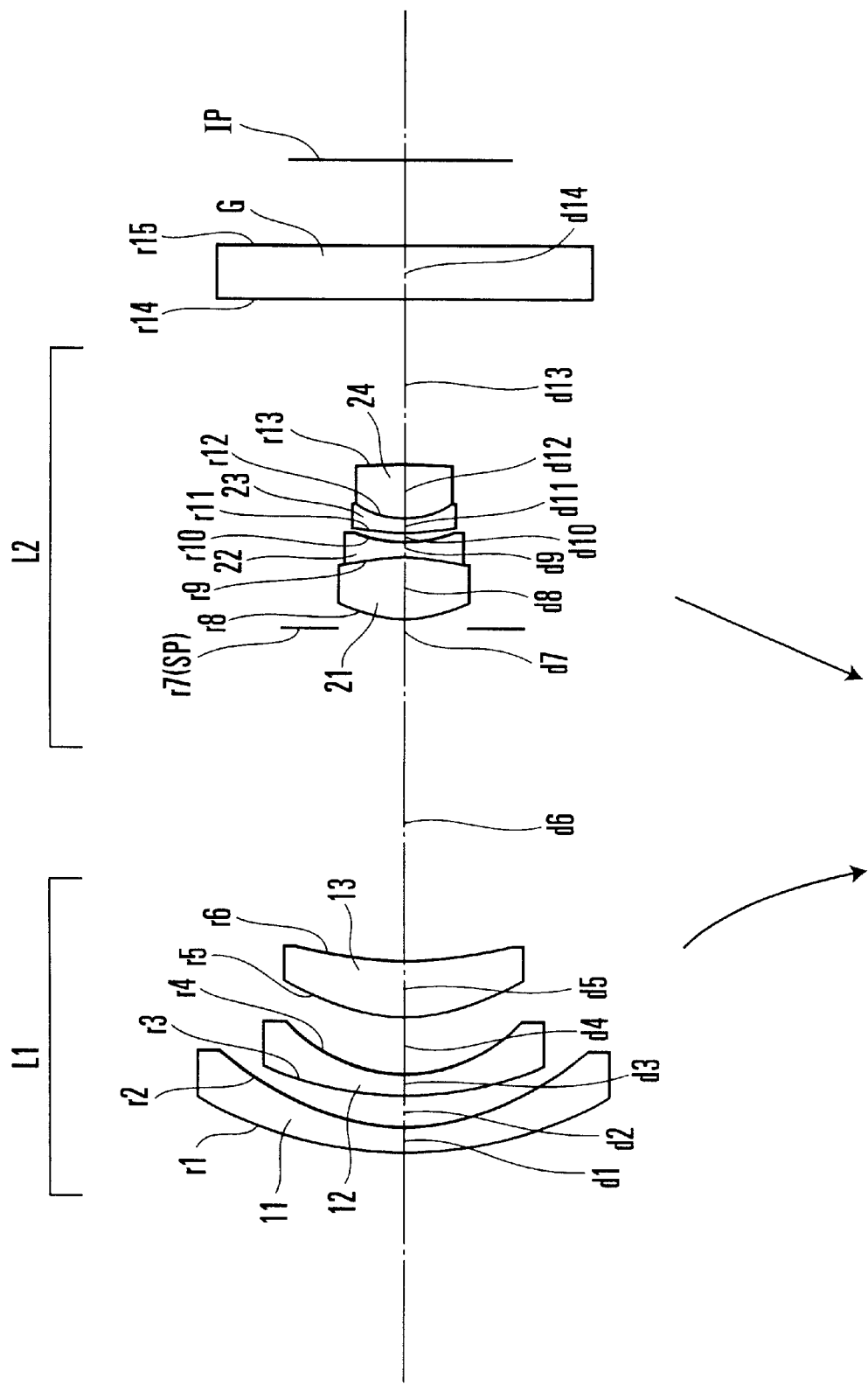
FIG. 1 is a lens block diagram showing a zoom lens at the wide-angle end according to a numerical example 1 of the invention.
Figure 5:
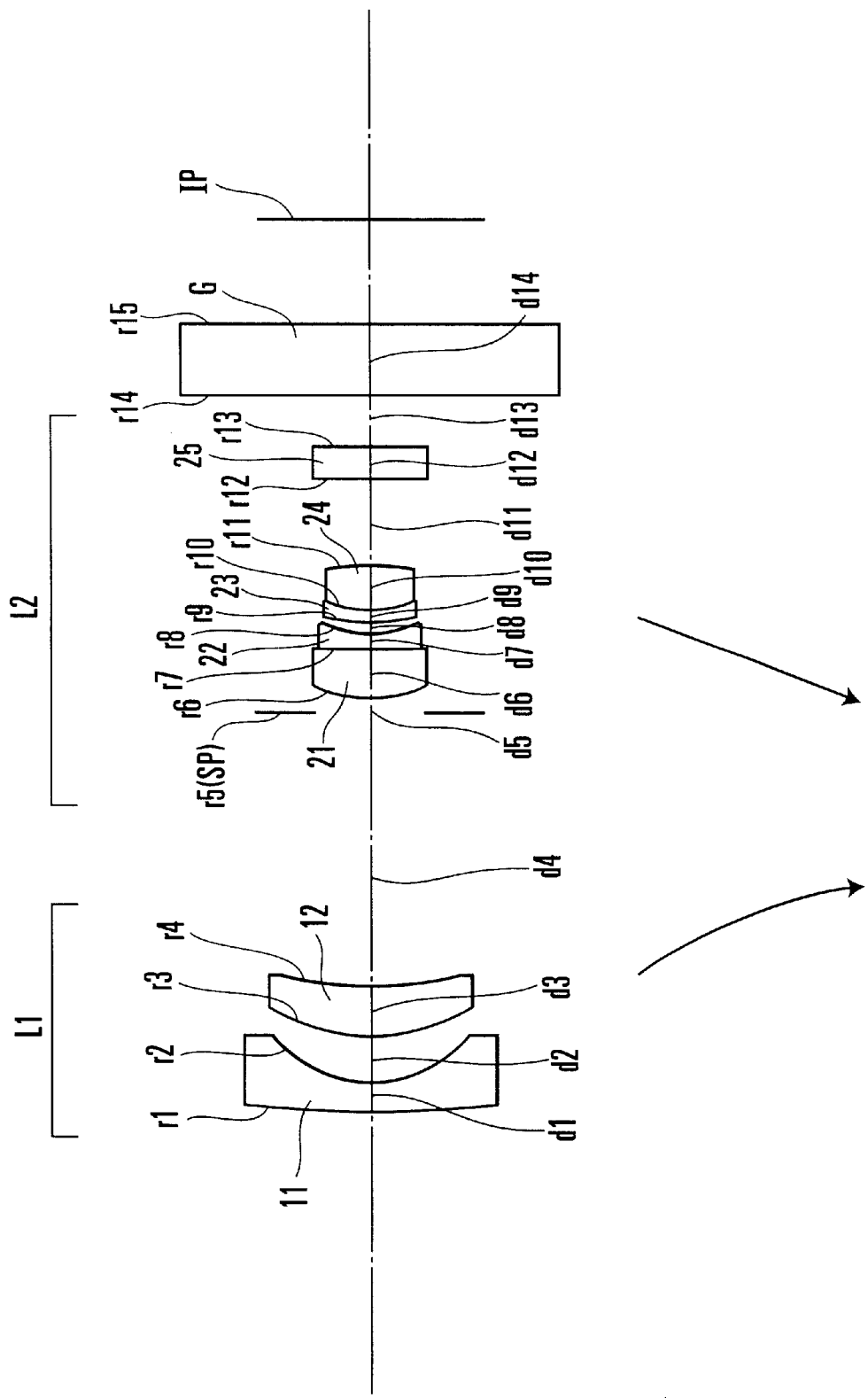
FIG. 5 is a lens block diagram showing a zoom lens at the wide-angle end according to a numerical example 2 of the invention.

FIGS. 1 and 5 are lens block diagrams showing zoom lenses at the wide-angle end according to the numerical examples 1 and 2, respectively. FIGS. 2A to 2D and FIGS. 6A to 6D are graphs showing aberration curves at the wide-angle end in the zoom lenses according to the numerical examples 1 and 2, respectively. FIGS. 3A to 3D and FIGS. 7A to 7D are graphs showing aberration curves at the middle focal length position in the zoom lenses according to the numerical examples 1 and 2, respectively. FIGS. 4A to 4D and FIGS. 8A to 8D are graphs showing aberration curves at the telephoto end in the zoom lenses according to the numerical examples 1 and 2, respectively.

According to each of embodiments 2A to 2C, there is provided a zoom lens comprising three lens units of negative, positive and positive refractive powers, respectively, in order from the object side to the image side. The detailed lens construction according to the embodiment 2A is disclosed in numerical examples 3 to 8 to be described later. The detailed lens construction according to the embodiment 2B is disclosed in numerical examples 9 to 11 to be described later. The detailed lens construction according to the embodiment 2C is disclosed in numerical examples 12 to 15 to be described later.

FIGS. 9, 13, 17, 21, 25, 29, 33, 37, 41, 45, 49, 53 and 57 are lens block diagrams showing zoom lenses at the wide-angle end according to the numerical examples 3 to 15, respectively. FIGS. 10A to 10D, FIGS. 14A to 14D, FIGS. 18A to 18D, FIGS. 22A to 22D, FIGS. 26A to 26D, FIGS. 30A to 30D, FIGS. 34A to 34D, FIGS. 38A to 38D, FIGS. 42A to 42D, FIGS. 46A to 46D, FIGS. 50A to 50D, FIGS. 54A to 54D and FIGS. 58A to 58D are graphs showing aberration curves at the wide-angle end in the zoom lenses according to the numerical examples 3 to 15, respectively. FIGS. 11A to 11D, FIGS. 15A to 15D, FIGS. 19A to 19D, FIGS. 23A to 23D, FIGS. 27A to 27D, FIGS. 31A to 31D, FIGS. 35A to 35D, FIGS. 39A to 39D, FIGS. 43A to 43D, FIGS. 47A to 47D, FIGS. 51A to 51D, FIGS. 55A to 55D and FIGS. 59A to 59D are graphs showing aberration curves at the middle focal length position in the zoom lenses according to the numerical examples 3 to 15, respectively. FIGS. 12A to 12D, FIGS. 16A to 16D, FIGS. 20A to 20D, FIGS. 24A to 24D, FIGS. 28A to 28D, FIGS. 32A to 32D, FIGS. 36A to 36D, FIGS. 40A to 40D, FIGS. 44A to 44D, FIGS. 48A to 48D, FIGS. 52A to 52D, FIGS. 56A to 56D and FIGS. 60A to 60D are graphs showing aberration curves at the telephoto end in the zoom lenses according to the numerical examples 3 to 15, respectively.

According to an embodiment 3, there is provided a zoom lens comprising three lens units of positive, negative and positive refractive powers, respectively, in order from the object side to the image side. The detailed lens construction according to the embodiment 3 is disclosed in numerical examples 16 and 17 to be described later.

Figure 61:
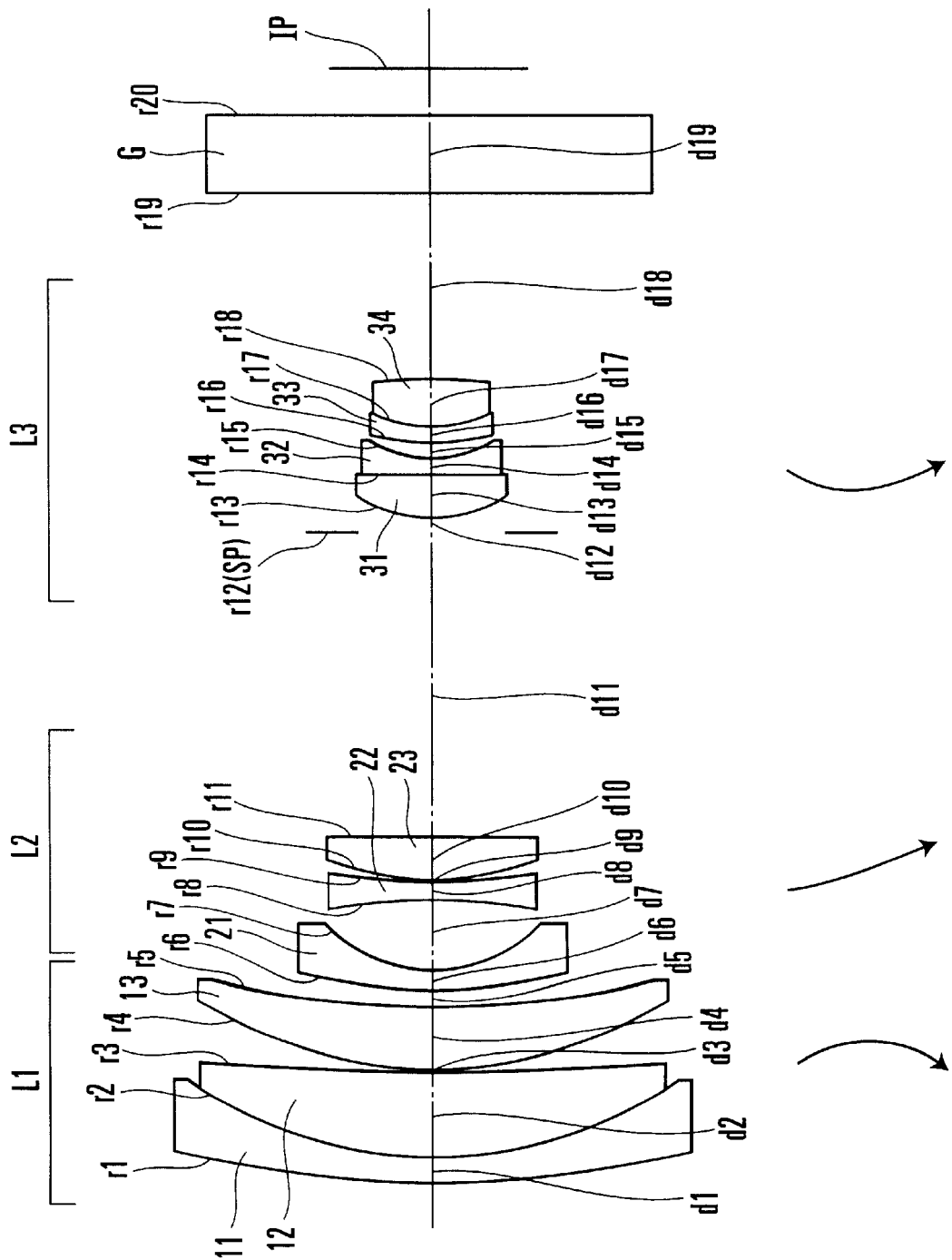
FIG. 61 is a lens block diagram showing a zoom lens at the wide-angle end according to a numerical example 16 of the invention.
Figure 62A:
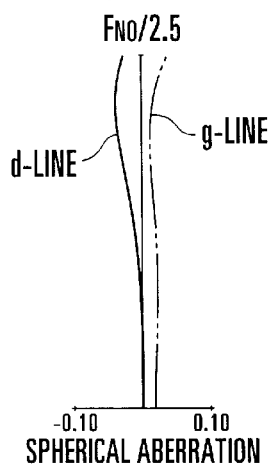
FIGS. 62A to 62D are graphs showing aberration curves at the wide-angle end in the zoom lens according to the numerical example 16 of the invention.
Figure 62B:
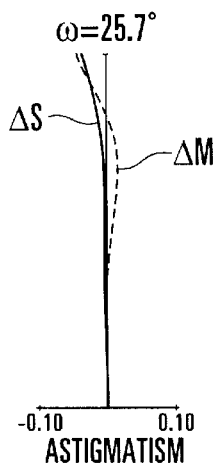
Figure 62C:
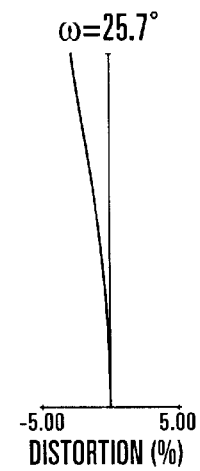
Figure 62D:
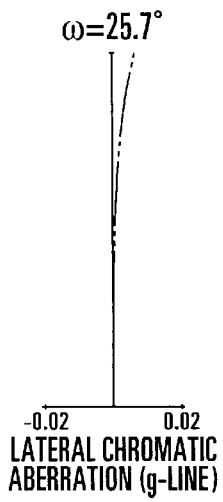
Figure 63A:
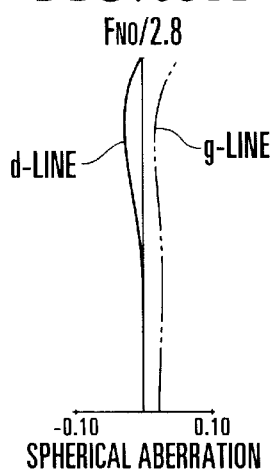
FIGS. 63A to 63D are graphs showing aberration curves at the middle focal length position in the zoom lens according to the numerical example 16 of the invention.
Figure 63B:
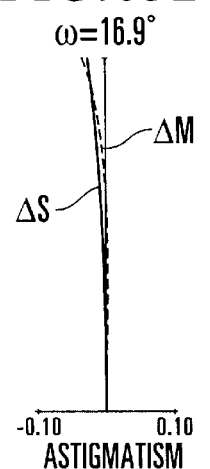
Figure 63C:
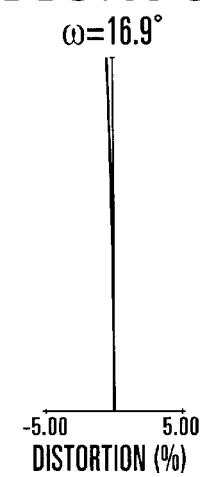
Figure 63D:
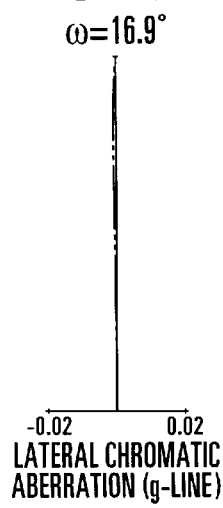
Figure 64A:
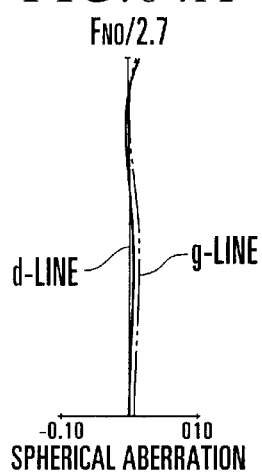
FIGS. 64A to 64D are graphs showing aberration curves at the telephoto end in the zoom lens according to the numerical example 16 of the invention.
Figure 64B:
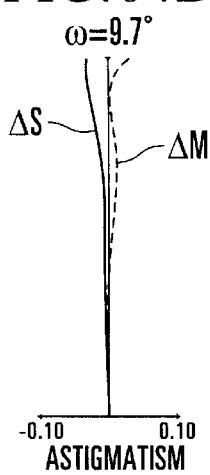
Figure 64C:
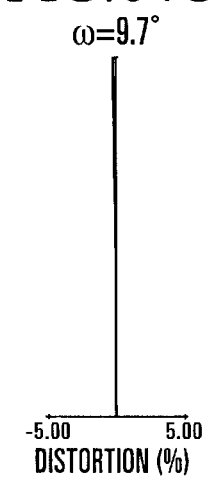
Figure 64D:
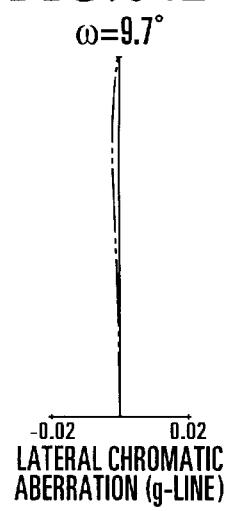
Figure 65:
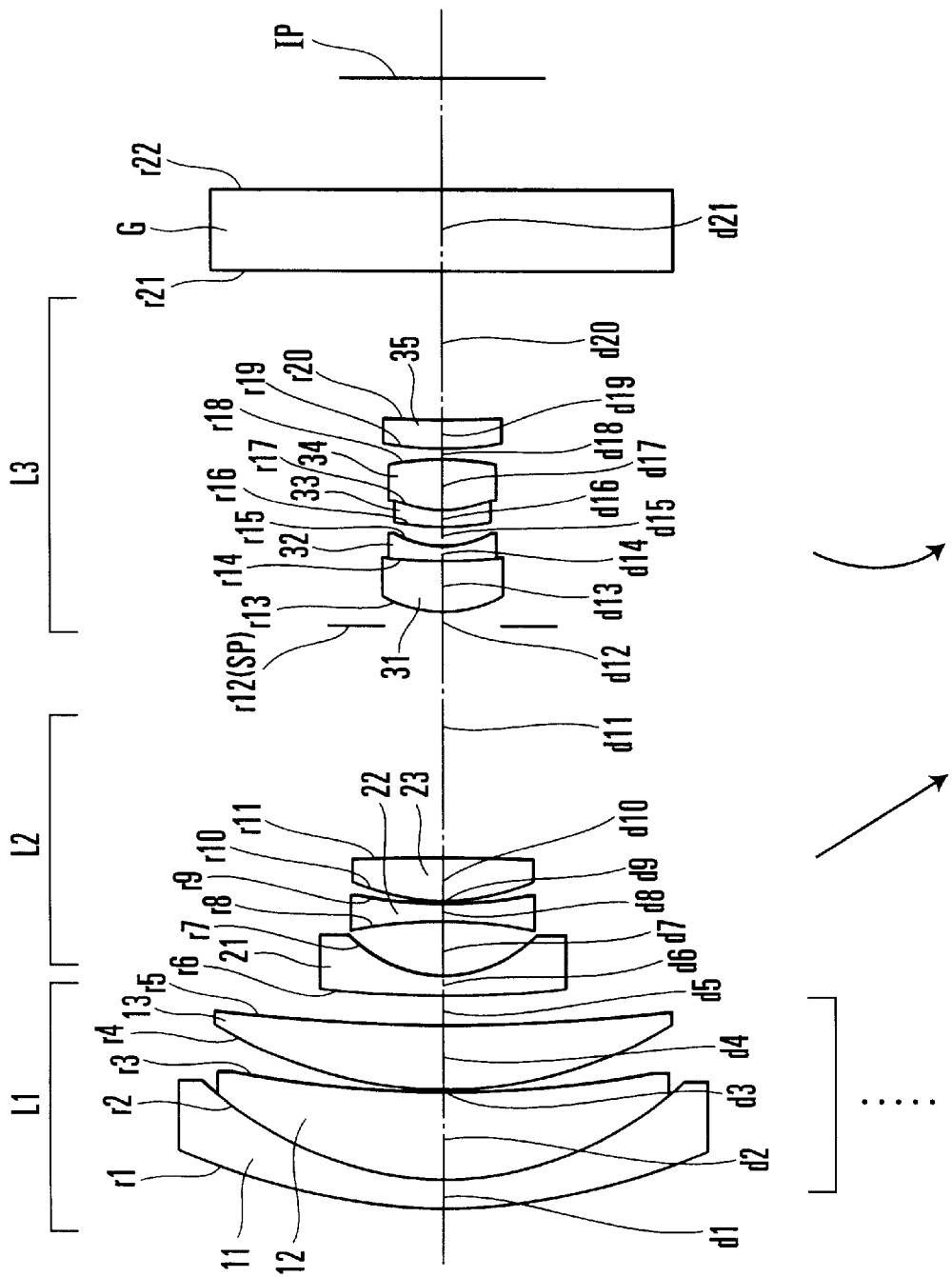
FIG. 65 is a lens block diagram showing a zoom lens at the wide-angle end according to a numerical example 17 of the invention.
Figure 66A:
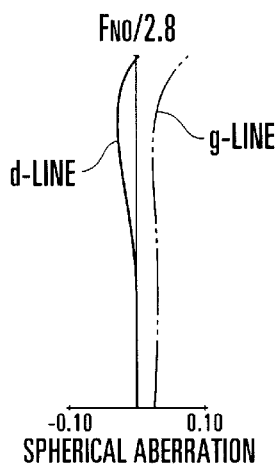
FIGS. 66A to 66D are graphs showing aberration curves at the wide-angle end in the zoom lens according to the numerical example 17 of the invention.
Figure 66B:
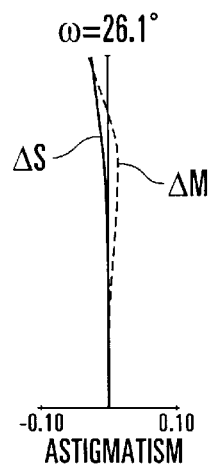
Figure 66C:
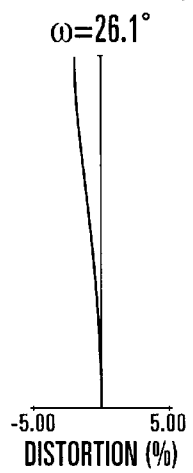
Figure 66D:
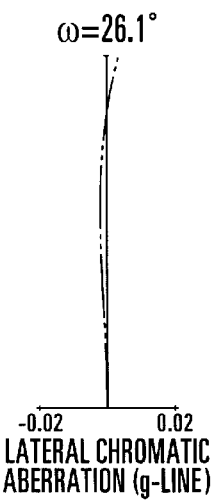
Figure 67A:
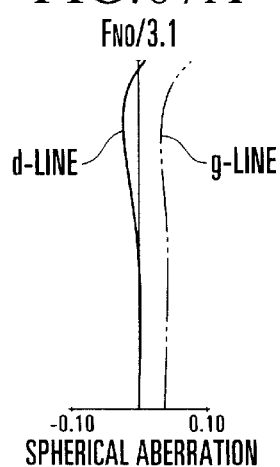
FIGS. 67A to 67D are graphs showing aberration curves at the middle focal length position in the zoom lens according to the numerical example 17 of the invention.
Figure 67B:
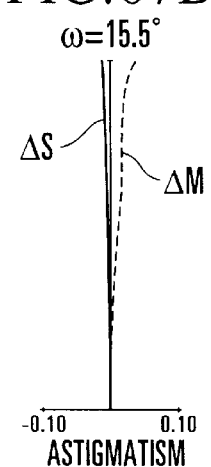
Figure 67C:
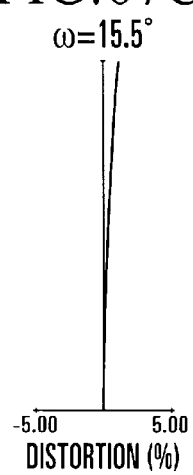
Figure 67D:
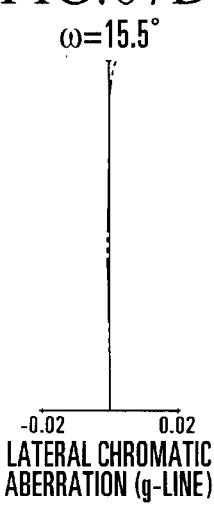
Figure 68A:
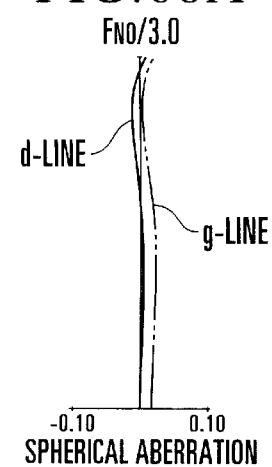
FIGS. 68A to 68D are graphs showing aberration curves at the telephoto end in the zoom lens according to the numerical example 17 of the invention.
Figure 68B:
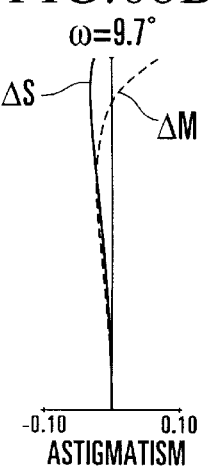
Figure 68C:
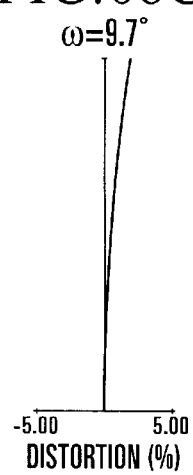
Figure 68D:
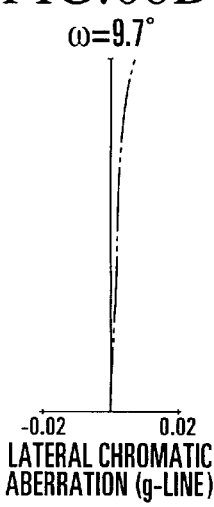

FIGS. 61 and 65 are lens block diagrams showing zoom lenses at the wide-angle end according to the numerical examples 16 and 17, respectively. FIGS. 62A to 62D and FIGS. 66A to 66D are graphs showing aberration curves at the wide-angle end in the zoom lenses according to the numerical examples 16 and 17, respectively. FIGS. 63A to 63D and FIGS. 67A to 67D are graphs showing aberration curves at the middle focal length position in the zoom lenses according to the numerical examples 16 and 17, respectively. FIGS. 64A to 64D and FIGS. 68A to 68D are graphs showing aberration curves at the telephoto end in the zoom lenses according to the numerical examples 16 and 17, respectively.

According to each of embodiments 4A and 4B, there is provided a zoom lens comprising four lens units of positive, negative, positive and positive refractive powers, respectively, in order from the object side to the image side. The detailed lens construction according to the embodiment 4A is disclosed in numerical examples 18 to 21 to be described later. The detailed lens construction according to the embodiment 4B is disclosed in numerical examples 22 to 24 to be described later.

FIGS. 69, 73, 77, 81, 85, 89 and 93 are lens block diagrams showing zoom lenses at the wide-angle end according to the numerical examples 18 to 24, respectively. FIGS. 70A to 70D, FIGS. 74A to 74D, FIGS. 78A to 78D, FIGS. 82A to 82D, FIGS. 86A to 86D, FIGS. 90A to 90D and FIGS. 94A to 94D are graphs showing aberration curves at the wide-angle end in the zoom lenses according to the numerical examples 18 to 24, respectively. FIGS. 71A to 71D, FIGS. 75A to 75D, FIGS. 79A to 79D, FIGS. 83A to 83D, FIGS. 87A to 87D, FIGS. 91A to 91D and FIGS. 95A to 95D are graphs showing aberration curves at the middle focal length position in the zoom lenses according to the numerical examples 18 to 24, respectively. FIGS. 72A to 72D, FIGS. 76A to 76D, FIGS. 80A to 80D, FIGS. 84A to 84D, FIGS. 88A to 88D, FIGS. 92A to 92D and FIGS. 96A to 96D are graphs showing aberration curves at the telephoto end in the zoom lenses according to the numerical examples 18 to 24, respectively.

In the lens block diagrams in the respective numerical examples, reference character L1 denotes a first lens unit, reference character L2 denotes a second lens unit, reference character L3 denotes a third lens unit, reference character L4 denotes a fourth lens unit, reference character SP denotes an aperture stop, reference character IP denotes an image plane on which a solid-state image sensor, such as a CCD or an MOS, is disposed, and reference character G denotes a glass block corresponding to a filter, a color separation prism or the like. Arrows shown in the lens block diagrams indicate the loci of movement of the respective lens units during zooming from the wide-angle end to the telephoto end.

The zoom lenses according to the respective embodiments have such a common feature that a lens unit of positive refractive power disposed on the image side of a lens unit of negative refractive power comprises two cemented lens components and consists of not more than five lens elements. With this arrangement adopted, it becomes easy to realize a zoom lens which has the entire lens system reduced in size, has high optical performance while having a high variable magnification ratio, and has a simple structure with the number of constituent lens elements thereof decreased, and to realize an optical apparatus using the zoom lens.

Next, the characteristic features of the zoom lenses according to the respective embodiments will be described.

(Embodiment 1)

First, the characteristic features of the lens construction of a zoom lens having two lens units of negative and positive refractive powers, respectively, in order from the object side to the image side according to the embodiment 1 will be described.

FIGS. 1 and 5 are lens block diagrams showing zoom lenses at the wide-angle end according to the numerical examples 1 and 2 in the embodiment 1.

The zoom lens according to the embodiment 1 comprises, in order from the object side to the image side, a first lens unit L1 of negative refractive power and a second lens unit L2 of positive refractive power. During zooming from the wide-angle end to the telephoto end, the first lens unit moves toward the image side and the second lens unit moves toward the object side.

In the zoom lens according to the embodiment 1, the main variation of magnification is effected by the movement of the second lens unit, and the shift of an image point (the variation of an image plane) caused by the variation of magnification is compensated for by the movement of the first lens unit toward the image side.

Further, the stop SP is disposed on the most object side of the second lens unit (just before the second lens unit on the object side), so that the distance between the entrance pupil and the first lens unit on the wide-angle side is shortened to suppress the increase of the lens diameter of lens elements constituting the first lens unit.

Next, the lens construction of the zoom lens according to each of the numerical examples 1 and 2 in the embodiment 1 will be described.

In the zoom lens according to the numerical example 1 shown in FIG. 1, the first lens unit L1 of negative refractive power is composed of three lenses, i.e., in order from the object side to the image side, a negative lens 11 of meniscus form having a concave surface facing the image side, a negative lens 12 of meniscus form having a concave surface facing the image side, and a positive lens 13 of meniscus form having a convex surface facing the object side.

Further, the second lens unit L2 of positive refractive power is composed of four lenses, i.e., in order from the object side to the image side, a positive lens 21 of bi-convex form, a negative lens 22 of bi-concave form, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses.

In the zoom lens according to the numerical example 2 shown in FIG. 5, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side.

Further, the second lens unit L2 of positive refractive power is composed of five lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, a positive lens 24 of bi-convex form, and a positive lens 25 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses and one positive lens.

As described above, the respective lens units are formed into such a lens construction as to make the desired refractive power arrangement and the correction of aberrations compatible with each other, so that it is possible to attain the compactness of the entire lens system while keeping good optical performance.

In the embodiment 1, the first lens unit L1 has the role of causing an off-axial principal ray to be pupil-imaged on the center of the stop SP. In particular, since the amount of refraction of the off-axial principal ray is large on the wide-angle side, the various off-axial aberrations, particularly, astigmatism and distortion, tend to occur.

Therefore, according to necessity, a lens surface on the image side of the negative lens 11 of meniscus form is formed into such an aspheric surface that a negative refractive power becomes progressively weaker toward a marginal portion of the lens surface. Accordingly, astigmatism and distortion are corrected in a well-balanced manner, and the first lens unit L1 is composed of such a small number of lens elements as two or three, so that the compactness of the entire lens system can be attained.

Further, lenses constituting the first lens unit L1 have respective shapes close to concentric spherical surfaces centered on a point at which the stop and the optical axis intersect, so as to suppress the occurrence of off-axial aberration caused by the refraction of an off-axial principal ray.

In the second lens unit L2, the positive lens 21 having a convex surface facing the object side which is stronger in power than an opposite surface thereof is disposed on the most object side of the second lens unit, so that the second lens unit has such a shape as to lessen the angle of refraction of an off-axial principal ray having exited from the first lens unit, thereby preventing the various off-axial aberrations from occurring.

Further, the positive lens 21 is a lens arranged to allow an on-axial ray to pass at the largest height, and is concerned with the correction of, mainly, spherical aberration and coma.

Further, it is preferable that a lens surface on the object side of the positive lens 21 is formed into such an aspheric surface that a positive refractive power becomes progressively weaker toward a marginal portion of the lens surface. By this arrangement, it becomes easy to correct well spherical aberration and coma.

The negative lens 22 disposed on the image side of the positive lens 21 is made to have a concave surface facing the image side, so that a negative air lens is formed by the concave surface on the image side of the negative lens 22 and a convex surface on the object side of the negative lens 23, which is disposed subsequent to the negative lens 22. Accordingly, it is possible to correct spherical aberration occurring due to the increase of an aperture ratio.

In addition, in order to cope with the reduction of the amount of chromatic aberration, which is required according to the increased number of pixels and the minimization of cell pitches of a solid-state image sensor such as a CCD, the second lens unit L2 is made to be composed of two cemented lenses. By this arrangement, it is possible to correct well longitudinal chromatic aberration and lateral chromatic aberration.

In a case where the second lens unit L2 is composed of the so-called triplet-type system, a single negative lens component is required to have a glass thickness greater than a certain degree, so as to correct well off-axial flare or to correct well spherical aberration due to two air lenses of negative refractive power provided before and behind the negative lens component. Thus, in a case where the second lens unit L2 is composed of the triplet-type system, the thickness on the optical axis of the second lens unit L2 increases inevitably. On the other hand, according to the embodiment 1, the second lens unit L2 is composed of two cemented lenses, i.e., a refractive power of a single negative lens component in the triplet-type system is separated into two components. Accordingly, as compared with a case where the correction of aberration is performed by the single negative lens component, the degree of freedom of the correction of aberration is increased, so that, as a result, the thickness on the optical axis of the second lens unit L2 decreases. Thus, the second lens unit L2 being composed of two cemented lenses contributes greatly also to the shortening of the entire optical system and the shortening of the total length of the lens system as retracted.

When a close-distance object is to be photographed by using the zoom lens according to each of the numerical examples 1 and 2 in the embodiment 1, good optical performance can be obtained by moving the first lens unit toward the object side. However, in the zoom lens according to the numerical example 2, the positive lens disposed on the image side of the two cemented lenses of the second lens unit may be moved for that purpose.

This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

(Embodiment 2A)

Next, the characteristic features of the lens construction of a zoom lens having three lens units of negative, positive and positive refractive powers, respectively, in order from the object side to the image side according to the embodiment 2A will be described.

FIGS. 9, 13, 17, 21, 25 and 29 are lens block diagrams showing zoom lenses at the wide-angle end according the numerical examples 3 to 8 in the embodiment 2A.

The zoom lens according to the embodiment 2A comprises, in order from the object side to the image side, a first lens unit L1 of negative refractive power, a second lens unit L2 of positive refractive power and a third lens unit L3 of positive refractive power. During zooming from the wide-angle end to the telephoto end, the first lens unit makes a reciprocating motion convex toward the image side, the second lens unit moves toward the object side, and the third lens unit moves toward the image side or moves with a locus convex toward the object side.

In the zoom lens according to the embodiment 2A, the variation of magnification is effected mainly by moving the second lens unit while the shift of an image point (the variation of an image plane) due to the variation of magnification is compensated for by moving forward and backward the first lens unit and moving the third lens unit toward the image side or moving the third lens unit with a locus convex toward the object side.

The third lens unit shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, the telecentric image formation on the image side necessary for the photographing apparatus (optical apparatus) using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

Next, the lens construction of the zoom lens according to each of the numerical examples 3 to 8 in the embodiment 2A will be described.

Figure 9:
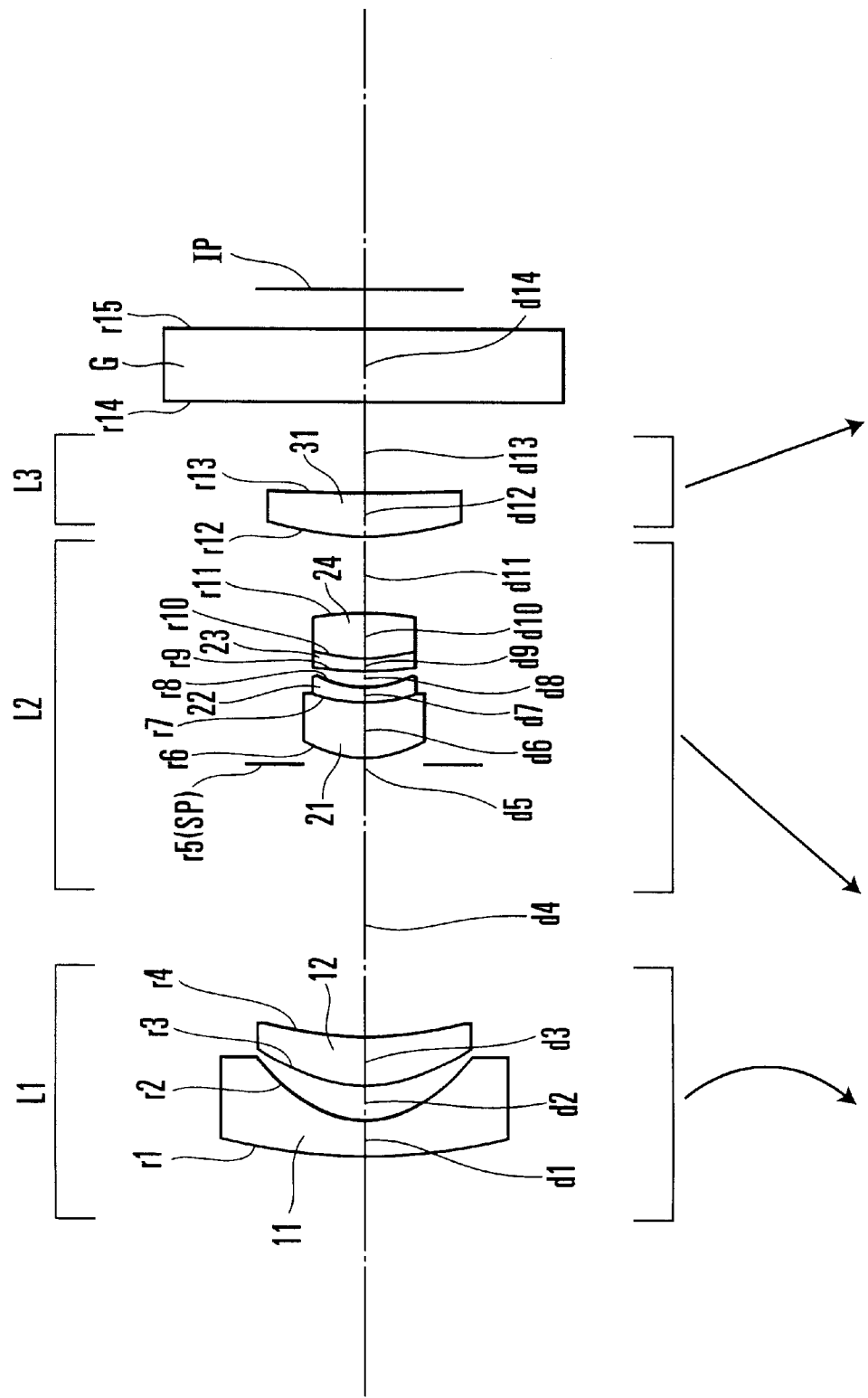
FIG. 9 is a lens block diagram showing a zoom lens at the wide-angle end according to a numerical example 3 of the invention.
Figure 10A:
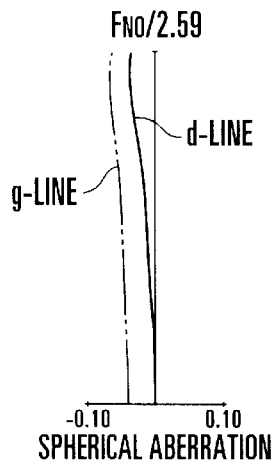
FIGS. 10A to 10D are graphs showing aberration curves at the wide-angle end in the zoom lens according to the numerical example 3 of the invention.
Figure 10B:
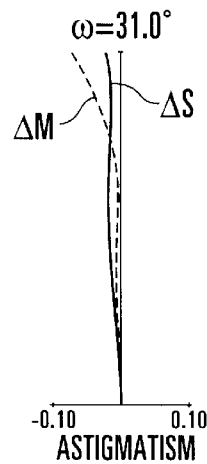
Figure 10C:
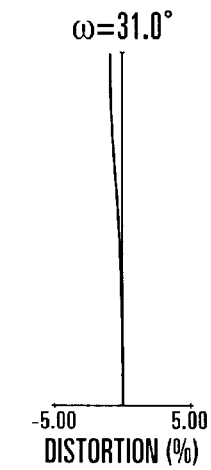
Figure 10D:
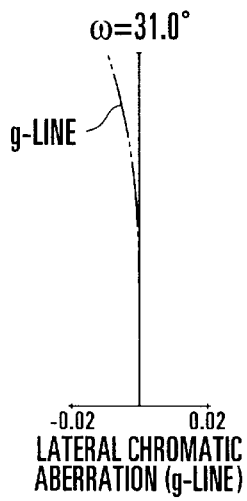
Figure 11A:
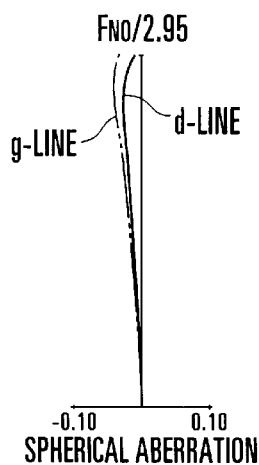
FIGS. 11A to 11D are graphs showing aberration curves at the middle focal length position in the zoom lens according to the numerical example 3 of the invention.
Figure 11B:
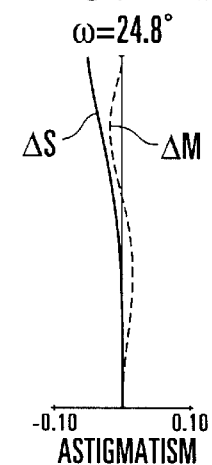
Figure 11C:
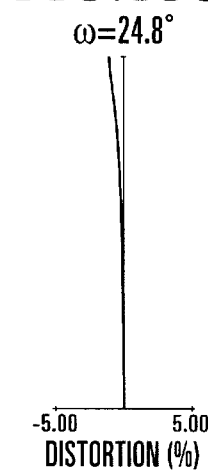
Figure 11D:
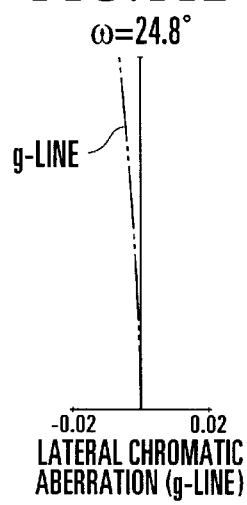
Figure 12A:
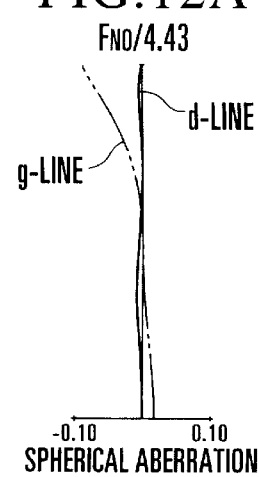
FIGS. 12A to 12D are graphs showing aberration curves at the telephoto end in the zoom lens according to the numerical example 3 of the invention.
Figure 12B:
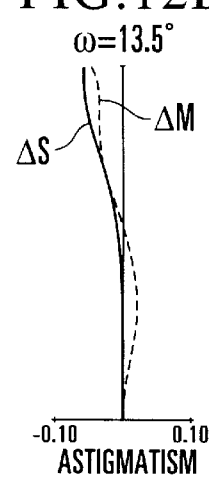
Figure 12C:
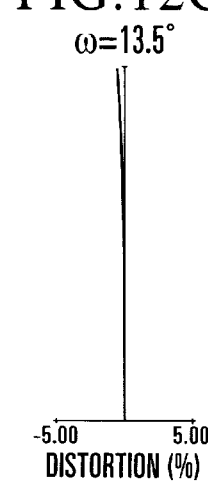
Figure 12D:
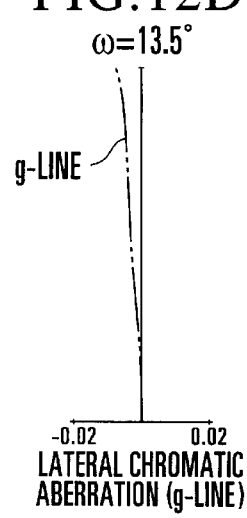

In the zoom lens according to the numerical example 3 shown in FIG. 9, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side.

Further, the second lens unit L2 of positive refractive power is composed of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses. Further, the third lens unit L3 of positive refractive power is composed of a positive lens 31 of meniscus form having a concave surface facing the image side.

Figure 13:
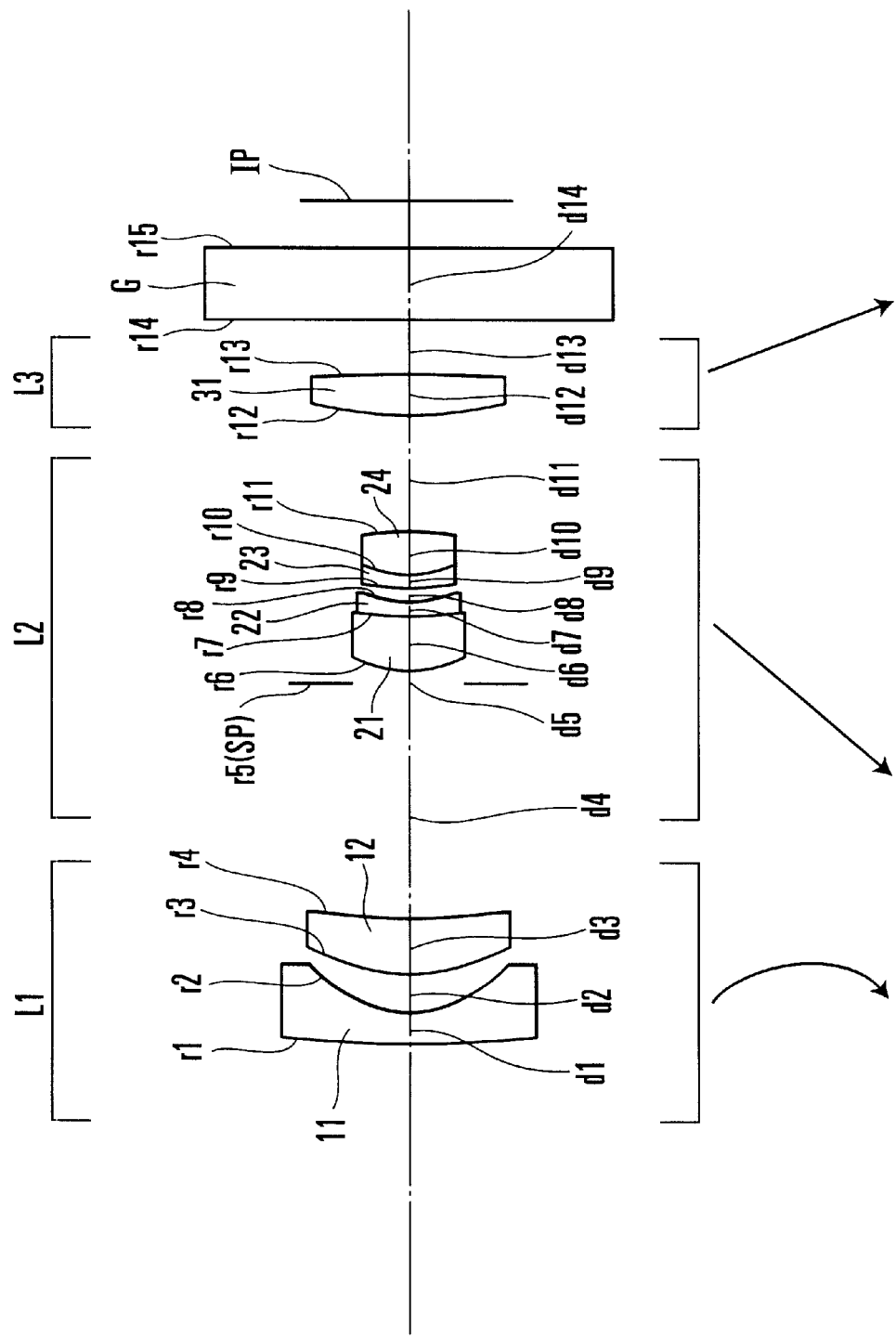
FIG. 13 is a lens block diagram showing a zoom lens at the wide-angle end according to a numerical example 4 of the invention.
Figure 14A:
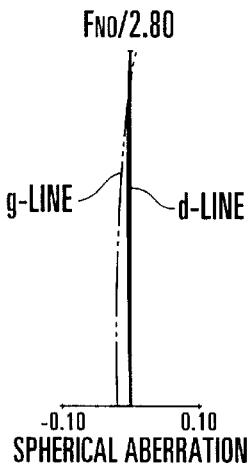
FIGS. 14A to 14D are graphs showing aberration curves at the wide-angle end in the zoom lens according to the numerical example 4 of the invention.
Figure 14B:
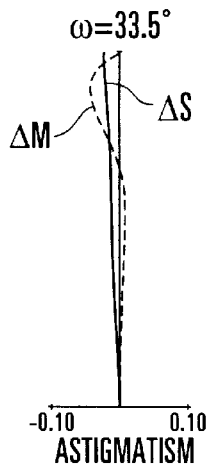
Figure 14C:
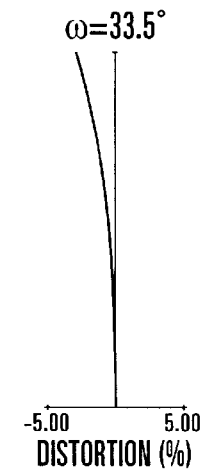
Figure 14D:
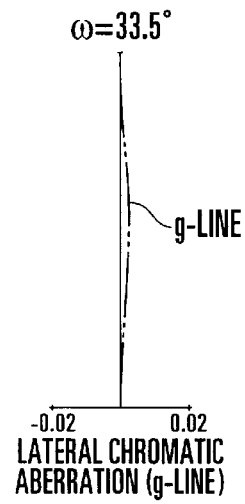
Figure 15A:
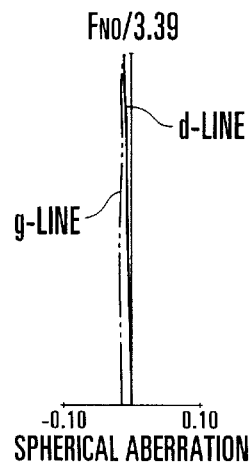
FIGS. 15A to 15D are graphs showing aberration curves at the middle focal length position in the zoom lens according to the numerical example 4 of the invention.
Figure 15B:
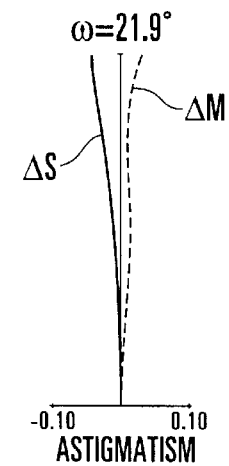
Figure 15C:
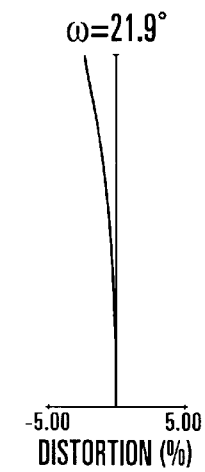
Figure 15D:
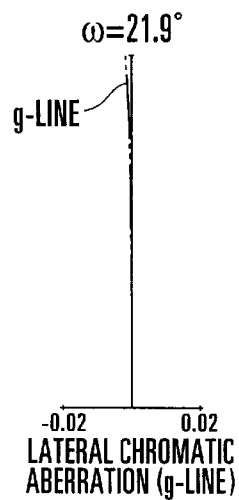
Figure 16A:
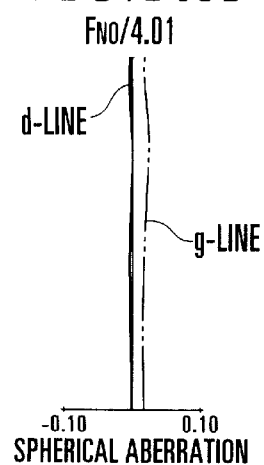
FIGS. 16A to 16D are graphs showing aberration curves at the telephoto end in the zoom lens according to the numerical example 4 of the invention.
Figure 16B:
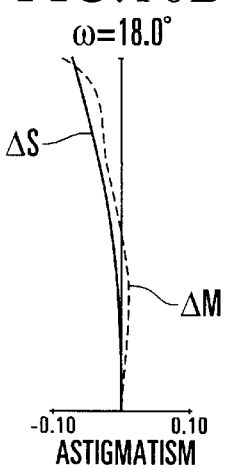
Figure 16C:
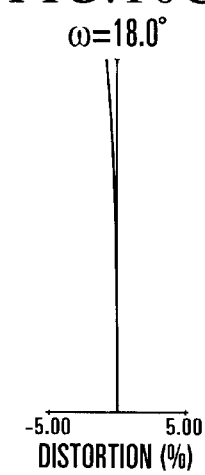
Figure 16D:
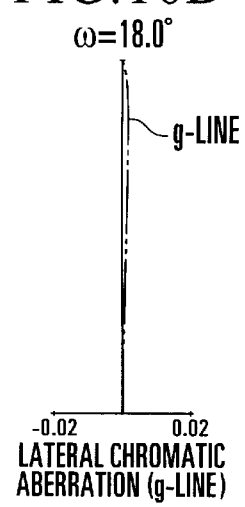

In the zoom lens according to the numerical example 4 shown in FIG. 13, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side.

Further, the second lens unit L2 of positive refractive power is composed of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses. Further, the third lens unit L3 of positive refractive power is composed of a positive lens 31 of bi-convex form.

Figure 17:
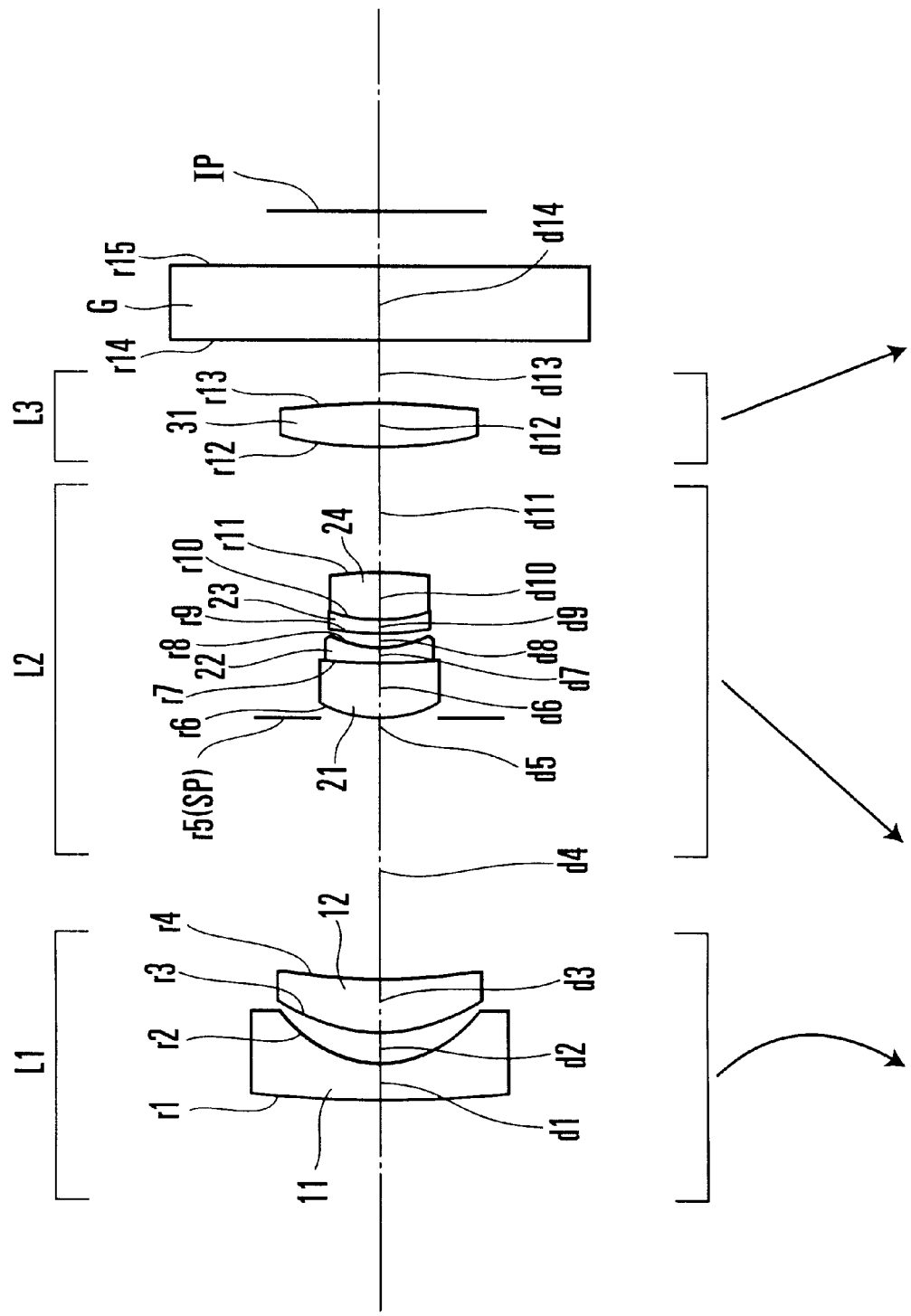
FIG. 17 is a lens block diagram showing a zoom lens at the wide-angle end according to a numerical example 5 of the invention.
Figure 18A:
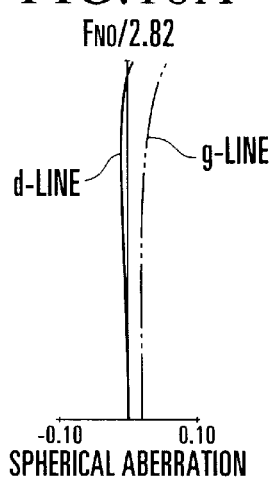
FIGS. 18A to 18D are graphs showing aberration curves at the wide-angle end in the zoom lens according to the numerical example 5 of the invention.
Figure 18B:
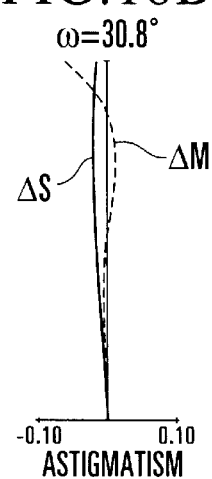
Figure 18C:
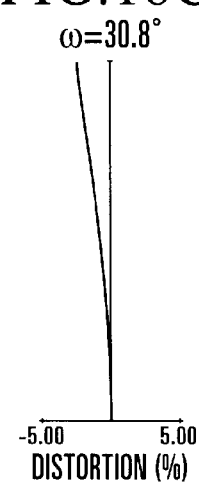
Figure 18D:
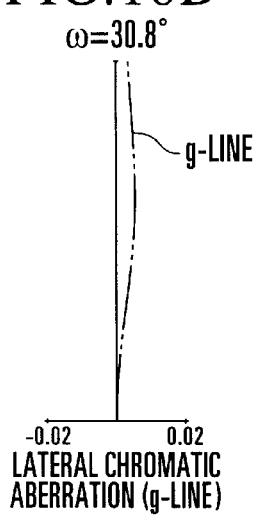
Figure 19A:
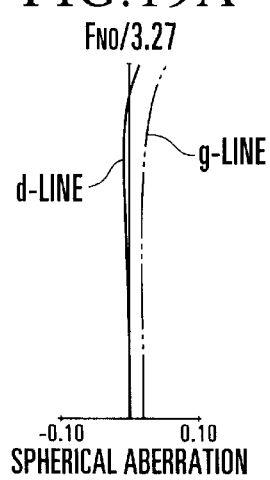
FIGS. 19A to 19D are graphs showing aberration curves at the middle focal length position in the zoom lens according to the numerical example 5 of the invention.
Figure 19B:
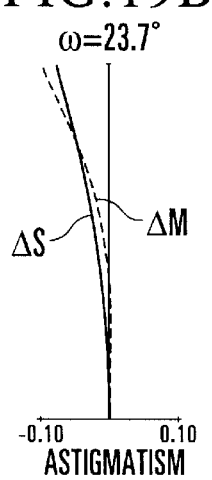
Figure 19C:
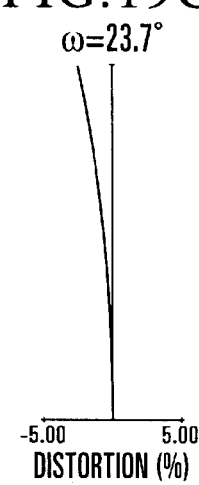
Figure 19D:
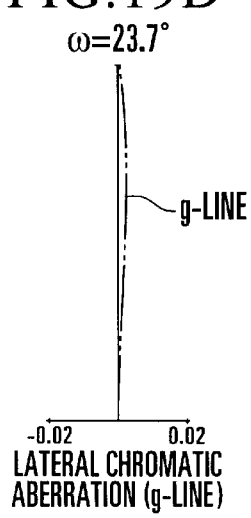
Figure 20A:
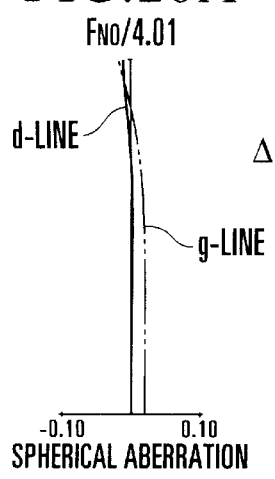
FIGS. 20A to 20D are graphs showing aberration curves at the telephoto end in the zoom lens according to the numerical example 5 of the invention.
Figure 20B:
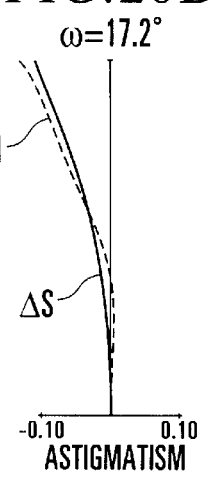
Figure 20C:
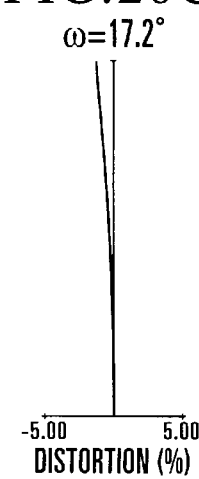
Figure 20D:
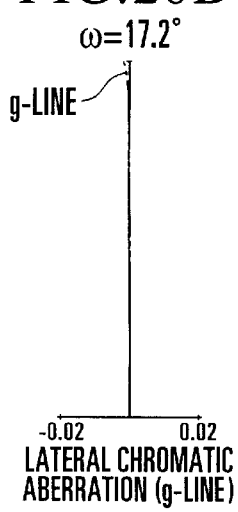

In the zoom lens according to the numerical example 5 shown in FIG. 17, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side.

Further, the second lens unit L2 of positive refractive power is composed of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses. Further, the third lens unit L3 of positive refractive power is composed of a positive lens 31 of bi-convex form.

Figure 21:
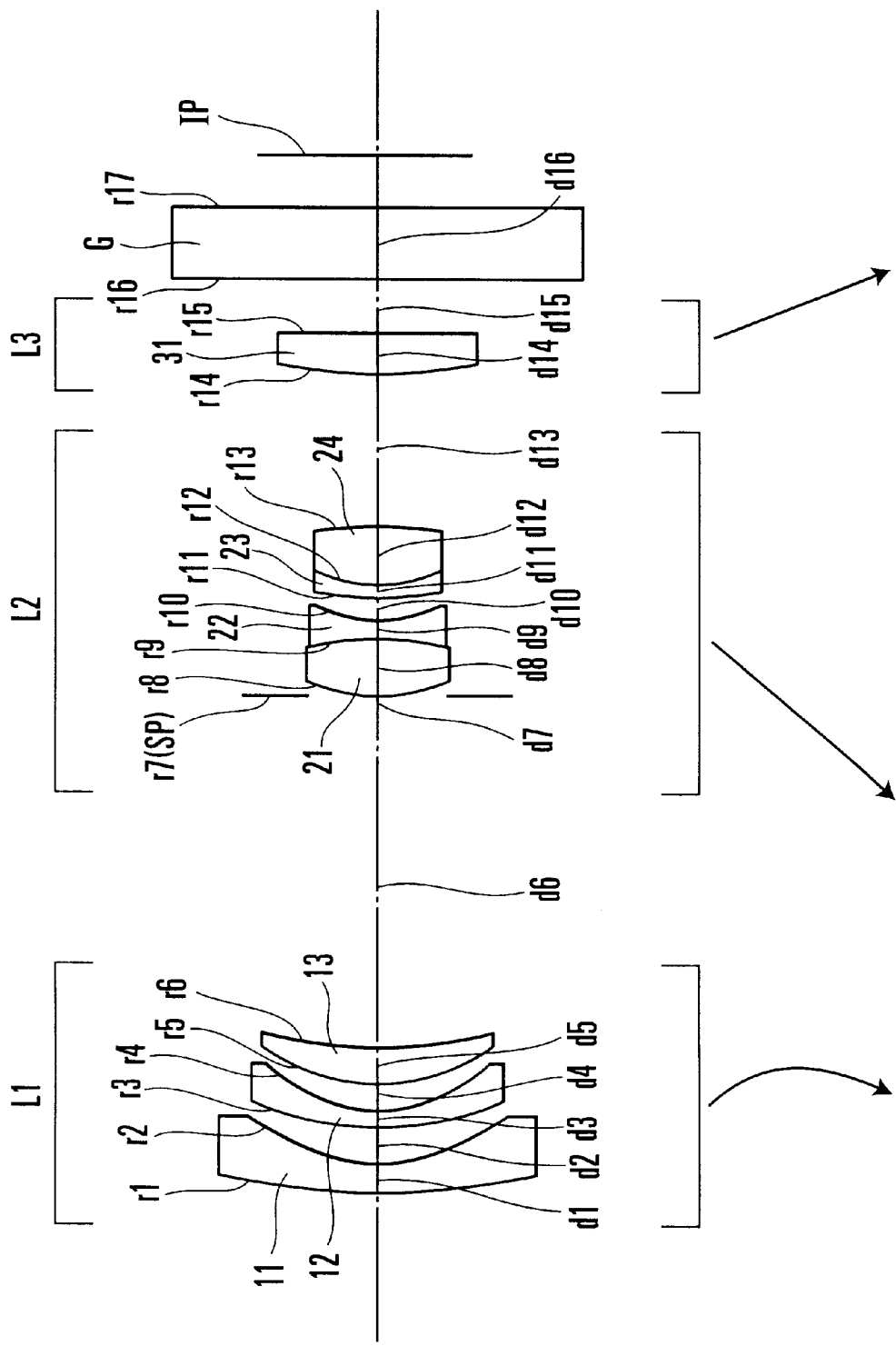
FIG. 21 is a lens block diagram showing a zoom lens at the wide-angle end according to a numerical example 6 of the invention.
Figure 22A:
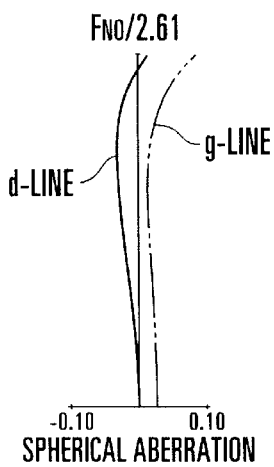
FIGS. 22A to 22D are graphs showing aberration curves at the wide-angle end in the zoom lens according to the numerical example 6 of the invention.
Figure 22B:
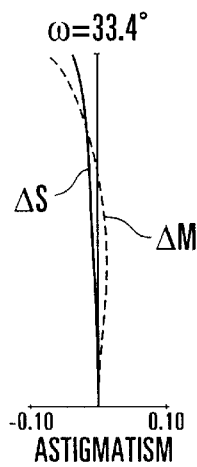
Figure 22C:
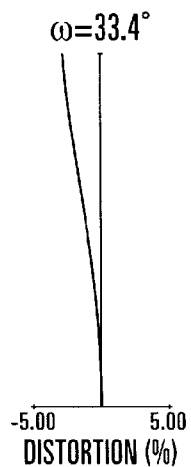
Figure 22D:
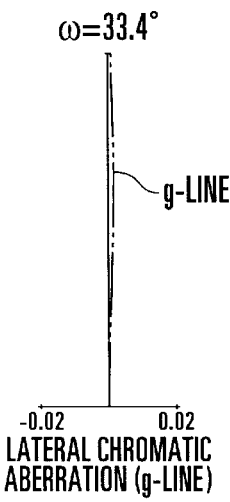
Figure 23A:
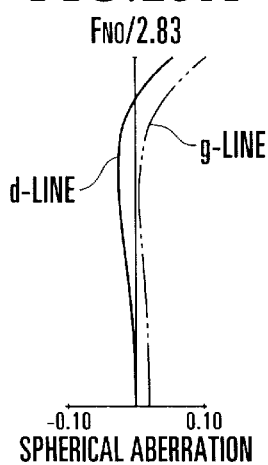
FIGS. 23A to 23D are graphs showing aberration curves at the middle focal length position in the zoom lens according to the numerical example 6 of the invention.
Figure 23B:
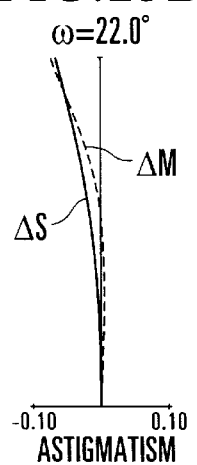
Figure 23C:
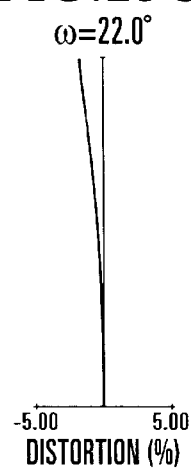
Figure 23D:
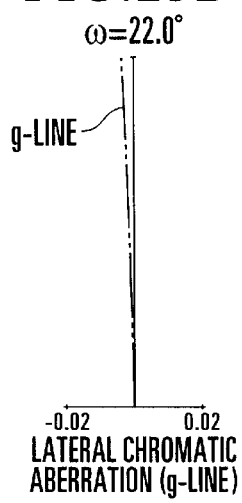
Figure 24A:
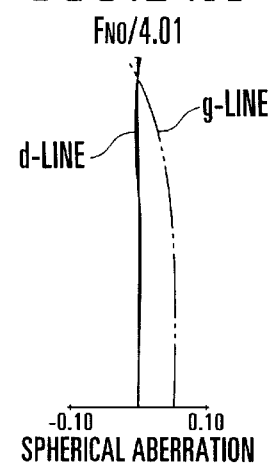
FIGS. 24A to 24D are graphs showing aberration curves at the telephoto end in the zoom lens according to the numerical example 6 of the invention.
Figure 24B:
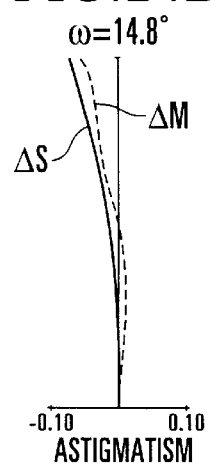
Figure 24C:
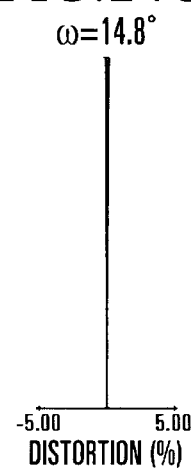
Figure 24D:
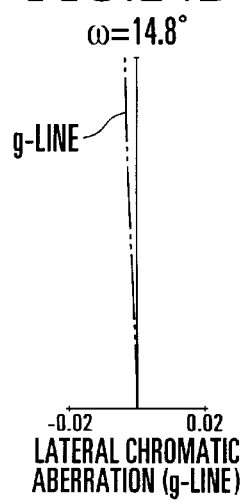

In the zoom lens according to the numerical example 6 shown in FIG. 21, the first lens unit L1 of negative refractive power is composed of three lenses, i.e., in order from the object side to the image side, a negative lens 11 of meniscus form having a concave surface facing the image side, a negative lens 12 of meniscus form having a concave surface facing the image side, and a positive lens 13 of meniscus form having a convex surface facing the object side.

Further, the second lens unit L2 of positive refractive power is composed of four lenses, i.e., in order from the object side to the image side, a positive lens 21 of bi-convex form, a negative lens 22 of bi-concave form, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses. Further, the third lens unit L3 of positive refractive power is composed of a positive lens 31 of bi-convex form.

Figure 25:
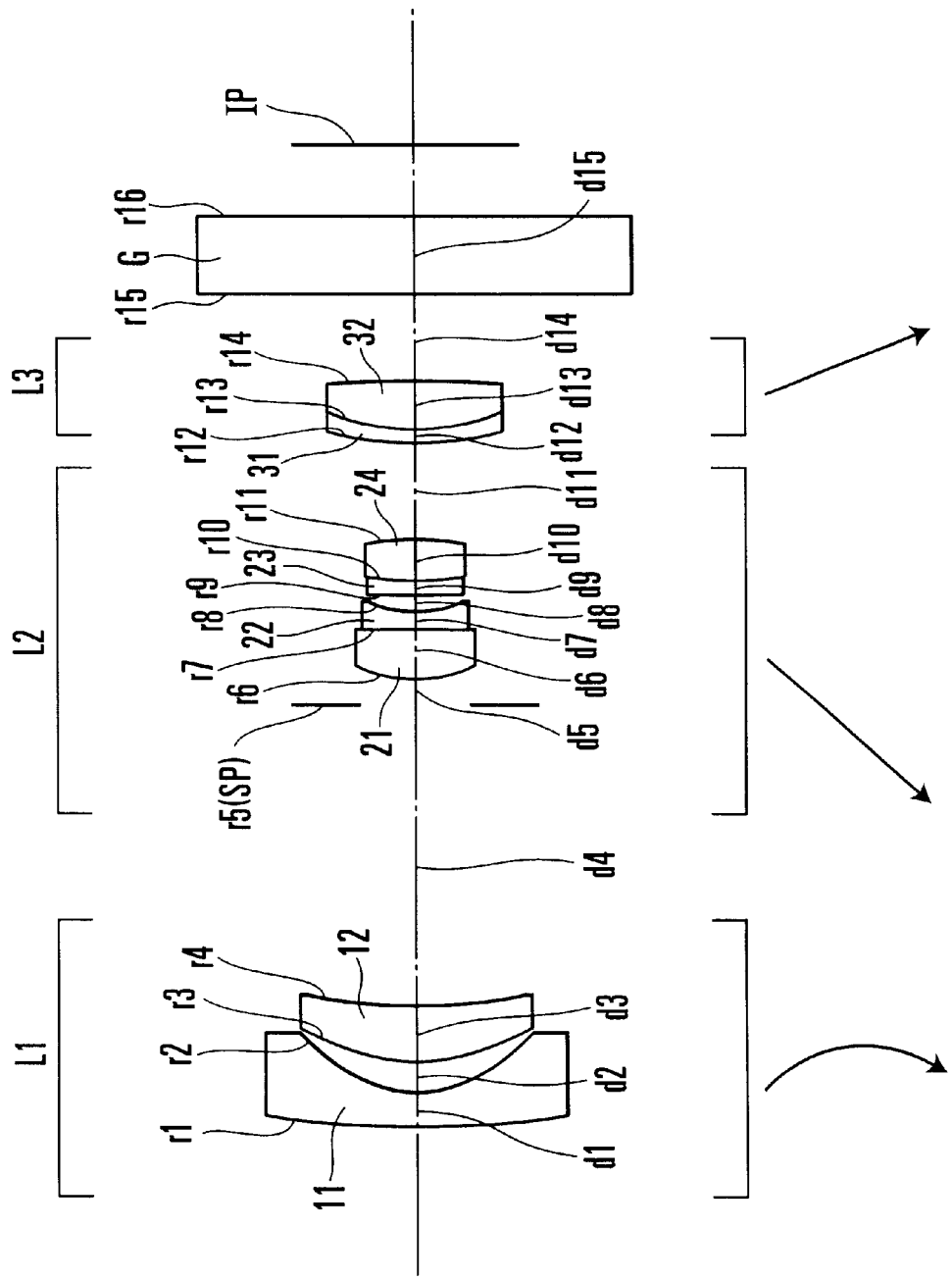
FIG. 25 is a lens block diagram showing a zoom lens at the wide-angle end according to a numerical example 7 of the invention.
Figure 26A:
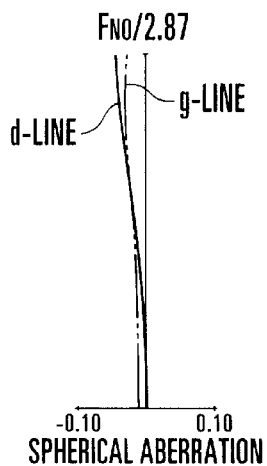
FIGS. 26A to 26D are graphs showing aberration curves at the wide-angle end in the zoom lens according to the numerical example 7 of the invention.
Figure 26B:
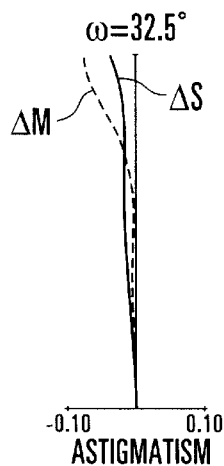
Figure 26C:
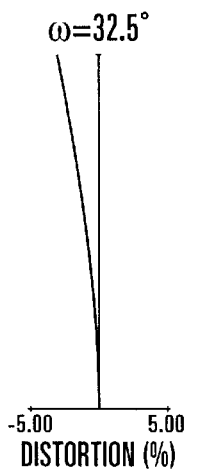
Figure 26D:
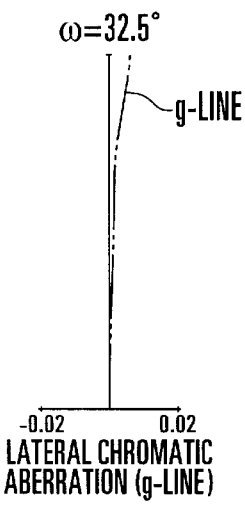
Figure 27A:
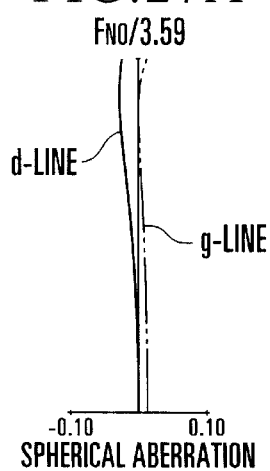
FIGS. 27A to 27D are graphs showing aberration curves at the middle focal length position in the zoom lens according to the numerical example 7 of the invention.
Figure 27B:
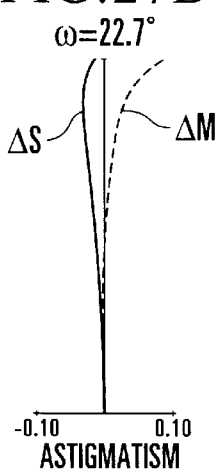
Figure 27C:
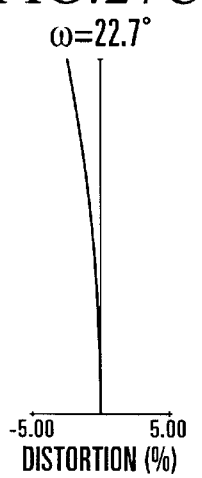
Figure 27D:
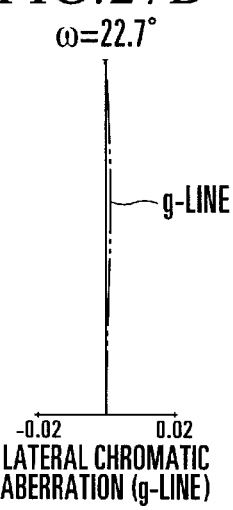
Figure 28A:
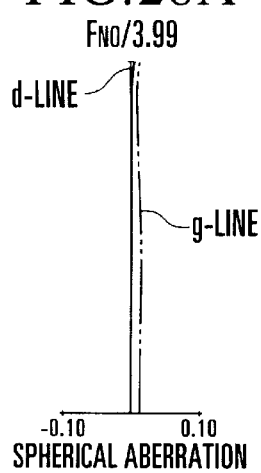
FIGS. 28A to 28D are graphs showing aberration curves at the telephoto end in the zoom lens according to the numerical example 7 of the invention.
Figure 28B:
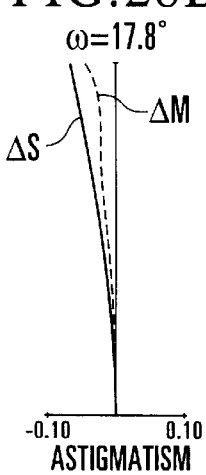
Figure 28C:
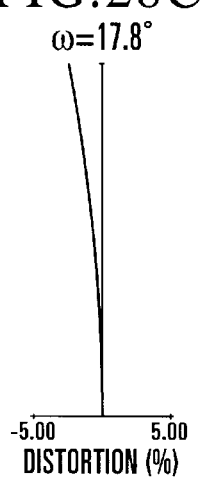
Figure 28D:
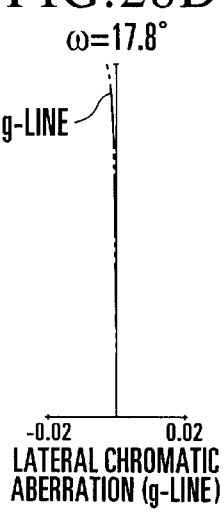
Figure 30A:
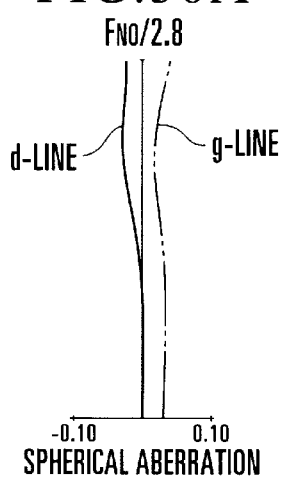
FIGS. 30A to 30D are graphs showing aberration curves at the wide-angle end in the zoom lens according to the numerical example 8 of the invention.
Figure 30B:
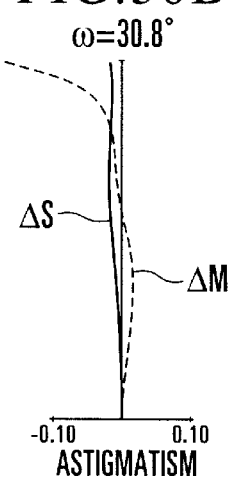
Figure 30C:
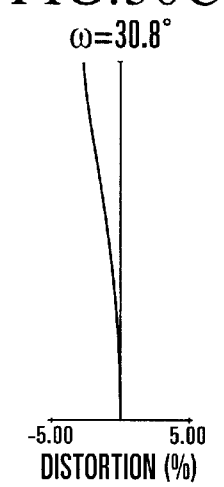
Figure 30D:
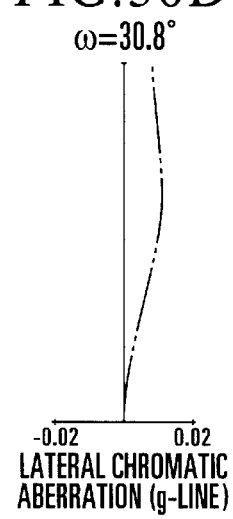
Figure 31A:
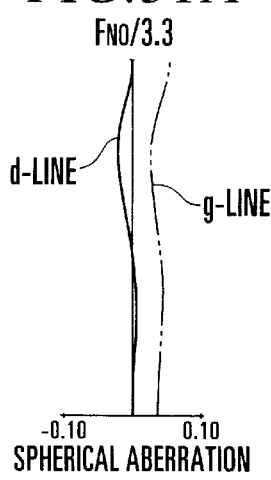
FIGS. 31A to 31D are graphs showing aberration curves at the middle focal length position in the zoom lens according to the numerical example 8 of the invention.
Figure 31B:
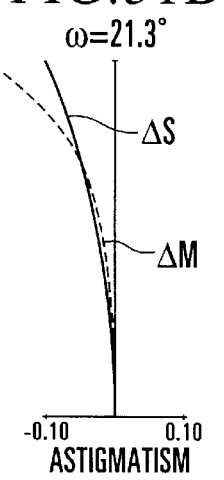
Figure 31C:
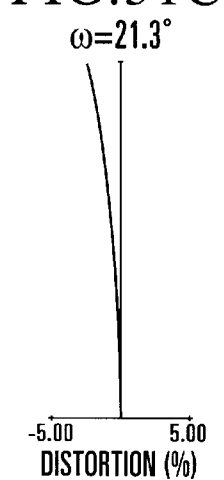
Figure 31D:
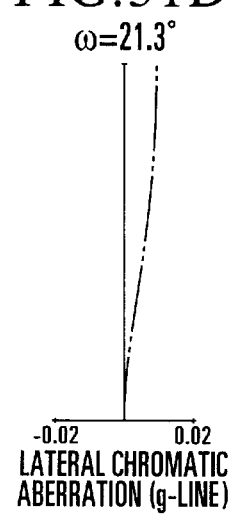
Figure 32A:
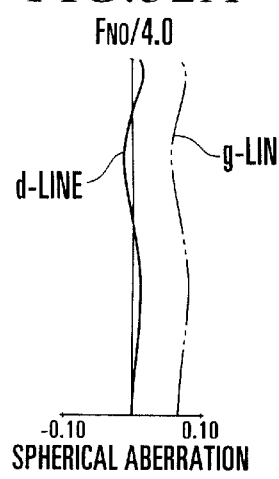
FIGS. 32A to 32D are graphs showing aberration curves at the telephoto end in the zoom lens according to the numerical example 8 of the invention.
Figure 32B:
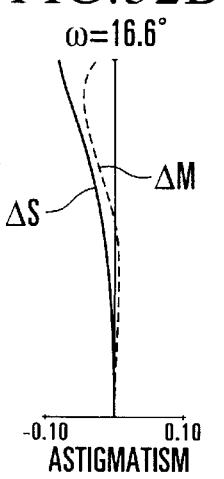
Figure 32C:
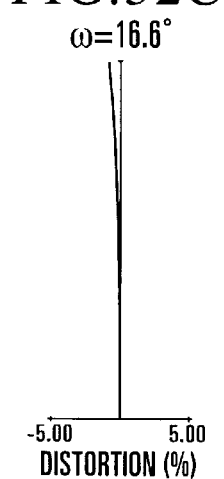
Figure 32D:
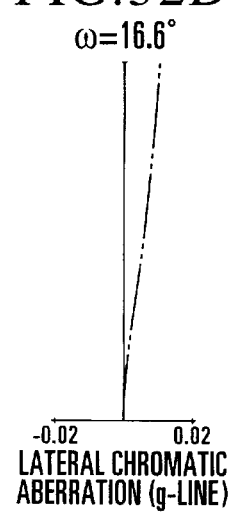

In the zoom lens according to the numerical example 7 shown in FIG. 25, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side. The second lens unit L2 of positive refractive power is composed of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form. Then, the positive lens 21 and the negative lens 22 are formed into a cemented lens and the negative lens 23 and the positive lens 24 are formed into a cemented lens, so that the second lens unit L2 is composed of two cemented lenses.

Further, the third lens unit L3 of positive refractive power is composed of a negative lens 31 of meniscus form having a convex surface facing the object side, and a positive lens 32 of bi-convex form.

In the zoom lens according to the numerical example 8 shown in FIG. 29, the first lens unit L1 of negative refractive power is composed of two lenses, i.e., in order from the object side to the image side, a negative lens 11 of meniscus form having a concave surface facing the image side, and a positive lens 12 of meniscus form having a convex surface facing the object side. The second lens unit L2 of positive refractive power is composed of five lenses, i.e., in order from the object side to the image side, a positive lens 21 having a convex surface facing the object side which is stronger in power than an opposite surface thereof, a negative lens 22 having a concave surface facing the image side which is stronger in power than an opposite surface thereof, a negative lens 23 of meniscus form having a convex surface facing the object side, a positive lens 24 of bi-convex form, and a negative lens 25 of meniscus form having a convex surface facing the object side. Then, the positive lens 21 and the negative lens 22 are formed into a cemented lens and the negative lens 23 and the positive lens 24 are formed into a cemented lens, so that the second lens unit L2 is composed of two cemented lenses and one negative lens.

Further, the third lens unit L3 of positive refractive power is composed of a positive lens 31 of meniscus form having a convex surface facing the object side.

As described above, in the embodiment 2A, the respective lens units are formed into such a lens construction as to make the desired refractive power arrangement and the correction of aberrations compatible with each other, so that it is possible to attain the compactness of the entire lens system while keeping good optical performance.

In the lens construction of the embodiment 2A, the first lens unit L1 has the role of causing an off-axial principal ray to be pupil-imaged on the center of the stop SP. In particular, since the amount of refraction of the off-axial principal ray is large on the wide-angle side, the various off-axial aberrations, particularly, astigmatism and distortion, tend to occur.

Therefore, in the zoom lens according to each of the numerical examples 3, 4, 5, 7 and 8, similarly to the ordinary wide-angle lens, the first lens unit L1 is made to have such a construction as to be composed of two lenses, i.e., a negative lens and a positive lens, which can suppress the increase of the diameter of a lens disposed on the most object side.

Then, according to necessity, a lens surface on the image side of the negative lens 11 of meniscus form is formed into such an aspheric surface that a negative refractive power becomes progressively weaker toward a marginal portion of the lens surface. Accordingly, astigmatism and distortion are corrected in a well-balanced manner, and the first lens unit L1 is composed of such a small number of lens elements as two, so that the compactness of the entire lens system can be attained.

Further, lenses constituting the first lens unit L1 have respective shapes close to concentric spherical surfaces centered on a point at which the stop and the optical axis intersect, so as to suppress the occurrence of off-axial aberration caused by the refraction of an off-axial principal ray.

In the second lens unit L2, the positive lens 21 having a convex surface facing the object side which is stronger in power than an opposite surface thereof is disposed on the most object side of the second lens unit, so that the second lens unit L2 has such a shape as to lessen the angle of refraction of an off-axial principal ray having exited from the first lens unit L1, thereby preventing the various off-axial aberrations from occurring.

Further, the positive lens 21 is a lens arranged to allow an on-axial ray to pass at the largest height, and is concerned with the correction of, mainly, spherical aberration and coma.

Further, it is preferable that a lens surface on the object side of the positive lens 21 is formed into such an aspheric surface that a positive refractive power becomes progressively weaker toward a marginal portion of the lens surface. By this arrangement, it becomes easy to correct spherical aberration and coma.

The negative lens 22 disposed on the image side of the positive lens 21 is made to have a concave surface facing the image side, so that a negative air lens is formed by the concave surface on the image side of the negative lens 22 and a convex surface on the object side of the negative lens 23, which is disposed subsequent to the negative lens 22. Accordingly, it is possible to correct spherical aberration occurring due to the increase of an aperture ratio.

Further, it is preferable that a lens surface on the image side of the positive lens 24 disposed on the most image side in the second lens unit is formed into such an aspheric surface that a positive refractive power becomes progressively stronger toward a marginal portion of the lens surface. By this arrangement, it is possible to effectively correct spherical aberration, which becomes conspicuous due to the increase of an aperture ratio.

In addition, in the embodiment 2A, in order to cope with the reduction of the amount of chromatic aberration, which is required according to the increased number of pixels and the minimization of cell pitches of a solid-state image sensor such as a CCD, the second lens unit L2 is made to be composed of two cemented lenses. By this arrangement, it is possible to correct well longitudinal chromatic aberration and lateral chromatic aberration.

In a case where the second lens unit L2 is composed of the so-called triplet-type system, a single negative lens component is required to have a glass thickness greater than a certain degree, so as to correct well off-axial flare or to correct well spherical aberration due to two air lenses of negative refractive power provided before and behind the negative lens component. Thus, in a case where the second lens unit L2 is composed of the triplet-type system, the thickness on the optical axis of the second lens unit L2 increases inevitably. On the other hand, according to the embodiment 2A, the second lens unit L2 is composed of two cemented lenses, i.e., a refractive power of a single negative lens component in the triplet-type system is separated into two components. Accordingly, as compared with a case where the correction of aberration is performed by the single negative lens component, the degree of freedom of the correction of aberration is increased, so that, as a result, the thickness on the optical axis of the second lens unit L2 decreases. Thus, the second lens unit L2 being composed of two cemented lenses contributes greatly also to the shortening of the entire optical system and the shortening of the total length of the lens system as retracted.

The third lens unit L3 is constructed with a positive lens 31 having a convex surface facing the object side, or is constructed with a cemented lens composed of a negative lens 31 and a positive lens 32, thereby serving also as a field lens for making the zoom lens telecentric on the image side. In addition, in the embodiment 2A, a lens surface on the object side of the positive lens 31 is formed into such an aspheric surface that a positive refractive power becomes progressively weaker toward a marginal portion of the lens surface, thereby contributing to the correction of the various off-axial aberrations over the entire zooming range.

Now, when the back focal distance is denoted by sk', the focal length of the third lens unit is denoted by f3, and the image magnification of the third lens unit is denoted by β3, the following relation is obtained:

$$sk'=f3(1-\beta 3)$$

provided that 0<β3<1.0.

Here, when the third lens unit is moved toward the image side during the variation of magnification from the wide-angle end to the telephoto end, the back focal distance sk' decreases, so that the image magnification β3 of the third lens unit increases on the telephoto side.

Then, as a result, the third lens unit shares the variation of magnification with the second lens unit, so that the amount of movement of the second lens unit is reduced. Therefore, since such a space for the movement of the second lens unit can be saved, the third lens unit contributes to the reduction in size of the lens system.

When a close-distance object is to be photographed by using the zoom lens according to the embodiment 2A, good optical performance can be obtained by moving the first lens unit toward the object side. However, it is preferable to move the third lens unit also toward the object side.

This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

Further, in a case where focusing is performed by using the third lens unit, if the third lens unit is arranged to be moved toward the image side during the variation of magnification from the wide-angle end to the telephoto end, the telephoto end, at which the amount of movement for focusing is large, can be located on the image side. Accordingly, it becomes possible to minimize the amount of total movement of the third lens unit required for zooming and focusing. This arrangement makes it possible to attain the compactness of the entire lens system.

In addition, in the zoom lens having three lens units of negative, positive and positive refractive powers, respectively, according to the embodiment 2A, in order to obtain good optical performance or in order to attain the reduction of the size of the entire lens system, it is preferable that at least one of the following conditions is satisfied.

(A-1) When the first lens unit is made to have a two-component construction, it is preferable to satisfy the following conditions:

$$ndn1 > 1.70 \quad (1)$$

$$vdn1 > 35.0 \quad (2)$$

where ndn1 and vdn1 are a refractive index and Abbe number, respectively, of material of a negative lens included in the first lens unit.

If the upper limit of the condition (1) is exceeded, the Petzval sum of the first lens unit increases in the positive direction, so that it becomes difficult to correct curvature of field.

Further, if the upper limit of the condition (2) is exceeded, it becomes disadvantageously difficult to correct lateral chromatic aberration at the wide-angle end, in particular.

(A-2) It is preferable to make the cemented lens disposed on the most object side of the second lens unit have such a shape as to satisfy the following condition:

$$0 < (R21 - R23)/(R21 + R23) < 0.1 \quad (3)$$

where R21 is a radius of paraxial curvature of a lens surface on the object side of the positive lens 21, and R23 is a radius of curvature of a lens surface on the image side of the negative lens 22.

If the upper limit of the condition (3) is exceeded, the Petzval sum of the second lens unit increases in the negative direction, so that it becomes difficult to correct curvature of field.

If the lower limit of the condition (3) is exceeded, it becomes disadvantageously difficult to correct spherical aberration and coma.

(A-3) In order to shorten the total length of the optical system and to shorten the total length of the entire lens system obtained when the lens system is retracted, it is preferable to satisfy the following condition:

$$0.1 < |X1/X3| < 7.0 \quad (4)$$

where X1 is a maximum amount of movement of the first lens unit from the wide-angle end toward the image side during the variation of magnification from the wide-angle end to the telephoto end, and X3 is an amount of movement on the optical axis of the third lens unit during the variation of magnification from the wide-angle end to the telephoto end when an object distance is infinity.

If the lower limit of the condition (4) is exceeded, the amount of movement of the third lens unit on the optical axis increases, and it becomes necessary to lengthen the motor shaft for moving the third lens unit, so that it becomes disadvantageously difficult to shorten the total length of the lens system as retracted.

If the upper limit of the condition (4) is exceeded, the locus of the first lens unit convex toward the image side during the variation of magnification becomes sharp, and the angle of a cam locus for the first lens unit leading from the wide-angle end to the telephoto end becomes large, so that the total length of the lens system as retracted is caused to become large disadvantageously.

(A-4) In order to shorten the total length of the optical system and to shorten the total length of the entire lens system obtained when the lens system is retracted, it is preferable to satisfy the following condition:

$$0.25 < (L1 + L2 + L3)/L < 0.45 \quad (5)$$

where L is a distance, at the telephoto end, from a vertex on the object side of a lens disposed on the most object side of the first lens unit to an image plane, L1 is a distance from the vertex on the object side of the lens disposed on the most object side of the first lens unit to a vertex on the image side of a lens disposed on the most image side of the first lens unit, L2 is a distance from a vertex on the object side of a lens disposed on the most object side of the second lens unit to a vertex on the image side of a lens disposed on the most image side of the second lens unit, and L3 is a distance from a vertex on the object side of a lens disposed on the most object side of the third lens unit to a vertex on the image side of a lens disposed on the most image side of the third lens unit.

If the upper limit of the condition (5) is exceeded, although the total length of the optical system at the telephoto end becomes short, the sum of lengths of the respective lens units on the optical axis becomes large, so that the total length of the entire lens system as retracted becomes long disadvantageously.

If the lower limit of the condition (5) is exceeded, although the sum of lengths of the respective lens units on the optical axis becomes small, the total length of the optical system at the telephoto end becomes long, and the amount of movement of each lens unit is necessarily increased. Therefore, the length of a cam ring or the like for moving each lens unit becomes long, and, as a result, the total length of the entire lens system as retracted does not become short.

(A-5) It is preferable to satisfy the following conditions:

$$nd22 < 1.75 \quad (6)$$

$$vd22 < 50.0 \quad (7)$$

where nd22 and vd22 are a refractive index and Abbe number, respectively, of material of the negative lens 22 disposed on the most object side among negative lenses in the second lens unit.

If the upper limit of the condition (6) is exceeded, the Petzval sum of the second lens unit increases in the positive direction, so that it becomes difficult to correct curvature of field.

Further, if the upper limit of the condition (7) is exceeded, it becomes disadvantageously difficult to correct longitudinal chromatic aberration at the telephoto end.

(A-6) It is preferable to satisfy the following condition:

$$0.05 < \Sigma A2/\Sigma D2 < 0.3 \quad (8)$$

where $\Sigma D2$ is the sum of thicknesses on the optical axis of lenses constituting the second lens unit, and $\Sigma A2$ is the sum of air separations included in the second lens unit. By this arrangement, it is possible to make the compactness of the optical system and the attainment of good optical performance compatible with each other.

If the upper limit of the condition (8) is exceeded, the length of the second lens unit on the optical axis becomes long, so that it becomes disadvantageously difficult to attain the compactness of the optical system.

If the lower limit of the condition (8) is exceeded, the power of the air lens becomes small, so that it becomes disadvantageously difficult to correct spherical aberration.

(Embodiment 2B)

Next, the lens construction of a zoom lens having three lens units of negative, positive and positive refractive powers, respectively, in order from the object side to the image side according to the embodiment 2B will be described.

Figure 33:
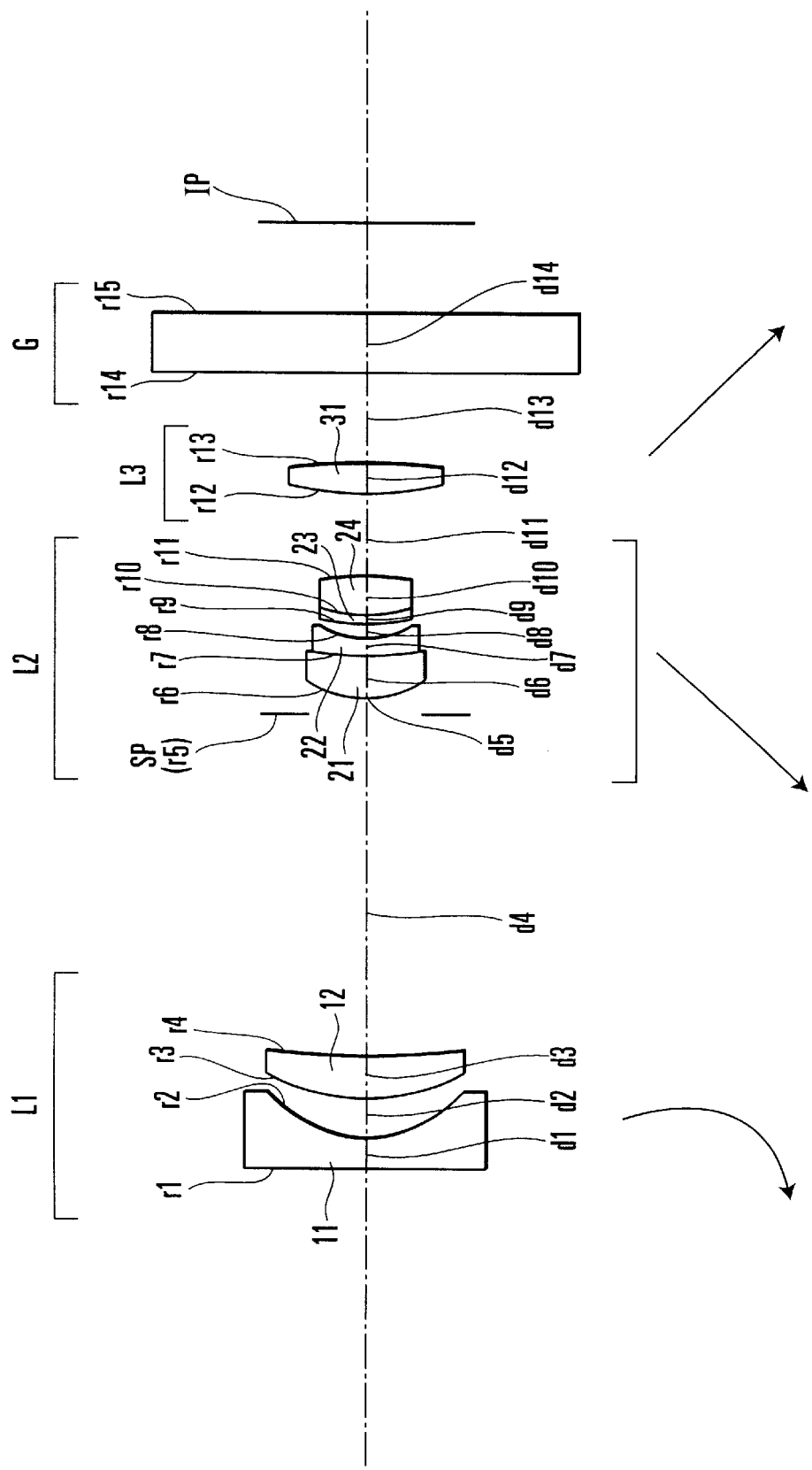
FIG. 33 is a lens block diagram showing a zoom lens at the wide-angle end according to a numerical example 9 of the invention.
Figure 37:
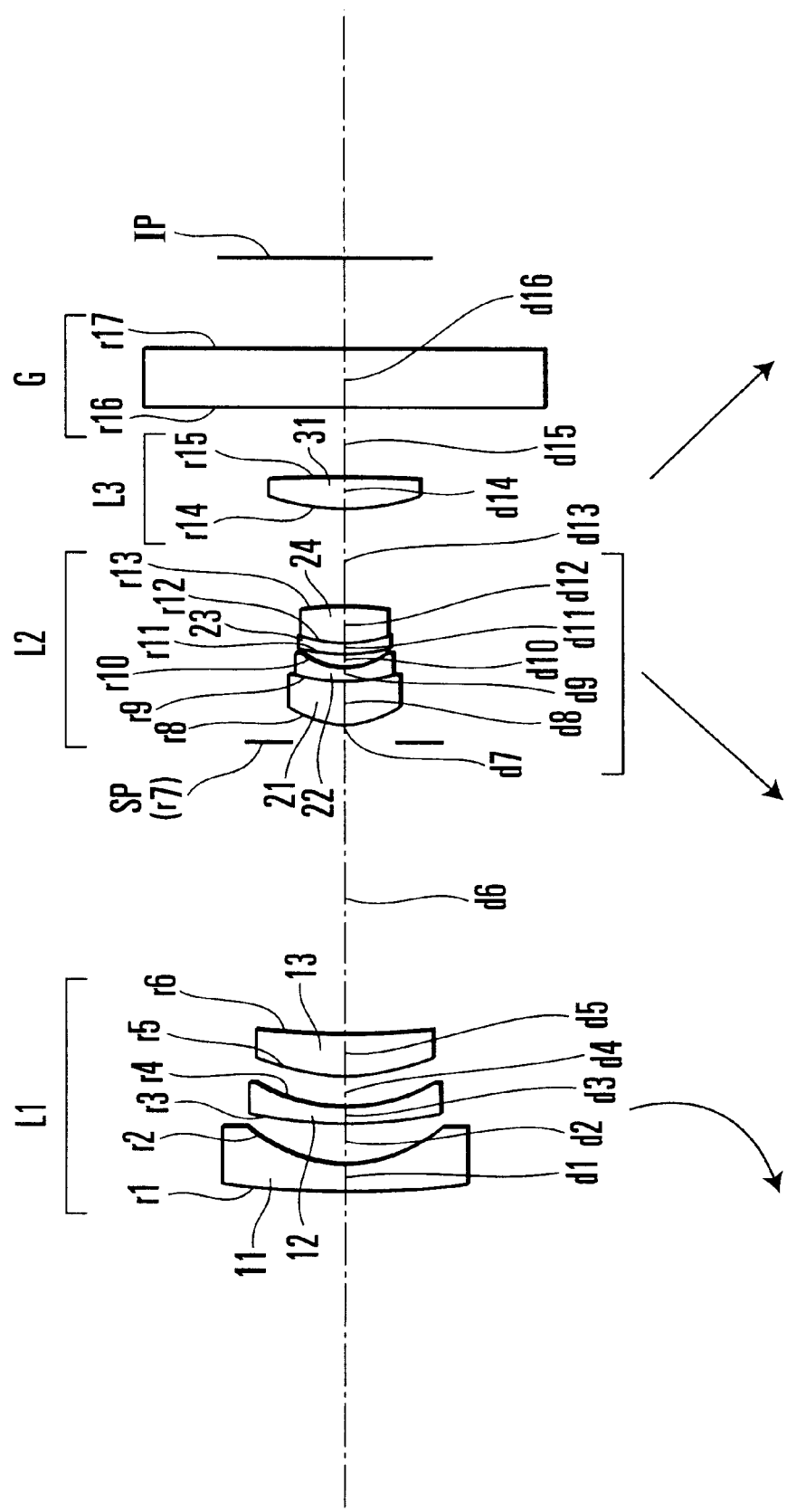
FIG. 37 is a lens block diagram showing a zoom lens at the wide-angle end according to a numerical example 10 of the invention.
Figure 41:
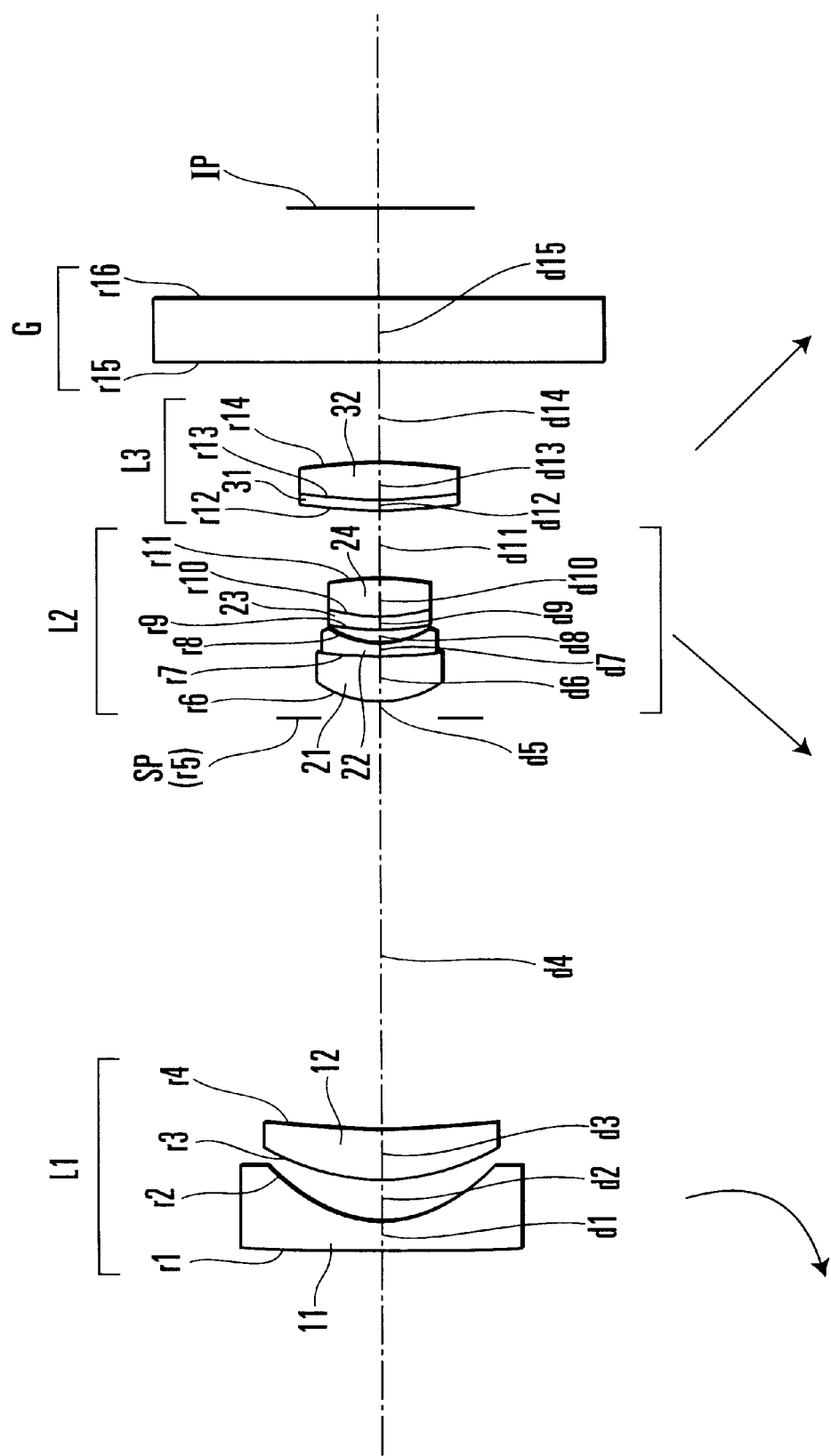
FIG. 41 is a lens block diagram showing a zoom lens at the wide-angle end according to a numerical example 11 of the invention.
Figure 42A:
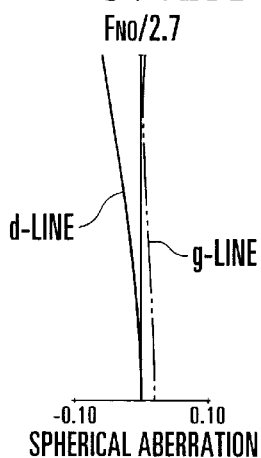
FIGS. 42A to 42D are graphs showing aberration curves at the wide-angle end in the zoom lens according to the numerical example 11 of the invention.
Figure 42B:
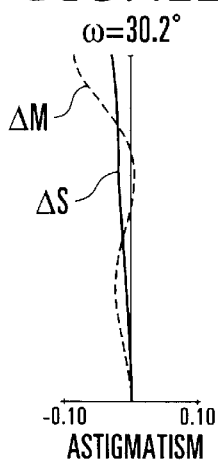
Figure 42C:
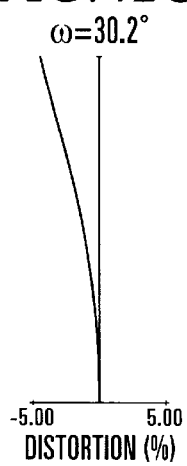
Figure 42D:
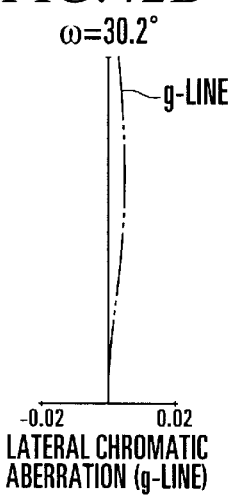
Figure 43A:
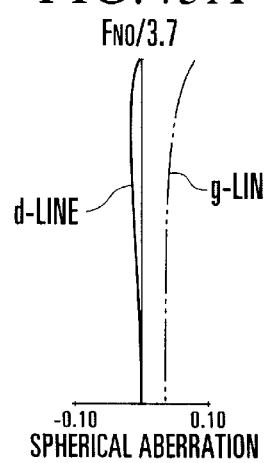
FIGS. 43A to 43D are graphs showing aberration curves at the middle focal length position in the zoom lens according to the numerical example 11 of the invention.
Figure 43B:
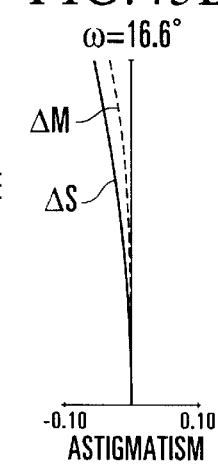
Figure 43C:
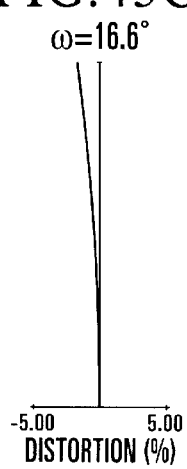
Figure 43D:
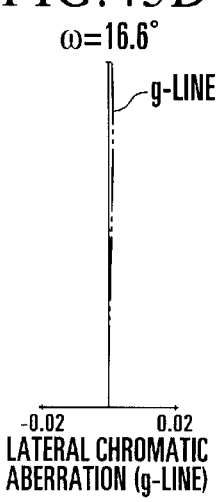
Figure 44A:
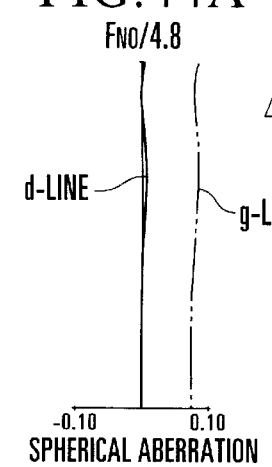
FIGS. 44A to 44D are graphs showing aberration curves at the telephoto end in the zoom lens according to the numerical example 11 of the invention.
Figure 44B:
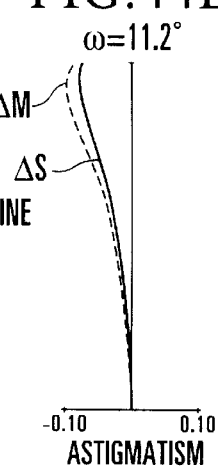
Figure 44C:
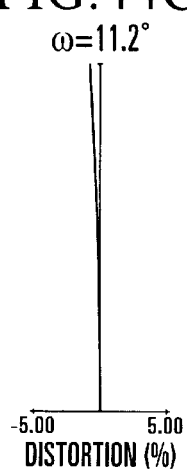
Figure 44D:
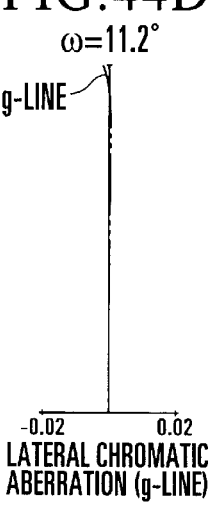

FIGS. 33, 37 and 41 are lens block diagrams showing zoom lenses at the wide-angle end according to the numerical examples 9 to 11 in the embodiment 2B.

The zoom lens according to the embodiment 2B comprises three lens units, i.e., in order from the object side to the image side, the first lens unit L1 of negative refractive power, the second lens unit L2 of positive refractive power and the third lens unit L3 of positive refractive power. During zooming from the wide-angle end to the telephoto end, the first lens unit, the second lens unit and the third lens unit each move. More specifically, the first lens unit makes a reciprocating motion convex toward the image side, the second lens unit moves toward the object side, and the third lens unit moves toward the image side or moves with a locus convex toward the object side.

In the zoom lens according to the embodiment 2B, the main variation of magnification is effected by moving the second lens unit while the shift of an image point (the variation of an image plane) due to the variation of magnification is compensated for by moving forward and backward the first lens unit and moving the third lens unit toward the image side or moving the third lens unit with a locus convex toward the object side.

The third lens unit shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, the telecentric image formation on the image side necessary for the photographing apparatus (optical apparatus) using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

The zoom lens according to the embodiment 2B is characterized in that the third lens unit has at least one positive lens, and the following conditions are satisfied:

$$ndp3<1.5 \tag{9}$$

$$vdp3>70.0 \tag{10}$$

where ndp3 and vdp3 are a refractive index and Abbe number, respectively, of material of the positive lens of the third lens unit.

The conditions (9) and (10) are provided mainly for correcting well curvature of field and lateral chromatic aberration. If the upper limit of the condition (9) is exceeded, the Petzval Sum increases in the negative direction, so that it becomes difficult to correct curvature of field. Further, if the upper limit of the condition (10) is exceeded, it becomes disadvantageously difficult to correct lateral chromatic aberration at the telephoto end.

In addition, with the zoom lens according to the embodiment 2B constructed as described in the foregoing, the primary object of the invention can be attained. However, in order to obtain better optical performance or in order to attain the reduction in size of the entire lens system, it is preferable to satisfy at least one of the following conditions (B-1) to (B-16).

(B-1) During the variation of magnification from the wide-angle end to the telephoto end, the first lens unit moves with a locus convex toward the image side, the second lens unit moves monotonically toward the object side, and the third lens unit moves toward the image side.

(B-2) The first lens unit consists of two lenses, i.e., a negative lens and a positive lens, and at least one surface of the negative lens of the first lens unit is an aspheric surface.

In the zoom lens according to the embodiment 2B, the first lens unit of negative refractive power has the role of causing an off-axial principal ray to be pupil-imaged on the center of a stop, and, particularly, on the wide-angle side, the amount of refraction of an off-axial principal ray is large. Therefore, in the first lens unit, the various off-axial aberrations, particularly, astigmatism and distortion, are apt to occur.

Accordingly, similarly to an ordinary wide-angle lens, the first lens unit is made to have the construction having a negative lens and a positive lens so as to prevent the diameter of a lens disposed on the most object side from increasing. Further, it is more preferable that a lens surface on the image side of the negative lens 11 of meniscus form is such an aspheric surface that a negative refractive power becomes progressively weaker toward a marginal portion of the lens surface. By this arrangement, astigmatism and distortion are corrected in a well-balanced manner, and the first lens unit is composed of such a small number of lenses as two, so that it becomes easy to make the entire lens system compact.

In addition, in the embodiment 2B, in order to prevent the occurrence of an off-axial aberration due to the refraction of an off-axial principal ray, each of lenses constituting the first lens unit has a lens surface approximate to concentric spherical surfaces having the center on a point at which the stop and the optical axis intersect.

(B-3) The following conditions are satisfied:

$$ndn1>1.70 \tag{11}$$

$$vdn1>35.0 \tag{12}$$

where ndn1 and vdn1 are a refractive index and Abbe number, respectively, of material of a negative lens included in the first lens unit.

The conditions (11) and (12) are provided for making the compactness of the entire lens system and the good imaging performance compatible with each other.

If the upper limit of the condition (11) is exceeded, the Petzval sum of the first lens unit increases in the positive direction, so that it becomes difficult to correct curvature of field.

Further, if the upper limit of the condition (12) is exceeded, it becomes disadvantageously difficult to correct lateral chromatic aberration at the wide-angle end, in particular.

(B-4) The second lens unit consists of two cemented lenses.

In the embodiment 2B, in order to cope with the reduction of the amount of chromatic aberration, which is required according to the increased number of pixels and the minimization of cell pitches of a solid-state image sensor such as a CCD, the second lens unit consists of two cemented lenses, i.e., a first cemented lens composed of a positive lens 21 of meniscus form and a negative lens 22 of meniscus form cemented together, and a second cemented lens composed of a negative lens 23 and a positive lens 24 cemented together. By this arrangement, it is possible to correct well longitudinal chromatic aberration and lateral chromatic aberration.

In a case where the second lens unit L2 is composed of the so-called triplet-type system, a single negative lens component is required to have a glass thickness greater than a certain degree, so as to correct well off-axial flare or to correct well spherical aberration due to two air lenses of negative refractive power provided before and behind the negative lens component. Thus, in a case where the second lens unit L2 is composed of the triplet-type system, the thickness on the optical axis of the second lens unit L2 increases inevitably. On the other hand, according to the embodiment 2B, the second lens unit L2 is composed of two cemented lenses, i.e., a refractive power of a single negative lens component in the triplet-type system is separated into two components. Accordingly, as compared with a case where the correction of aberration is performed by the single negative lens component, the degree of freedom of the correction of aberration is increased, so that, as a result, the thickness on the optical axis of the second lens unit L2 decreases. Thus, the second lens unit L2 being composed of two cemented lenses contributes greatly also to the shortening of the entire optical system and the shortening of the total length of the lens system as retracted.

(B-5) The second lens unit has, on the most object side thereof, a first cemented lens composed of a positive lens having a convex surface facing the object side and a negative lens having a concave surface facing the image side, a lens surface on the object side of the positive lens of the first cemented lens is an aspheric surface, and the following condition is satisfied:

$$0<(R21-R23)/(R21+R23)<0.1 \tag{13}$$

where R21 is a radius of paraxial curvature of the lens surface on the object side of the positive lens of the first cemented lens, and R23 is a radius of curvature of a lens surface on the image side of the negative lens of the first cemented lens.

If the upper limit of the condition (13) is exceeded, the Petzval sum of the second lens unit increases in the negative direction, so that it becomes difficult to correct curvature of field.

If the lower limit of the condition (13) is exceeded, it becomes disadvantageously difficult to correct spherical aberration and coma.

(B-6) The second lens unit has a positive lens disposed on the most object side thereof, and the following conditions are satisfied:

$$nd21>1.70 \tag{14}$$

$$vd21>40.0 \tag{15}$$

where nd21 and vd21 are a refractive index and Abbe number, respectively, of material of the positive lens of the second lens unit.

If the upper limit of the condition (14) is exceeded, the Petzval sum increases in the negative direction, so that it becomes difficult to correct curvature of field. Further, if the upper limit of the condition (15) is exceeded, it becomes disadvantageously difficult to correct longitudinal chromatic aberration at the telephoto end.

(B-7) The third lens unit consists of one positive lens.

The third lens unit of positive refractive power consists of one positive lens 31 having a convex surface facing the object side, and serves also as a field lens for making the zoom lens telecentric on the image side.

(B-8) One positive lens of the third lens unit has at least one aspheric surface.

In particular, it is preferable that a lens surface on the image side of the convex lens 31 is such an aspheric surface that a positive refractive power becomes progressively weaker toward a marginal portion of the lens surface. By this arrangement, it is possible to correct the various off-axial aberrations over the entire zooming range.

(B-9) Focusing from an infinitely distant object to a closest object is effected by moving the third lens unit toward the object side.

When focusing from an infinitely distant object to a closest object is effected by using the zoom lens according to the embodiment 2B, good optical performance can be obtained by moving the first lens unit toward the object side. However, it is more preferable to move the third lens unit toward the object side.

This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

Further, in a case where focusing is performed by using the third lens unit, if the third lens unit is arranged to be moved toward the image side during the variation of magnification from the wide-angle end to the telephoto end, the telephoto end, at which the amount of movement for focusing is large, can be located on the image side. Accordingly, it becomes possible to minimize the amount of total movement of the third lens unit required for zooming and focusing. This arrangement makes it possible to attain the compactness of the entire lens system.

(B-10) The following condition is satisfied:

$$0.25<(L1+L2+L3)/L<0.45 \tag{16}$$

where L is a distance, at the telephoto end, from a vertex on the object side of a lens disposed on the most object side of the first lens unit to an image plane, L1 is a distance from the vertex on the object side of the lens disposed on the most object side of the first lens unit to a vertex on the image side of a lens disposed on the most image side of the first lens unit, L2 is a distance from a vertex on the object side of a lens disposed on the most object side of the second lens unit to a vertex on the image side of a lens disposed on the most image side of the second lens unit, and L3 is a distance from a vertex on the object side of a lens disposed on the most object side of the third lens unit to a vertex on the image side of a lens disposed on the most image side of the third lens unit.

If the upper limit of the condition (16) is exceeded, although the total length of the optical system at the telephoto end becomes short, the sum of lengths of the respective lens units on the optical axis becomes large, so that the total length of the entire lens system as retracted becomes long disadvantageously.

If the lower limit of the condition (16) is exceeded, although the sum of lengths of the respective lens units on the optical axis becomes small, the total length of the optical system at the telephoto end becomes long, and the amount of movement of each lens unit is necessarily increased. Therefore, the length of a cam ring or the like for moving each lens unit becomes long, and, as a result, the total length of the entire lens system as retracted does not become short.

(B-11) The following condition is satisfied:

$$0.05<\Sigma A2/\Sigma D2<0.2 \tag{17}$$

where $\Sigma D2$ is the sum of thicknesses on the optical axis of lenses constituting the second lens unit, and $\Sigma A2$ is the sum of air separations included in the second lens unit.

If the upper limit of the condition (17) is exceeded, the length of the second lens unit on the optical axis becomes long, so that it becomes disadvantageously difficult to attain the compactness of the optical system.

If the lower limit of the condition (17) is exceeded, the power of the air lens becomes small, so that it becomes disadvantageously difficult to correct spherical aberration.

(B-12) The first lens unit of negative refractive power consists of two lenses, i.e., in order from the object side to the image side, a negative lens 11 of meniscus form having a concave surface facing the image side, and a positive lens 12 of meniscus form having a convex surface facing the object side, or consists of three lenses, i.e., in order from the object side to the image side, a negative lens 11 of meniscus form having a convex surface facing the object side, a negative lens 12 of meniscus form having a convex surface facing the object side, and a positive lens 13 of meniscus form having a convex surface facing the object side, the second lens unit of positive refractive power consists of four lenses, i.e., in order from the object side to the image side, a positive lens 21 of meniscus form having a concave surface facing the image side, a negative lens 22 of meniscus form having a convex surface facing the object side, a negative lens 23 of meniscus form having a convex surface facing the object side, and a positive lens 24 of bi-convex form, the positive lens 21 and the negative lens 22 constituting a cemented lens, the negative lens 23 and the positive lens 24 constituting a cemented lens, and the third lens unit of positive refractive power consists of a positive lens 31 having a convex surface facing the image side or a cemented lens composed of a negative lens and a positive lens.

By this arrangement, it is possible to easily attain the compactness of a lens system while keeping good optical performance.

(B-13) The second lens unit of positive refractive power has, on the most object side thereof, a positive lens 21 having a strong convex surface facing the object side. By this arrangement, it is possible to lessen the angle of refraction of an off-axial principal ray having exited from the first lens unit, thereby preventing the various off-axial aberrations from occurring.

(B-14) A positive lens 21 included in the second lens unit is a lens arranged to allow an on-axial ray to pass at the largest height, and is concerned with the correction of, mainly, spherical aberration and coma. Therefore, it is preferable that a lens surface on the object side of the positive lens 21 is such an aspheric surface that a positive refractive power becomes progressively weaker toward a marginal portion of the lens surface. By this arrangement, it becomes easy to correct well spherical aberration and coma.

(B-15) A negative lens 22 disposed on the image side of a positive lens 21 on the object side included in the second lens unit is made to have a concave surface facing the image side, so that a negative air lens is formed by the concave surface on the image side of the negative lens 22 and a convex surface on the object side of a negative lens 23 disposed subsequent to the negative lens 22. By this arrangement, it is possible to correct spherical aberration occurring due to the increase of an aperture ratio.

(B-16) When the back focal distance is denoted by sk', the focal length of the third lens unit is denoted by f3, and the image magnification of the third lens unit is denoted by β3, the following relation is obtained:

$sk'=f3(1\beta3)$ provided that 0<β3<1.0.

Here, when the third lens unit is moved toward the image side during the variation of magnification from the wide-angle end to the telephoto end, the back focal distance sk' decreases, so that the image magnification β3 of the third lens unit increases on the telephoto side. Then, as a result, the third lens unit shares the variation of magnification with the second lens unit, so that the amount of movement of the second lens unit is reduced. Therefore, since such a space for the movement of the second lens unit can be saved, the third lens unit contributes to the reduction in size of the lens system.

(Embodiment 2C)

Next, the lens construction of a zoom lens having three lens units of negative, positive and positive refractive powers, respectively, in order from the object side to the image side according to the embodiment 2C will be described.

FIGS. 45, 49, 53 and 57 are lens block diagrams showing zoom lenses at the wide-angle end according to the numerical examples 12 to 15 in the embodiment 2C.

The zoom lens according to the embodiment 2C comprises three lens units, i.e., in order from the object side to the image side, the first lens unit L1 of negative refractive power, the second lens unit L2 of positive refractive power and the third lens unit L3 of positive refractive power. During the variation of magnification from the wide-angle end to the telephoto end, as indicated by the arrows shown in the lens block diagrams shown in FIGS. 45, 49, 53 and 57, the first lens unit L1 makes a reciprocating motion convex toward the image side, the second lens unit moves toward the object side, and the third lens unit moves toward the image side.

In the embodiment 2C, the first lens unit when the zoom lens is at the telephoto end is located at about the same position as when the zoom lens is at the wide-angle end, or is located slightly nearer to the image side than when the zoom lens is at the wide-angle end. Accordingly, the amount of movement of the first lens unit required when the zoom lens is retracted is prevented from becoming too large.

The aperture stop SP is disposed on the object side of the second lens unit L2, and is arranged to move along the optical axis integrally with the second lens unit.

In the zoom lens according to the embodiment 2C, the main variation of magnification is effected by moving the second lens unit of positive refractive power while the shift of an image point due to the variation of magnification is compensated for by moving forward and backward the first lens unit of negative refractive power and moving the third lens unit of positive refractive power toward the image side.

The third lens unit of positive refractive power shares the increase of a refractive power of the photographic lens due to the reduction in size of the image sensor, thereby reducing a refractive power of the short zoom system composed of the first and second lens units, so that the occurrence of aberration by lenses constituting the first lens unit can be suppressed, so as to attain high optical performance. Further, in particular, the telecentric image formation on the image side necessary for the optical apparatus using the image sensor or the like is attained by giving the third lens unit the roll of a field lens.

Further, the stop SP is disposed on the most object side of the second lens unit, thereby shortening the distance between the entrance pupil and the first lens unit on the wide-angle side, so that the increase of the diameter of lenses constituting the first lens unit can be prevented. In addition, the various off-axial aberrations are canceled by the first lens unit and the third lens unit across the stop disposed on the object side of the second lens unit, so that good optical performance can be obtained without increasing the number of constituent lenses.

Further, in the embodiment 2C, the first lens unit of negative refractive power is composed of two lenses, i.e., in order from the object side to the image side, a negative lens 11 having a concave surface facing the image side, and a positive lens 12 of meniscus form having a convex surface facing the object side, the second lens unit of positive refractive power is composed of four lenses, i.e., a positive lens 21 of bi-convex form, a negative lens 22 of bi-concave form, a negative lens 23 of meniscus form having a convex surface facing the object side, and a positive lens 24 of bi-convex form, the positive lens 21 and the negative lens 22 constituting a cemented lens, the negative lens 23 and the positive lens 24 constituting a cemented lens, and the third lens unit of positive refractive power is composed of a single positive lens 31 having a strong convex surface facing the object side.

With the respective lens units having such a lens construction as to make the desired refractive power arrangement and the correction of aberration compatible with each other, as described above, it is possible to attain the compactness of a lens system while keeping the good optical performance of the lens system. The first lens unit of negative refractive power has the role of causing an off-axial principal ray to be pupil-imaged on the center of a stop, and, particularly, on the wide-angle side, the amount of refraction of an off-axial principal ray is large. Therefore, in the first lens unit, the various off-axial aberrations, particularly, astigmatism and distortion, are apt to occur. Accordingly, similarly to an ordinary wide-angle lens, the first lens unit is made to have the construction having a negative lens and a positive lens so as to prevent the diameter of a lens disposed on the most object side from increasing. Further, it is preferable that a lens surface on the image side of the negative lens 11 is such an aspheric surface that a negative refractive power becomes progressively weaker toward a marginal portion of the lens surface. By this arrangement, astigmatism and distortion are corrected in a well-balanced manner, and the first lens unit is composed of such a small number of lenses as two, so that it becomes easy to make the entire lens system compact.

The second lens unit of positive refractive power has, on the most object side thereof, the positive lens 21 having a strong convex surface facing the object side, so that the second lens unit has such a shape as to lessen the angle of refraction of an off-axial principal ray having exited from the first lens unit, thereby preventing the various off-axial aberrations from occurring. Further, the positive lens 21 is a lens arranged to allow an on-axial ray to pass at the largest height, and is concerned with the correction of, mainly, spherical aberration and coma. In the embodiment 2C, it is preferable that a lens surface on the object side of the positive lens 21 is such an aspheric surface that a positive refractive power becomes progressively weaker toward a marginal portion of the lens surface. By this arrangement, it becomes easy to correct well spherical aberration and coma. Further, the negative lens 22 disposed on the image side of the positive lens 21 is made to have a concave surface facing the image side, so that a negative air lens is formed by the lens surface on the image side of the negative lens 22 and a convex surface on the object side of the negative lens 23 disposed subsequent to the negative lens 22. Accordingly, it is possible to correct spherical aberration occurring due to the increase of an aperture ratio.

In addition, in the embodiment 2C, in order to cope with the reduction of the amount of chromatic aberration, which is required according to the increased number of pixels and the minimization of cell pitches of a solid-state image sensor such as a CCD, the second lens unit is composed of two cemented lenses. By this arrangement, it is possible to correct well longitudinal chromatic aberration and lateral chromatic aberration.

In the zoom lens according to the embodiment 2C, the third lens unit is moved toward the image side to make the third lens unit have the function of the variation of magnification and to lessen the burden of the variation of magnification imposed on the second lens unit, so that the amount of movement of the second lens unit is reduced, thereby attaining the reduction in the total lens length.

Next, the lens construction other than that mentioned in the foregoing are described.

(C-1) In order to reduce the size of the entire lens system mainly, it is preferable to satisfy the following condition:

$$0.08<M3/fw<0.4 \qquad (18)$$

where M3 is an amount of movement of the third lens unit toward the image side during the variation of magnification from the wide-angle end to the telephoto end with an infinitely distant object focused on, and fw is the focal length of the zoom lens at the wide-angle end.

If the amount of movement of the third lens unit becomes too small beyond the lower limit of the condition (18), the contribution of the third lens unit concerning the variation of magnification becomes small, necessitating moving the second lens unit much to that extent, so that the reduction in size of the lens system becomes insufficient. On the other hand, if the upper limit of the condition (18) is exceeded, it becomes difficult to secure the back focal distance at the telephoto end.

(C-2) In order to appropriately set the refractive power of the first lens unit so as to correct well the various aberrations, such as distortion and curvature of field, as well as to secure the sufficient back focal distance, thereby attaining high optical performance, mainly, it is preferable to satisfy the following condition:

$$0.7<|f1/ft|<1.0 \qquad (19)$$

where f1 is the focal length of the first lens unit, and ft is the focal length of the zoom lens at the telephoto end.

If the focal length of the first lens unit becomes short beyond the lower limit of the condition (19), it becomes difficult to correct the variation of distortion or curvature of field during the variation of magnification. On the other hand, if the upper limit of the condition (19) is exceeded, it becomes difficult to secure the back focal distance.

(C-3) When a close-distance object is to be photographed by using the zoom lens according to the embodiment 2C, good optical performance can be obtained by moving the first lens unit toward the object side. However, it is preferable to move the third lens unit also toward the object side. This arrangement prevents the increase of the diameter of a front lens member due to the focusing movement of the first lens unit which is disposed on the most object side, prevents the increase of the load on an actuator for moving the first lens unit which is the heaviest among the lens units, and makes it possible to move, during zooming, the first lens unit and the second lens unit in an interlocking relation simply with a cam or the like used. Therefore, it is possible to attain the simplification of a mechanism and the enhancement of precision thereof.

(C-4) In order to make the zoom lens have a more telecentric construction than the two-unit construction merely composed of a negative lens unit and a positive lens unit, by additionally providing the third lens unit of positive refractive power, and in order to make the effect of the telecentric construction sufficient, it is preferable to satisfy the following condition:

$$1.45 < f3/ft < 2.0 \qquad (20)$$

where f3 is the focal length of the third lens unit, and ft is the focal length of the zoom lens at the telephoto end.

If the focal length of the third lens unit becomes too short beyond the lower limit of the condition (20), the composite focal length of the first lens unit and the second lens unit becomes long to that extent, so that the compactness of the entire lens system becomes insufficient. On the other hand, if the upper limit of the condition (20) is exceeded, the exit pupil becomes too short, in particular, at the wide-angle end, and, in a case where focusing is effected by using the third lens unit, the amount of movement required for focusing increases disadvantageously.

(C-5) In order to reduce the amount of movement of the second lens unit required for the variation of magnification, thereby attaining the reduction in size of the entire lens system, it is preferable to satisfy the following condition:

$$0.63 < f2/ft < 0.8 \qquad (21)$$

where f2 is the focal length of the second lens unit, and ft is the focal length of the zoom lens at the telephoto end.

If the focal length of the second lens unit becomes short beyond the lower limit of the condition (21), although an advantage arises in reducing the size of the lens system, the Petzval sum becomes too large in the positive direction, so that it becomes difficult to correct curvature of field. On the other hand, if the upper limit of the condition (21) is exceeded, the amount of movement of the second lens unit required for the variation of magnification becomes large, so that it becomes difficult to attain the reduction in size of the lens system.

(C-6) In a case where the second lens unit L2 is composed of the so-called triplet-type system, a single negative lens component is required to have a glass thickness greater than a certain degree, so as to correct well off-axial flare or to correct well spherical aberration due to two air lenses of negative refractive power provided before and behind the negative lens component. Thus, in a case where the second lens unit L2 is composed of the triplet-type system, the thickness on the optical axis of the second lens unit L2 increases inevitably. On the other hand, according to the embodiment 2C, the second lens unit L2 is composed of two cemented lenses, i.e., a refractive power of a single negative lens component in the triplet-type system is separated into two components. Accordingly, as compared with a case where the correction of aberration is performed by the single negative lens component, the degree of freedom of the correction of aberration is increased, so that, as a result, the thickness on the optical axis of the second lens unit L2 decreases. Thus, the second lens unit L2 being composed of two cemented lenses contributes greatly also to the shortening of the entire optical system and the shortening of the total length of the lens system as retracted.

(C-7) It is desirable that the third lens unit is composed of a single positive lens, from the viewpoints of the size of the lens system and the reduction of load imposed on an actuator required for focusing.

Further, when the third lens unit is a single positive lens of spherical form, in order to appropriately set the shape of the single positive lens to enable focusing to be effected while lessening the variation of aberration, it is preferable to satisfy the following condition:

$$-1.5 < (R3f+R3r)/(R3f-R3r) < -0.5 \qquad (22)$$

where R3f is a radius of curvature of a lens surface on the object side of the single positive lens, and R3r is a radius of curvature of a lens surface on the image side of the single positive lens.

If the lower limit of the condition (22) is exceeded, the ghost occurring due to the interreflection between the image pickup surface and the lens surface on the object side of the single positive lens of the third lens unit becomes apt to be formed in the vicinity of the image pickup surface. If it is intended to avoid this ghost, it becomes necessary to take the excessive back focal distance, thereby making it difficult to sufficiently reduce the size of the lens system. On the other hand, if the upper limit of the condition (22) is exceeded, in a case where focusing is effected by using the third lens unit, it becomes difficult to correct spherical aberration and astigmatism caused by the focusing.

(C-8) If such an aspheric surface that a positive refractive power becomes progressively weaker toward a marginal portion thereof is introduced into the third lens unit, it is possible to further reduce the variation of astigmatism during the variation of magnification.

As described above, according to the embodiment 2C, it is possible to attain a zoom lens which is suited for a photographic system using a solid-state image sensor, is compact with less constituent lens elements, is corrected particularly for chromatic aberration, and has excellent optical performance, by constructing the zoom lens with three lens units, i.e., in order from the object side to the image side, a first lens unit of negative refractive power, a second lens unit of positive refractive power and a third lens unit of positive refractive power, effecting the variation of magnification by varying the separation between the respective adjacent lens units, and appropriately setting the refractive power arrangement, the amount of movement and the shape of each lens unit.

Further, it is possible to effectively correct the various off-axial aberrations, particularly, astigmatism and distortion, and spherical aberration caused by the increase of an aperture ratio, by introducing an aspheric surface into each lens unit.

(Embodiment 3)

Next, the characteristic features of the lens construction of a zoom lens having three lens units of positive, negative and positive refractive powers, respectively, in order from the object side to the image side according to the embodiment 3 will be described.

FIGS. 61 and 65 are lens block diagrams showing zoom lenses according the numerical examples 16 and 17 in the embodiment 3.

The zoom lens according to the embodiment 3 comprises, in order from the object side to the image side, a fist lens unit L1 of positive refractive power, a second lens unit L2 of negative refractive power and a third lens unit L3 of positive refractive power. During zooming from the wide-angle end to the telephoto end, the first lens unit makes a reciprocating motion convex toward the image side or remains stationary, the second lens unit moves toward the object side, and the third lens unit moves with a locus convex toward the object side.

In the zoom lens according to the embodiment 3, the main variation of magnification is effected by moving the second lens unit while the shift of an image point (the variation of an image plane) due to the variation of magnification is compensated for by moving forward and backward the first lens unit and moving the third lens unit with a locus convex toward the object side.

Since the third lens unit moves with a locus convex toward the object side, the relationship in relative position between the stop and the image plane does not vary greatly. Accordingly, a change in F-number due to zooming is made small.

Next, the lens construction of the zoom lens according to each of the numerical examples 16 and 17 in the embodiment 3 will be described.

In the zoom lens according to the numerical example 16 shown in FIG. 61, the first lens unit L1 of positive refractive power is composed of three lenses, i.e., in order from the object side to the image side, a negative lens 11 of meniscus form having a convex surface facing the object side, a positive lens 12 of meniscus form having a convex surface facing the object side, and a positive lens 13 of meniscus form having a convex surface facing the object side. Then, the negative lens 11 and the positive lens 12 are formed into a cemented lens.

Further, the second lens unit L2 of negative refractive power is composed of three lenses, i.e., in order from the object side to the image side, a negative lens 21 of meniscus form having a convex surface facing the object side, a negative lens 22 of bi-concave form, and a positive lens 23 having a strong convex surface facing the object side.

Further, the third lens unit L3 of positive refractive power is composed of four lenses, i.e., in order from the object side to the image side, a positive lens 31 of bi-convex form, a negative lens 32 of bi-concave form, a negative lens 33 of meniscus form having a convex surface facing the object side, and a positive lens 34 of bi-convex form. Then, the positive lens 31 and the negative lens 32 are formed into a cemented lens and the negative lens 33 and the positive lens 34 are formed into a cemented lens, so that the third lens unit L3 is composed of two cemented lenses.

In the zoom lens according to the numerical example 17 shown in FIG. 65, the first lens unit L1 of positive refractive power is composed of three lenses, i.e., in order from the object side to the image side, a negative lens 11 of meniscus form having a convex surface facing the object side, a positive lens 12 of meniscus form having a convex surface facing the object side, and a positive lens 13 of meniscus form having a convex surface facing the object side. Then, the negative lens 11 and the positive lens 12 are formed into a cemented lens.

Further, the second lens unit L2 of negative refractive power is composed of three lenses, i.e., in order from the object side to the image side, a negative lens 21 of meniscus form having a convex surface facing the object side, a negative lens 22 of bi-concave form, and a positive lens 23 of meniscus form having a strong convex surface facing the object side.

Further, the third lens unit L3 of positive refractive power is composed of five lenses, i.e., in order from the object side to the image side, a positive lens 31 of meniscus form having a convex surface facing the object side, a negative lens 32 of meniscus form having a convex surface facing the object side, a negative lens 33 of meniscus form having a convex surface facing the object side, a positive lens 34 of bi-convex form, and a positive lens 35 of meniscus form having a convex surface facing the object side. Then, the positive lens 31 and the negative lens 32 are formed into a cemented lens and the negative lens 33 and the positive lens 34 are formed into a cemented lens, so that the third lens unit L3 is composed of two cemented lenses and one positive lens.

With the above lens construction adopted, in each of the numerical examples 16 and 17, in order to cope with the reduction of the amount of chromatic aberration, which is required according to the increased number of pixels and the minimization of cell pitches of a solid-state image sensor such as a CCD, the third lens unit is made to be composed of two cemented lenses. By this arrangement, it is possible to correct well longitudinal chromatic aberration and lateral chromatic aberration.

In a case where the third lens unit L3 is composed of the so-called triplet-type system, a single negative lens component is required to have a glass thickness greater than a certain degree, so as to correct well off-axial flare or to correct well spherical aberration due to two air lenses of negative refractive power provided before and behind the negative lens component. Thus, in a case where the third lens unit L3 is composed of the triplet-type system, the thickness on the optical axis of the third lens unit L3 increases inevitably. On the other hand, according to the embodiment 3, the third lens unit L3 is composed of two cemented lenses, i.e., a refractive power of a single negative lens component in the triplet-type system is separated into two components. Accordingly, as compared with a case where the correction of aberration is performed by the single negative lens component, the degree of freedom of the correction of aberration is increased, so that, as a result, the thickness on the optical axis of the third lens unit L3 decreases. Thus, the third lens unit L3 being composed of two cemented lenses contributes greatly also to the shortening of the entire optical system and the shortening of the total length of the lens system as retracted.

When a close-distance object is to be photographed by using the zoom lens according to the embodiment 3, good optical performance can be obtained by moving the first lens unit toward the object side. However, more preferably, the third lens unit may be moved toward the object side for that purpose.

(Embodiment 4A)

Next, the characteristic features of the lens construction of a zoom lens having four lens units of positive, negative, positive and positive refractive powers, respectively, in order from the object side to the image side, according to the embodiment 4A will be described.

FIGS. 69, 73, 77 and 81 are lens block diagrams showing zoom lenses according the numerical examples 18 to 21 in the embodiment 4A.

The zoom lens according to the embodiment 4A comprises, in order from the object side to the image side, a fist lens unit L1 of positive refractive power, a second lens unit L2 of negative refractive power, a third lens unit L3 of positive refractive power and a fourth lens unit L4 of positive refractive power. During the variation of magnification, the second lens unit moves in such a way as to include a range in which the second lens unit moves with a locus convex toward the image side, as shown in each of FIGS. 69, 73, 77 and 81, and the separation between the third lens unit and the fourth lens unit varies.

Then, in the embodiment 4A, the third lens unit L3 of positive refractive power disposed on the image side of the second lens unit of negative refractive power is composed of not more than five lenses and has at least two cemented lenses.

Further, in the embodiment 4A, it is preferable that a first cemented lens composed of a positive lens having a convex surface facing the object side and a negative lens having a concave surface facing the image side is disposed on the most object side of the third lens unit L3, and a stop is disposed just before the object side of the third lens unit.

Next, the lens construction of the zoom lens according to each of the numerical examples 18 to 21 in the embodiment 4A will be described.

The zoom lens according to the embodiment 4A is characterized by satisfying at least one of the following conditions:

$$L12t/Lt<0.15 \qquad (23)$$

$$L12t/ft<0.5 \qquad (24)$$

where Lt is the total length of the zoom lens at the telephoto end, L12t is the separation between the first lens unit and the second lens unit at the telephoto end, and ft is the focal length of the zoom lens at the telephoto end.

The technical significance of each of the conditions (23) and (24) will be described below. If the upper limit of the condition (23) is exceeded, the amount of movement on the optical axis of the first lens unit increases, so that a moving mechanism for moving the first lens unit becomes long disadvantageously.

If the upper limit of the condition (24) is exceeded, the amount of movement on the optical axis of the second lens unit increases, so that a moving mechanism for moving the second lens unit becomes long disadvantageously.

In addition, in the zoom lens according to the embodiment 4A, in order to attain the reduction of the size of the entire lens system, and/or in order to obtain good optical performance, it is preferable that at least one of the following conditions is satisfied.

(D-1) It is preferable to satisfy the following condition:

$$1.0<f3/fw<2.0 \qquad (25)$$

where fw is the focal length of the zoom lens at the wide-angle end, and f3 is the focal length of the third lens unit.

If the upper limit of the condition (25) is exceeded, the amount of movement of the third lens unit during the variation of magnification increases, so that, as a result, the total length of the entire optical system becomes long disadvantageously.

If the lower limit of the condition (25) is exceeded, although it is advantageous for shortening the total length of the entire optical system, the focal length of the second lens unit becomes too short, so that the balance of the various aberrations becomes bad.

(D-2) It is preferable to satisfy the following conditions:

$$n4<1.75 \qquad (26)$$

$$v4<50 \qquad (27)$$

where n4 and v4 are a refractive index and Abbe number, respectively, of material of the positive lens 31 disposed on the most object side of the third lens unit.

If the upper limit of the condition (26) is exceeded, the Petzval sum increases in the positive direction, so that it becomes impossible to correct well curvature of field. If the upper limit of the condition (27) is exceeded, it disadvantageously becomes difficult to correct well longitudinal chromatic aberration at the telephoto end.

(D-3) It is preferable that the third lens unit is composed of two cemented lenses. with the third lens unit composed of two cemented lenses, the following advantages are obtained. Since a refractive power of the negative lens component in the so-called triplet type is separated into two components, the degree of freedom of the correction of aberration is increased as against an aberration correcting method using such a single concave lens component as that in the triplet type. Accordingly, it becomes unnecessary to correct off-axial flare, which, otherwise, is corrected by increasing the glass thickness of the negative lens component, or to correct spherical aberration due to two negative air lenses provided before and behind the negative lens component. Therefore, it becomes possible to lessen the thickness on the optical axis of the third lens unit as compared with the triplet type. Thus, the third lens unit composed of two cemented lenses contributes to the shortening of the entire optical system and the shortening of the total length of the lens system as retracted.

(D-4) It is preferable that the fourth lens unit of positive refractive power has a positive lens 41 having a convex surface facing the object side which is stronger in power than an opposite surface thereof, and serves as a field lens for making the zoom lens telecentric on the image side. Further, it is preferable that a lens surface on the object side of the positive lens 41 is formed into such an aspheric surface that a positive refractive power becomes progressively weaker toward a marginal portion of the lens surface. This arrangement is advantageous for correcting the various off-axial aberrations over the entire zooming range.

Now, when the back focal distance is denoted by sk', the focal length of the fourth lens unit is denoted by f4, and the image magnification of the fourth lens unit is denoted by $\beta 4$, the following relation is obtained:

$$sk'=f4(1-\beta 4)$$

provided that $0<\beta 4<1.0$.

Here, when the fourth lens unit is moved toward the image side during the variation of magnification from the wide-angle end to the telephoto end, the back focal distance sk' decreases, so that the image magnification $\beta 4$ of the fourth lens unit increases on the telephoto side.

Then, as a result, the fourth lens unit shares the variation of magnification with the second lens unit, so that the amount of movement of the third lens unit is reduced. Therefore, since such a space for the movement of the third lens unit can be saved, the fourth lens unit contributes to the reduction in size of the lens system.

(D-5) When focusing is effected from an infinitely distant object to a closest object, good optical performance can be obtained by moving the first lens unit toward the object side. However, more preferably, the fourth lens unit may be moved toward the object side for that purpose.

This arrangement prevents the increase of the diameter of a front lens member due to the focusing movement of the first lens unit which is disposed on the most object side, prevents the increase of the load on an actuator for moving the first lens unit which is relatively heavy among the lens units, and makes it possible to move, during zooming, the lens units other than the fourth lens unit in an interlocking relation simply with a cam or the like used. Therefore, it is possible to attain the simplification of a mechanism and the enhancement of precision thereof.

Further, in a case where focusing is performed by using the fourth lens unit, during the variation of magnification from the wide-angle end to the telephoto end, the position of the focusing lens on the optical axis at the time of focusing on an infinitely distant object is set closer to the image side at the telephoto end than at the wide-angle end. Accordingly, the telephoto end, at which the amount of movement of the fourth lens unit for focusing is large, can be located on the image side.

By this arrangement, it becomes possible to minimize the amount of total movement of the fourth lens unit required for zooming and focusing, so that the compactness of the entire lens system can be attained.

With the above-described construction adopted in the zoom lens according to the embodiment 4A, it is possible to attain a zoom lens which is suited for a photographic system using a solid-state image sensor, has a high variable magnification ratio despite being compact and small in diameter with less constituent lens elements, and has excellent optical performance, particularly, with chromatic aberration corrected well.

Further, by effectively introducing an aspheric surface into each lens unit, it is possible to effectively correct the various off-axial aberrations, particularly, astigmatism, distortion and spherical aberration caused by the increase of an aperture ratio.

(Embodiment 4B)

Next, the characteristic features of the lens construction of a zoom lens having four lens units of positive, negative, positive and positive refractive powers, respectively, in order from the object side to the image side, according to the embodiment 4B will be described.

Figure 85:
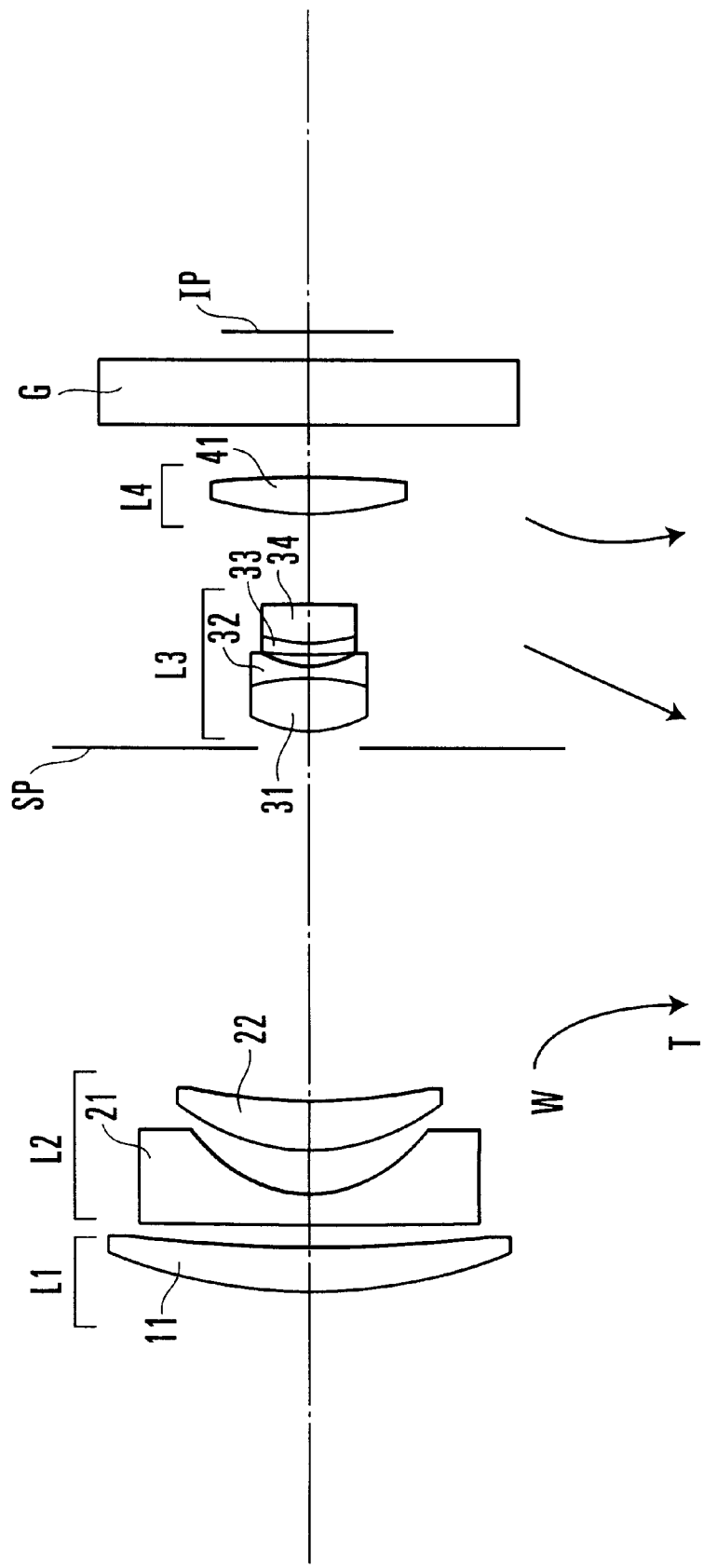
FIG. 85 is a lens block diagram showing a zoom lens at the wide-angle end according to a numerical example 22 of the invention.
Figure 86A:
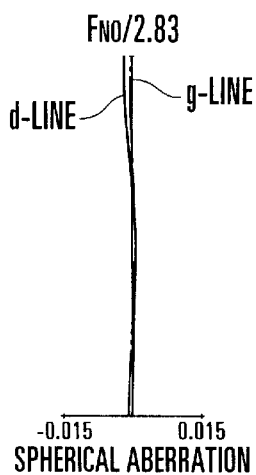
FIGS. 86A to 86D are graphs showing aberration curves at the wide-angle end in the zoom lens according to the numerical example 22 of the invention.
Figure 86B:
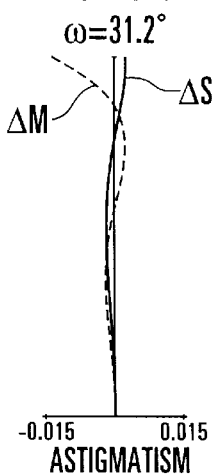
Figure 86C:
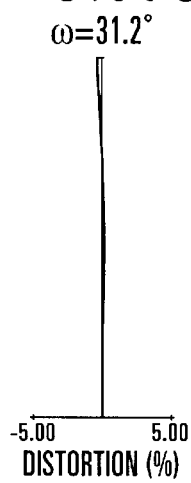
Figure 86D:
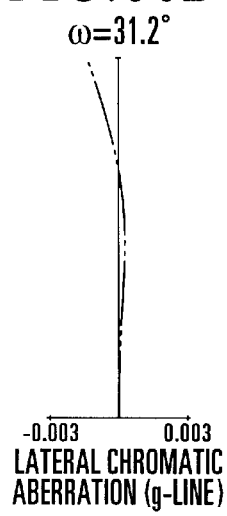
Figure 87A:
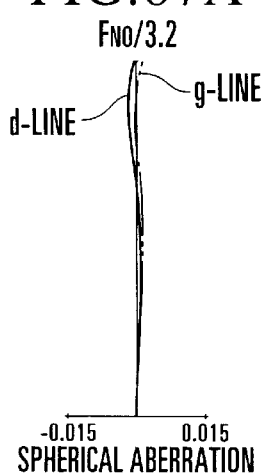
FIGS. 87A to 87D are graphs showing aberration curves at the middle focal length position in the zoom lens according to the numerical example 22 of the invention.
Figure 87B:
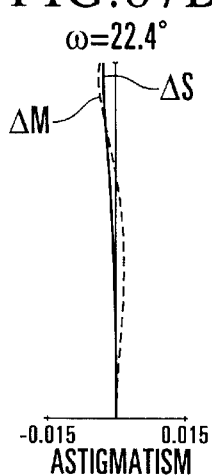
Figure 87C:
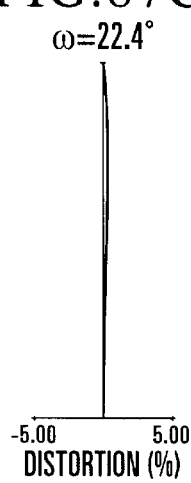
Figure 87D:
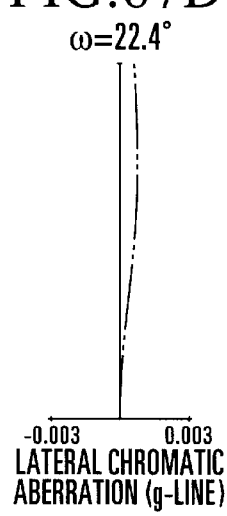
Figure 88A:
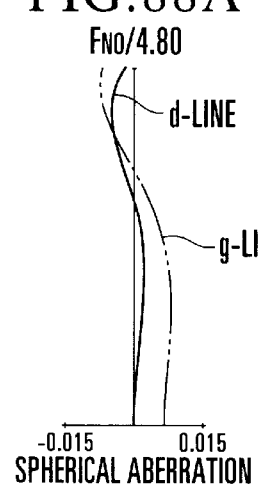
FIGS. 88A to 88D are graphs showing aberration curves at the telephoto end in the zoom lens according to the numerical example 22 of the invention.
Figure 88B:
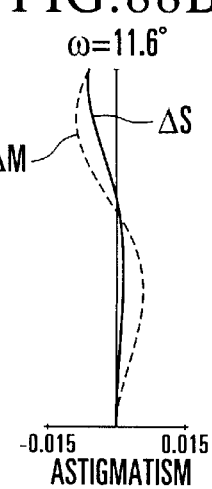
Figure 88C:
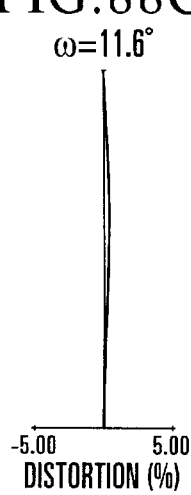
Figure 88D:
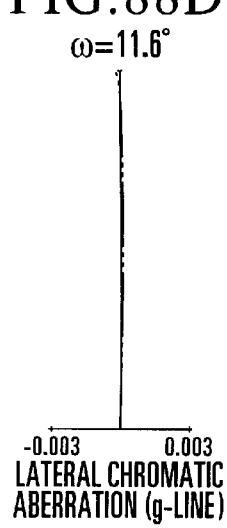
Figure 89:
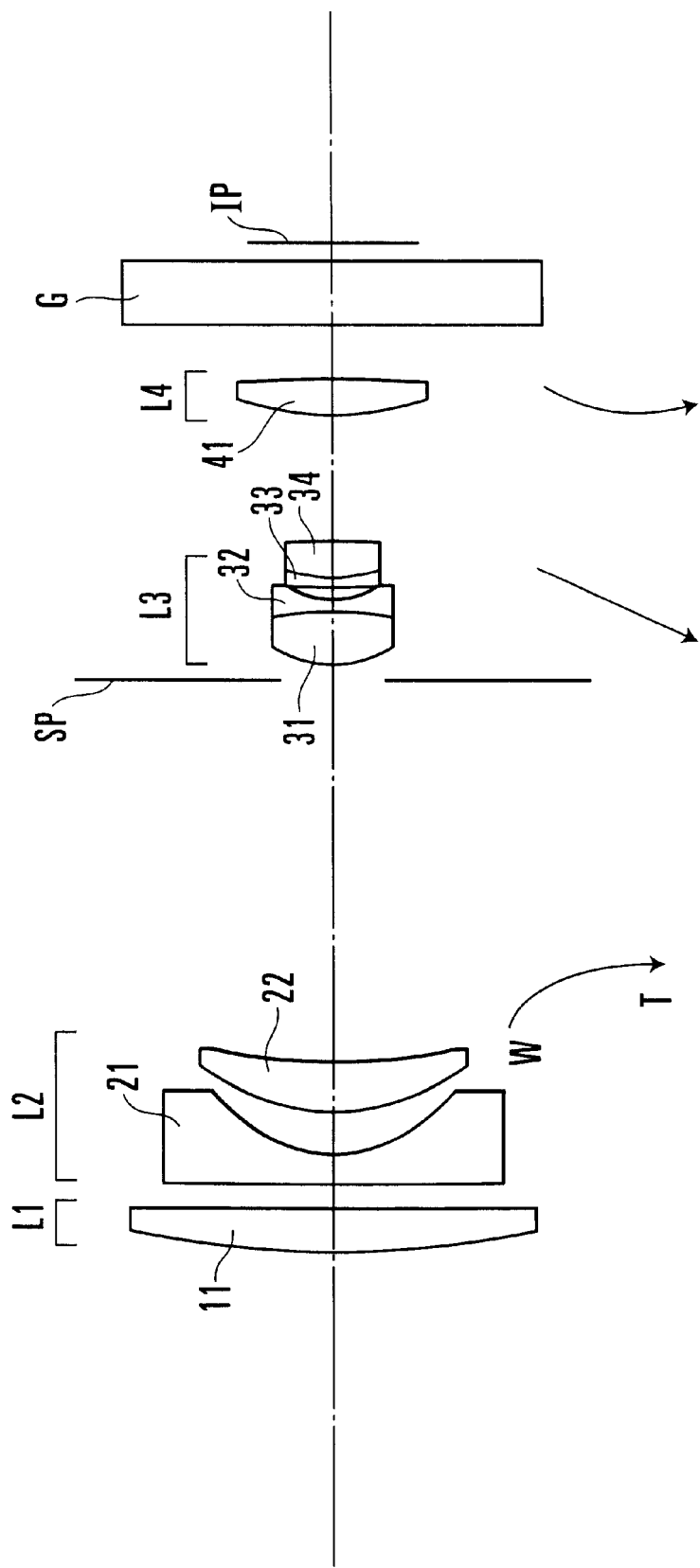
FIG. 89 is a lens block diagram showing a zoom lens at the wide-angle end according to a numerical example 23 of the invention.
Figure 94A:
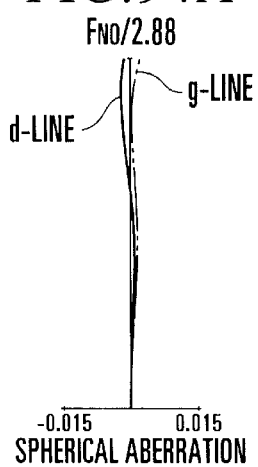
FIGS. 94A to 94D are graphs showing aberration curves at the wide-angle end in the zoom lens according to the numerical example 24 of the invention.
Figure 94B:
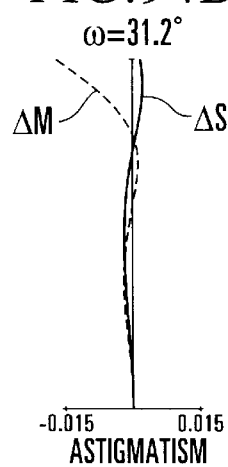
Figure 94C:
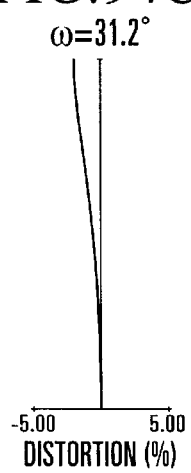
Figure 94D:
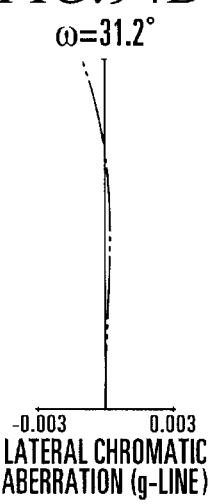
Figure 95A:
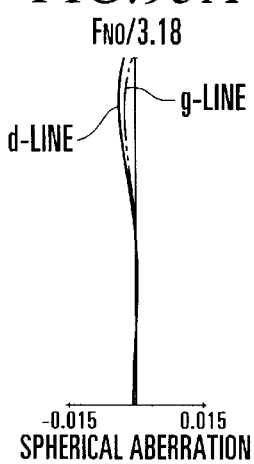
FIGS. 95A to 95D are graphs showing aberration curves at the middle focal length position in the zoom lens according to the numerical example 24 of the invention.
Figure 95B:
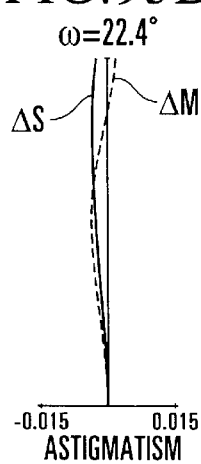
Figure 95C:
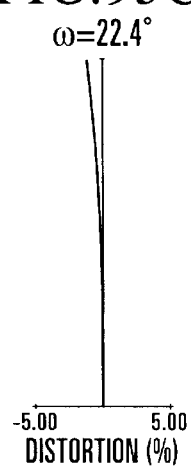
Figure 95D:
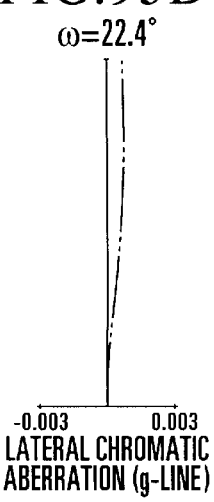
Figure 96A:
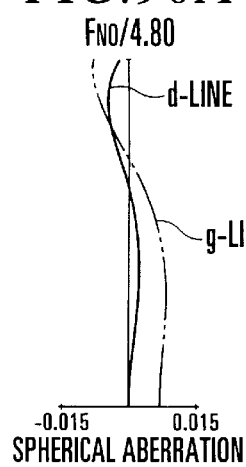
FIGS. 96A to 96D are graphs showing aberration curves at the telephoto end in the zoom lens according to the numerical example 24 of the invention.
Figure 96B:
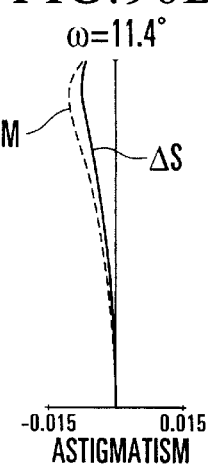
Figure 96C:
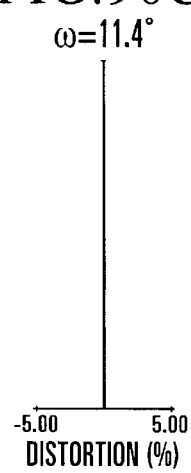
Figure 96D:
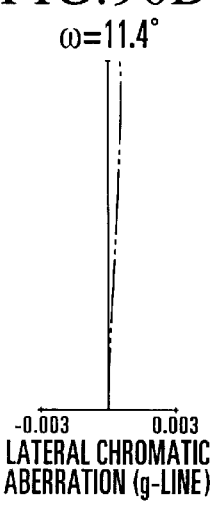

FIGS. 85, 89 and 93 are lens block diagrams showing zoom lenses according the numerical examples 22 to 24 in the embodiment 4B.

In the embodiment 4B, during the variation of magnification from the wide-angle end to the telephoto end, the second lens unit L2 moves in such a way as to include a range in which the second lens unit L2 moves with a locus convex toward the image side, as shown in each of FIGS. 85, 89 and 93, the third lens unit L3 moves monotonically toward the object side, and the fourth lens unit L4 moves in such a way as to include a range in which the fourth lens unit L4 moves with a locus convex toward the object side.

The stop SP moves integrally with the third lens unit L3. In a case where the zoom lens according to the embodiment 4B is used for an optical apparatus, such as a digital still camera, the stop SP may be made to have a shutter function. This arrangement makes it possible to more simplify the structure of the optical apparatus.

In the embodiment 4B, the second lens unit is composed of two lenses as a whole, i.e., a negative lens having a concave surface facing the image side which is stronger in refractive power than an opposite surface thereof, and a positive lens having a convex surface facing the object side which is stronger in refractive power than an opposite surface thereof. This arrangement contributes to the decrease of width of the second lens unit, thereby shortening the total lens length when the zoom lens is retracted. In addition, in the embodiment 4B, it is preferable that such an aspheric surface that a negative refractive power becomes progressively weaker from the center thereof toward a marginal portion thereof is introduced into the second lens unit. By this arrangement, it becomes easy to correct well distortion and spherical aberration at the telephoto end in an optical apparatus. In particular, the method of introducing the aspheric surface into a concave surface having a strong refractive power of a negative lens, at which spherical aberration or coma occurs greatly, is most effective and desirable.

In the embodiment 4B, since the third lens unit is composed of two cemented lenses, the following advantages are obtained. Since a refractive power of the negative lens component in the so-called triplet type is separated into two components, the degree of freedom of the correction of aberration is increased as against an aberration correcting method using such a single concave lens component as that in the triplet type. Accordingly, it becomes unnecessary to correct off-axial flare, which, otherwise, is corrected by increasing the glass thickness of the negative lens component, or to correct spherical aberration due to two negative air lenses provided before and behind the negative lens component. Therefore, it becomes possible to lessen the thickness on the optical axis of the third lens unit as compared with the triplet type. Thus, the third lens unit composed of two cemented lenses contributes to the shortening of the entire optical system and the shortening of the total length of the lens system as retracted. In addition, this arrangement makes it possible to decrease the sensitivity of aberration caused by the decentering of lens components of the third lens unit, thereby eliminating the necessity of adjustment, so that it is possible to attain the reduction of cost.

The fourth lens unit of positive refractive power shares the increase of a refractive power of the photographic lens due to the reduction in size of the image sensor, and, in particular, makes the telecentric image formation on the image side necessary for the optical apparatus using the image sensor or the like. Thus, the fourth lens unit is made to have the roll of a field lens.

In the embodiment 4B, with the lens construction set as described above, high optical performance can be obtained over the entire variable magnification range and over the entire object distance range.

While the zoom lens according to the embodiment 4B is realized by satisfying the above-described construction, in order to keep good optical performance well while keeping a high variable magnification ratio, it is desirable to satisfy at least one of the following conditions.

(E-1) The first lens unit consists of a single positive lens, and the following condition is satisfied:

$$-4.5<(R11+R12)/(R11-R12)<-0.8 \qquad (28)$$

where R11 and R12 are radii of curvature of lens surfaces on the object side and the image side, respectively, of the single positive lens. With the first lens unit consisting of a single lens having such a shape as to satisfy the condition (28), this arrangement makes it easy to shorten the total lens length and simplify the lens construction while suppressing, to the necessary minimum limit, the lowering of optical performance due to the reduction of the number of constituent lens elements. If the lower limit of the condition (28) is exceeded, it becomes difficult to correct distortion at the wide-angle end. If the upper limit of the condition (28) is exceeded, it becomes disadvantageously difficult to correct spherical aberration at the telephoto end.

(E-2) The following condition is satisfied:

$$1.7<f3/fw<2.4 \qquad (29)$$

where f3 is the focal length of the third lens unit, and fw is the focal length of the zoom lens at the wide-angle end. If the refractive power of the third lens unit becomes too strong beyond the lower limit of the condition (29), the Petzval sum becomes large in the positive direction, so that it becomes difficult to correct curvature of field. On the other hand, if the refractive power of the third lens unit becomes too weak beyond the upper limit of the condition (29), the amount of movement on the optical axis of the third lens unit due to the variation of magnification increases, so that the total lens length disadvantageously becomes long accordingly.

Preferably, if the condition (29) is altered as follows:

$$1.9<f3/fw<2.2 \qquad (29a)$$

the balance of the total lens length with the correction of aberration becomes better.

(E-3) The following condition is satisfied:

$$1.8 < |f2/fw| < 2.5 \quad (30)$$

where f2 is the focal length of the second lens unit, and fw is the focal length of the zoom lens at the wide-angle end.

If the refractive power of the second lens unit becomes too weak beyond the upper limit of the condition (30), the amount of movement on the optical axis of the second lens unit due to the variation of magnification increases, so that a moving mechanism for moving the second lens unit becomes long disadvantageously.

If the refractive power of the second lens unit becomes too strong beyond the lower limit of the condition (30), the variation of aberration due to the variation of magnification increases disadvantageously.

(E-4) Focusing is effected by moving the fourth lens unit, and the following condition is satisfied:

$$0.6 < \beta 4t < 0.85 \quad (31)$$

where β4t is the lateral magnification of the fourth lens unit at the telephoto end when an object distance is infinity.

If the lateral magnification β4t is made smaller beyond the lower limit of the condition (31), the composite focal length of the first lens unit to the third lens unit becomes too long, so that it becomes difficult to shorten the total lens length. On the other hand, if the upper limit of the condition (31) is exceeded, the sensitivity of the fourth lens unit becomes too small, so that the amount of movement of the fourth lens unit required for focusing becomes too large disadvantageously.

(E-5) The fourth lens unit consists of a single positive lens.

(E-6) The third lens unit comprises, in order from the object side to the image side, a cemented lens composed of a positive lens and a negative lens, and a cemented lens composed of a negative lens and a positive lens.

It is preferable that the third lens unit, when comprising two cemented lenses, comprises, in order from the object side to the image side, a cemented lens composed of a positive lens 31 having a convex surface facing the object side which is stronger in power than an opposite surface thereof, and a negative lens 32 having a concave surface facing the image side which is stronger in power than an opposite surface thereof, and a cemented lens composed of a negative lens 33 and a positive lens 34.

The combination of the lens 31 and the lens 32 brings the whole third lens unit into a telephoto structure, thereby attaining the reduction in size of the entire lens system. The provision of an aspheric surface on a lens surface on the object side of the positive lens 31 is effective on the correction of spherical aberration.

(E-7) When focusing is effected from an infinitely distant object to a closest object, the first lens unit may be moved toward the object side. However, more preferably, the fourth lens unit may be moved toward the object side for that purpose. This arrangement prevents the increase of the diameter of a front lens member due to the focusing movement of the first lens unit which is disposed on the most object side, prevents the increase of the load on an actuator for moving the first lens unit which is relatively heavy among the lens units, and makes it possible to move, during zooming, the lens units other than the fourth lens unit in an interlocking relation simply with a cam or the like used. Therefore, it is possible to attain the simplification of a mechanism and the enhancement of precision thereof.

(E-8) In order to reduce the weight of a focusing lens unit when focusing is effected by moving the fourth lens unit, it is desirable that the fourth lens unit consists of a single positive lens 41. Further, the following condition is satisfied:

$$v41 > 55 \quad (32)$$

where v41 is an Abbe number of material of the positive lens 41. This arrangement makes it possible to lessen the variation of lateral chromatic aberration during focusing.

(E-9) It is preferable to satisfy the following condition:

$$N3 > 1.72 \quad (33)$$

where N3 is a mean value of refractive indices of material of positive lenses included in the third lens unit. By this arrangement, it becomes easy to suppress the increase of a Petzval sum in the positive direction.

With the lens construction specified as described above, the zoom lens according to each of the embodiments of the invention has the following advantageous effects by way of example.

(i) It is possible to correct well astigmatism and distortion at the wide-angle end, in particular.

(ii) It is possible to reduce the share of correcting aberration of a moving lens unit while taking the smallest lens construction, and to lessen the deterioration of performance due to the decentering or the like of lens units caused by manufacturing errors, thereby making it easy to manufacture the zoom lens.

(iii) It is possible to realize the good telecentric image formation on the image side suited for a photographing system using a solid-state image sensor while minimizing the number of constituent lens elements of the zoom lens.

(iv) It is possible to shorten the length on the optical axis of each lens unit required for the barrel-retractable zoom lens, and the amount of movement on the optical axis of each lens unit during zooming and during focusing.

(v) It is possible to correct well distortion not only at the wide-angle end but also over the entire range of zooming.

(vi) It is possible to lessen the amount of movement of a variator lens unit while keeping the telecentric image formation, thereby attaining the further reduction in size of the zoom lens.

(vii) It is possible to simplify a focusing mechanism for a close object.

Figure 97:
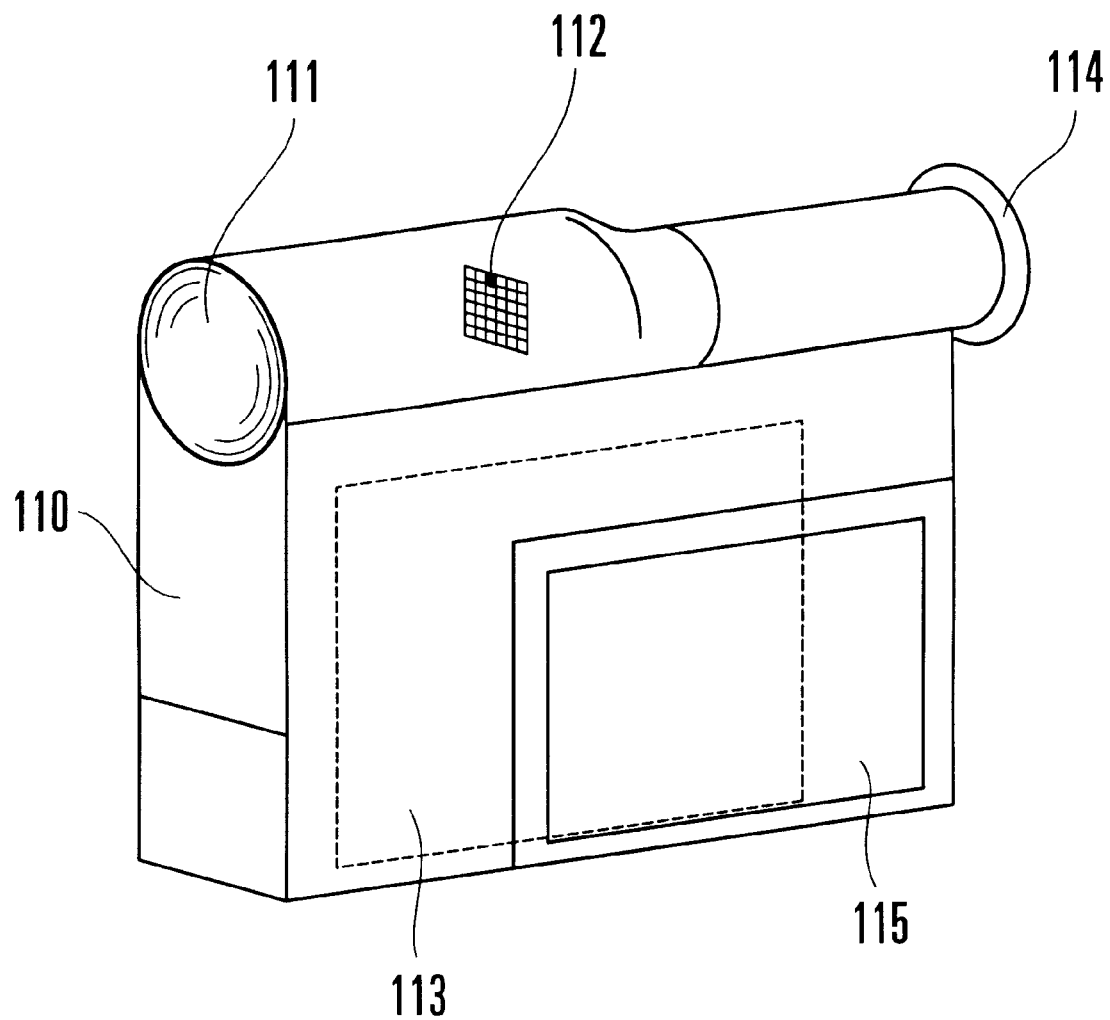
FIG. 97 is a schematic diagram showing the construction of an optical apparatus in which a zoom lens according to the invention is used.

Next, a video camera (optical apparatus) using, as a photographic optical system, a zoom lens set forth in any one of the above-described embodiments is described as an embodiment of the invention with reference to FIG. 97.

Referring to FIG. 97, the video camera includes a video camera body 110, a photographic optical system 111 composed of a zoom lens according to any one of the above-described embodiments, an image sensor 112, such as a CCD or an MOS, arranged to receive an object image formed through the photographic optical system 111, a recording means 113 for recording the object image received by the image sensor 112, and a viewfinder 114 used for observing an object image displayed on a display element (not shown).

The above display element is composed of a liquid crystal display panel or the like, and is arranged to display thereon the object image formed on the image sensor 112. A liquid crystal display panel 115 has the same function as that of the viewfinder 114.

As described above, by applying a zoom lens according to the invention to an optical apparatus, such as a video camera, it is possible to realize an optical apparatus which is small in size and has high optical performance.

Next, numerical data of the numerical examples 1 to 24 of the invention are shown. In the numerical data of the numerical examples 1 to 24, ri denotes the radius of curvature of the i-th optical surface, when counted from the object side, di denotes the separation between the i-th surface and the (i+1)th surface, when counted from the object side, ni and vi respectively denote the refractive index and Abbe number, relative to d-line, of the i-th optical member, when counted from the object side.

Further, the two surfaces closest to the image side constitute a glass member, such as a face plate.

The shape of an aspheric surface is expressed, when the displacement in the optical axis direction at the position of a height "h" from the optical axis with the surface vertex set as the datum is denoted by x, by the following equation:

$$x = \frac{h^2/r}{1+\sqrt{1-(1+k)(h/r)^2}} + Bh^4 + Ch^6 + Dh^8 + Eh^{10}\ldots$$

where r is the radius of osculating sphere, k is the eccentricity, and B, C, D, E . . . are aspheric coefficients. Further, the indication "D-0X" means "x10$^{-x}$".

In addition, the values of the factors in the above-mentioned conditions (1) to (8) for the numerical examples 3 to 8 are listed in Table-1. The values of the factors in the above-mentioned conditions (9) to (17) for the numerical examples 9 to 11 are listed in Table-2. The values of the factors in the above-mentioned conditions (18) to (22) for the numerical examples 12 to 15 are listed in Table-3. The values of the factors in the above-mentioned conditions (23) to (27) for the numerical examples 18 to 21 are listed in Table-4. The values of the factors in the above-mentioned conditions (28) to (33) for the numerical examples 22 to 24 are listed in Table-5.

Numerical Example 1:

f = 6.50–13.01    Fno = 2.8–3.9    2ω = 65.8°–35.8°
r 1 = 15.951     d 1 = 1.00      n 1 = 1.80610   υ 1 = 40.7
r 2 = 8.541*     d 2 = 1.30
r 3 = 13.548     d 3 = 0.80      n 2 = 1.88300   υ 2 = 40.8
r 4 = 6.355      d 4 = 2.32
r 5 = 8.472      d 5 = 2.20      n 3 = 1.84666   υ 3 = 23.8
r 6 = 13.612     d 6 = Variable
r 7 = ∞(Stop)    d 7 = 0.30
r 8 = 4.946*     d 8 = 0.50      n 4 = 1.69680   υ 4 = 55.5
r 9 = −9.851     d 9 = 0.60      n 5 = 1.56732   υ 5 = 42.8
r10 = 4.829      d10 = 0.42
r11 = 8.925      d11 = 0.60      n 6 = 1.84666   υ 6 = 23.8
r12 = 3.082      d12 = 2.20      n 7 = 1.64769   υ 7 = 33.8
r13 = −26.779    d13 = Variable
r14 = ∞          d14 = 2.10      n 8 = 1.51633   υ 8 = 64.1
r15 = ∞

*: Aspheric Surface

| Variable Separation | Focal Length | | |
|---|---|---|---|
| | 6.50 | 9.76 | 13.01 |
| d 6 | 13.47 | 5.88 | 2.09 |
| d13 | 6.65 | 8.75 | 10.85 |

Aspheric Coefficients:

r 2   r = 8.54096D + 00   k = 1.28366D − 01   B = −9.87839D − 05
      C = −6.52838D − 06  D = 1.03717D − 07   E = −2.13282D − 09
r 8   r = 4.94638D + 00   k = −6.47684D − 01  B = 6.38495D − 05
      C = 7.55110D − 06   D = −6.18163D − 07

Numerical Example 2:

f = 5.45–10.70    Fno = 2.9–4.0    2ω = 62.0°–34.0°
r 1 = 40.589     d 1 = 1.20      n 1 = 1.80610   υ 1 = 40.7
r 2 = 4.400*     d 2 = 1.84
r 3 = 7.509      d 3 = 2.20      n 2 = 1.84666   υ 2 = 23.9
r 4 = 15.099     d 4 = Variable
r 5 = ∞(Stop)    d 5 = 0.50
r 6 = 4.830*     d 6 = 2.00      n 3 = 1.80610   υ 3 = 40.7
r 7 = 54.328     d 7 = 0.60      n 4 = 1.67270   υ 4 = 32.1
r 8 = 4.159      d 8 = 0.48
r 9 = 6.948      d 9 = 0.50      n 5 = 1.84666   υ 5 = 23.9
r10 = 4.082      d10 = 1.80      n 6 = 1.56384   υ 6 = 60.7
r11 = −12.470    d11 = 3.65
r12 = 58.144*    d12 = 1.30      n 7 = 1.48749   υ 7 = 70.2
r13 = −128.349   d13 = Variable
r14 = ∞          d14 = 2.80      n 8 = 1.51633   υ 8 = 64.1
r15 = ∞

*: Aspheric Surface

| Variable Separation | Focal Length | | |
|---|---|---|---|
| | 5.45 | 8.08 | 10.70 |
| d 4 | 11.01 | 5.11 | 2.09 |
| d13 | 1.94 | 4.01 | 6.08 |

Aspheric Coefficients:

r 2   r = 4.40018D + 00   k = −1.12803D + 00   B = 7.94576D − 04
      C = 2.42518D − 05   D = −3.09040D − 07   E = 2.26691D − 07
      F = −6.12308D − 09
r 6   r = 4.83024D + 00   k = −2.39529D + 00   B = 2.11799D − 03
      C = −2.98660D − 05  D = 7.36005D − 07
r12   r = 5.81439D + 01   k = −2.97692D + 01   B = −4.58142D − 04
      C = −4.32106D − 05  D = 1.19805D − 05

Numerical Example 3:

f = 5.50004      Fno = 2.6–4.4    2ω = 61.9°–27°
r 1 = 27.337     d 1 = 1.30      n 1 = 1.73077   υ 1 = 40.5
r 2 = 3.825*     d 2 = 1.30
r 3 = 6.484      d 3 = 2.00      n 2 = 1.84666   υ 2 = 23.8
r 4 = 13.760     d 4 = Variable
r 5 = Stop       d 5 = 0.20
r 6 = 4.411*     d 6 = 2.20      n 3 = 1.69350   υ 3 = 53.2
r 7 = 7.267      d 7 = 0.50      n 4 = 1.64769   υ 4 = 33.8
r 8 = 4.106      d 8 = 0.65
r 9 = 19.852     d 9 = 0.50      n 5 = 1.84666   υ 5 = 23.8
r10 = 6.165      d10 = 1.80      n 6 = 1.77250   υ 6 = 49.6
r11 = 13.754*    d11 = Variable
r12 = 12.640*    d12 = 1.60      n 7 = 1.74330   υ 7 = 49.3
r13 = 100.791    d13 = Variable
r14 = ∞          d14 = 2.70      n 8 = 1.51633   υ 8 = 64.2
r15 = ∞

*: Aspheric Surface

| Variable Separation | Focal Length | | |
|---|---|---|---|
| | 5.50 | 7.14 | 13.75 |
| d 4 | 10.60 | 7.62 | 2.13 |
| d11 | 3.09 | 6.33 | 15.71 |
| d13 | 3.53 | 2.91 | 1.84 |

Aspheric Coefficients:

r 2   r = 3.82508D + 00   k = −1.18775D + 00   B = 1.23787D − 03
      C = 2.02847D − 03   D = −9.24835D − 07   E = 3.03702D − 08
r 6   r = 4.41146D + 00   k = −1.63605D + 00   B = 1.64237D − 03
      C = −6.44889D − 06  D = 4.11869D − 06    E = −3.27992D − 07
r11   r = −1.37542D + 01  k = 3.06203D + 00    B = 3.98717D − 05
      C = 1.35766D − 05   D = 2.89825D − 06    E = −3.76984D − 07

-continued

| | | | |
|---|---|---|---|
| r12 | r = 1.26397D + 01 | k = 6.34349D + 00 | B = −5.17636D − 04 |
| | C = 1.15506D − 05 | D = −1.73496D − 06 | E = 1.70851D − 08 |

Numerical Example 4:

f = 4.99026　　Fno = 2.8–4.0　　2ω = 67°–36°

| | | | |
|---|---|---|---|
| r 1 = 43.272* | d 1 = 1.20 | n 1 = 1.80610 | υ 1 = 40.7 |
| r 2 = 3.717* | d 2 = 1.46 | | |
| r 3 = 7.417 | d 3 = 2.10 | n 2 = 1.84666 | υ 2 = 23.8 |
| r 4 = 24.746 | d 4 = Variable | | |
| r 5 = Stop | d 5 = 0.50 | | |
| r 6 = 4.215* | d 6 = 2.10 | n 3 = 1.73077 | υ 3 = 40.5 |
| r 7 = 22.889 | d 7 = 0.50 | n 4 = 1.62004 | υ 4 = 36.3 |
| r 8 = 3.811 | d 8 = 0.61 | | |
| r 9 = 16.939 | d 9 = 0.50 | n 5 = 1.80518 | υ 5 = 25.4 |
| r10 = 3.749 | d10 = 1.70 | n 6 = 1.72000 | υ 6 = 50.2 |
| r11 = −12.304 | d11 = Variable | | |
| r12 = 14.685* | d12 = 1.50 | n 7 = 1.69350 | υ 7 = 53.2 |
| r13 = −58.751 | d13 = Variable | | |
| r14 = ∞ | d14 = 2.70 | n 8 = 1.51633 | υ 8 = 64.2 |
| r15 = ∞ | | | |

*: Aspheric Surface

| Variable | Focal Length | | |
|---|---|---|---|
| Separation | 4.99 | 7.17 | 10.02 |
| d 4 | 8.75 | 3.79 | 2.10 |
| d11 | 4.46 | 6.01 | 11.66 |
| d13 | 1.99 | 2.96 | 1.61 |

Aspheric Coefficients:

| | | | |
|---|---|---|---|
| r 1 | r = 4.32724D + 01 | k = −4.07554D + 01 | B = −1.46637D − 04 |
| | C = 1.83732D − 06 | D = −2.50263D − 08 | E = 0 |
| r 2 | r = 3.71730D + 00 | k = −9.74866D − 01 | B = 9.84836D − 05 |
| | C = 7.35439D − 06 | D = −1.39191D − 06 | E = 4.81608D − 08 |
| r 6 | r = 4.21536D + 00 | k = −1.48996D + 00 | B = 1.62847D − 03 |
| | C = −5.20401D − 06 | D = 3.82524D − 06 | E = −2.92557D − 07 |
| r12 | r = 1.46850D + 01 | k = 9.62836D + 00 | B = −5.12881D − 04 |
| | C = 4.43077D − 06 | D = −1.19040D − 06 | E = 0 |

Numerical Example 5:

f = 5.53642　　Fno = 2.8–4.0　　2ω = 61.6°–34.4°

| | | | |
|---|---|---|---|
| r 1 = 61.000 | d 1 = 1.30 | n 1 = 1.80610 | υ 1 = 40.7 |
| r 2 = 3.617* | d 2 = 1.80 | | |
| r 3 = 6.362 | d 3 = 2.00 | n 2 = 1.84666 | υ 2 = 23.9 |
| r 4 = 26.443 | d 4 = Variable | | |
| r 5 = Stop | d 5 = 0.00 | | |
| r 6 = 4.132* | d 6 = 2.10 | n 3 = 1.69350 | υ 3 = 53.2 |
| r 7 = 20.869 | d 7 = 0.50 | n 4 = 1.69895 | υ 4 = 30.1 |
| r 8 = 3.731 | d 8 = 0.59 | | |
| r 9 = 13.220 | d 9 = 0.50 | n 5 = 1.84666 | υ 5 = 23.9 |
| r10 = 6.758 | d10 = 1.70 | n 6 = 1.77250 | υ 6 = 49.6 |
| r11 = −16.313 | d11 = Variable | | |
| r12 = 13.500* | d12 = 1.60 | n 7 = 1.58913 | υ 7 = 61.3 |
| r13 = −38.852 | d13 = Variable | | |
| r14 = ∞ | d14 = 2.70 | n 8 = 1.51633 | υ 8 = 64.2 |
| r15 = ∞ | | | |

*: Aspheric Surface

| Variable | Focal Length | | |
|---|---|---|---|
| Separation | 5.54 | 7.51 | 10.67 |
| d 4 | 9.54 | 5.77 | 2.98 |
| d11 | 4.71 | 7.25 | 11.90 |
| d13 | 2.33 | 2.41 | 2.00 |

Aspheric Coefficients:

| | | | |
|---|---|---|---|
| r 2 | r = 3.61747D + 00 | k = −9.61151D − 01 | B = 6.11127D − 04 |
| | C = 4.26200D − 06 | D = 3.43123D − 07 | E = −2.60176D − 08 |

-continued

| | | | |
|---|---|---|---|
| r 6 | r = 4.13218D + 00 | k = −1.02123D + 00 | B = 1.04356D − 03 |
| | C = 2.27029D − 05 | D = 5.97377D − 07 | E = −2.95016D − 08 |
| r12 | r = 1.35000D + 01 | k = 5.18341D + 00 | B = −3.56565D − 04 |
| | C = 5.07926D − 06 | D = −6.40158D − 07 | E = 0 |

Numerical Example 6:

f = 5.01466　　Fno = 2.6–4.0　　2ω = 66.8°–29.6°

| | | | |
|---|---|---|---|
| r 1 = 28.289 | d 1 = 1.10 | n 1 = 1.77250 | υ 1 = 49.6 |
| r 2 = 6.315* | d 2 = 1.33 | | |
| r 3 = 12.328 | d 3 = 0.60 | n 2 = 1.88300 | υ 2 = 40.8 |
| r 4 = 5.480 | d 4 = 1.00 | | |
| r 5 = 6.993 | d 5 = 1.50 | n 3 = 1.84666 | υ 3 = 23.8 |
| r 6 = 18.052 | d 6 = Variable | | |
| r 7 = Stop | d 7 = 0.00 | | |
| r 8 = 5.462* | d 8 = 2.20 | n 4 = 1.69350 | υ 4 = 53.2 |
| r 9 = −11.310 | d 9 = 0.70 | n 5 = 1.56732 | υ 5 = 42.8 |
| r10 = 5.125 | d10 = 0.80 | | |
| r11 = 13.464 | d11 = 0.50 | n 6 = 1.84666 | υ 6 = 23.8 |
| r12 = 5.077 | d12 = 2.20 | n 7 = 1.62374 | υ 7 = 47.1 |
| r13 = −13.054 | d13 = Variable | | |
| r14 = 18.841* | d14 = 1.50 | n 8 = 1.67790 | υ 8 = 55.3 |
| r15 = −777.778 | d15 = Variable | | |
| r16 = ∞ | d16 = 2.70 | n 9 = 1.51633 | υ 9 = 64.2 |
| r17 = ∞ | | | |

*: Aspheric Surface

| Variable | Focal Length | | | | |
|---|---|---|---|---|---|
| Separation | 5.01 | 8.16 | 12.50 | 7.55 | 11.06 |
| d 6 | 13.05 | 5.64 | 2.65 | 6.52 | 3.20 |
| d13 | 5.78 | 7.75 | 14.91 | 7.18 | 12.06 |
| d15 | 2.00 | 3.74 | 2.62 | 3.52 | 3.52 |

Aspheric Coefficients:

| | | | |
|---|---|---|---|
| r 2 | r = 6.31534D + 00 | k = −5.46758D − 02 | B = −4.72268D − 04 |
| | C = −8.98226D − 06 | D = −2.75545D − 07 | E = 0 |
| r 8 | r = 5.46152D + 00 | k = 1.01605D − 04 | B = −5.53886D − 04 |
| | C = −1.13342D − 05 | D = −6.29099D − 07 | E = 0 |
| r14 | r = 1.88412D + 01 | k = 1.76849D + 01 | B = −4.79456D − 04 |
| | C = 2.27558D − 06 | D = −1.16032D − 06 | E = 0 |

Numerical Example 7:

f = 5.17390　　Fno = 2.9–4.0　　2ω = 65.0°–35.6°

| | | | |
|---|---|---|---|
| r 1 = 42.791 | d 1 = 1.20 | n 1 = 1.80610 | υ 1 = 40.7 |
| r 2 = 4.049* | d 2 = 1.16 | | |
| r 3 = 7.166* | d 3 = 2.00 | n 2 = 1.84666 | υ 2 = 23.8 |
| r 4 = 20.302 | d 4 = Variable | | |
| r 5 = Stop | d 5 = 1.00 | | |
| r 6 = 4.193* | d 6 = 1.80 | n 3 = 1.73077 | υ 3 = 40.5 |
| r 7 = 179.669 | d 7 = 0.60 | n 4 = 1.68893 | υ 4 = 31.1 |
| r 8 = 3.922 | d 8 = 0.64 | | |
| r 9 = 41.301 | d 9 = 0.50 | n 5 = 1.84666 | υ 5 = 23.8 |
| r10 = 7.855 | d10 = 1.50 | n 6 = 1.77250 | υ 6 = 49.6 |
| r11 = −11.189 | d11 = Variable | | |
| r12 = 12.787 | d12 = 0.50 | n 7 = 1.77250 | υ 7 = 49.6 |
| r13 = 8.122 | d13 = 1.60 | n 8 = 1.60311 | υ 8 = 60.6 |
| r14 = −80.823 | d14 = Variable | | |
| r15 = ∞ | d15 = 2.70 | n 9 = 1.51633 | υ 9 = 64.2 |
| r16 = ∞ | | | |

*: Aspheric Surface

| Variable | Focal Length | | | | |
|---|---|---|---|---|---|
| Separation | 5.17 | 7.90 | 10.29 | 6.34 | 9.05 |
| d 4 | 10.47 | 5.45 | 2.13 | 8.20 | 3.73 |
| d11 | 3.44 | 7.70 | 8.58 | 6.01 | 8.34 |
| d14 | 3.10 | 2.75 | 4.48 | 2.48 | 3.42 |

-continued

Aspheric Coefficients:

| | | | |
|---|---|---|---|
| r 2 | r = 4.04923D + 00 | k = −9.22223D − 01 | B = 5.29792D − 04 |
| | C = −2.63504D − 06 | D = 1.56641D − 06 | E = 0 |
| r 3 | r = 7.16582D + 00 | k = 5.55377D − 02 | B = 6.54277D − 05 |
| | C = −7.04953D − 06 | D = 1.14638D − 06 | E = 0 |
| r 6 | r = 4.19313D + 00 | k = −1.45647D + 00 | B = 1.59107D − 03 |
| | C = 1.29514D − 05 | D = 4.75114D − 08 | E = 0 |

Numerical Example 8:

f = 5.49–11.00   Fno = 2.8–4.0   2ω = 61.6°–33.2°

| | | | |
|---|---|---|---|
| r 1 = 50.794 | d 1 = 1.20 | n 1 = 1.80238 | υ 1 = 40.7 |
| r 2 = 3.763* | d 2 = 1.12 | | |
| r 3 = 6.748 | d 3 = 2.00 | n 2 = 1.84666 | υ 2 = 23.9 |
| r 4 = 29.562 | d 4 = Variable | | |
| r 5 = ∞(Stop) | d 5 = 0.70 | | |
| r 6 = 4.239* | d 6 = 1.90 | n 3 = 1.73077 | υ 3 = 40.5 |
| r 7 = −97.172 | d 7 = 0.50 | n 4 = 1.69895 | υ 4 = 30.1 |
| r 8 = 3.738 | d 8 = 0.57 | | |
| r 9 = 9.515 | d 9 = 0.50 | n 5 = 1.84666 | υ 5 = 23.9 |
| r10 = 4.833 | d10 = 1.80 | n 6 = 1.69680 | υ 6 = 55.5 |
| r11 = −12.483 | d11 = 0.20 | | |
| r12 = 75.966 | d12 = 1.20 | n 7 = 1.80400 | υ 7 = 46.6 |
| r13 = 29.737 | d13 = Variable | | |
| r14 = 11.231* | d14 = 1.50 | n 8 = 1.58313 | υ 8 = 59.4 |
| r15 = 73.773 | d15 = Variable | | |
| r16 = ∞ | d16 = 2.80 | n 9 = 1.51633 | υ 9 = 64.1 |
| r17 = ∞ | | | |

*: Aspheric Surface

| Variable | Focal Length | | |
|---|---|---|---|
| Separation | 5.49 | 8.41 | 11.00 |
| d 4 | 9.30 | 3.73 | 2.08 |
| d13 | 1.96 | 4.96 | 9.62 |
| d15 | 2.92 | 3.09 | 1.60 |

Aspheric Coefficients:

| | | | |
|---|---|---|---|
| r 2 | r = 3.76265D + 00 | k = −1.25277D + 00 | B = 1.25061D − 03 |
| | C = 1.80797D − 05 | D = −3.18047D − 06 | E = 2.30422D − 07 |
| | F = −6.60179D − 09 | | |
| r 6 | r = 4.23856D + 00 | k = −1.17104D + 00 | B = 1.18666D − 03 |
| | C = 7.46493D − 05 | D = −1.44918D − 05 | E = 1.33154D − 06 |
| r14 | r = 1.12308D + 01 | k = 3.55664D + 00 | B = −4.88846D − 04 |
| | C = 1.28828D − 05 | D = −1.20474D − 06 | E = −1.17389D − 09 |

Numerical Example 9:

| | | | |
|---|---|---|---|
| r 1 = 206.343 | d 1 = 1.40 | n 1 = 1.80238 | υ 1 = 40.7 |
| r 2 = 4.841* | d 2 = 1.87 | | |
| r 3 = 9.750 | d 3 = 2.00 | n 2 = 1.84666 | υ 2 = 23.9 |
| r 4 = 49.125 | d 4 = Variable | | |
| r 5 = Stop | d 5 = 0.70 | | |
| r 6 = 4.564* | d 6 = 2.00 | n 3 = 1.74330 | υ 3 = 49.3 |
| r 7 = 10.675 | d 7 = 0.80 | n 4 = 1.69895 | υ 4 = 30.1 |
| r 8 = 3.878 | d 8 = 0.72 | | |
| r 9 = 10.459 | d 9 = 0.50 | n 5 = 1.84666 | υ 5 = 23.9 |
| r10 = 6.339 | d10 = 1.80 | n 6 = 1.60311 | υ 6 = 60.6 |
| r11 = −19.132 | d11 = Variable | | |
| r12 = 14.948 | d12 = 1.40 | n 7 = 1.48749 | υ 7 = 70.2 |
| r13 = −48.563 | d13 = Variable | | |
| r14 = ∞ | d14 = 2.82 | n 8 = 1.51633 | υ 8 = 64.1 |
| r15 = ∞ | | | |

*: Aspheric Surface

| Variable | Focal Length | | |
|---|---|---|---|
| Separation | 5.49 | 10.60 | 16.18 |
| d 4 | 16.12 | 5.84 | 2.43 |
| d11 | 3.93 | 11.43 | 19.83 |
| d13 | 4.20 | 3.82 | 2.53 |

-continued

Aspheric Coefficients:

| | | | |
|---|---|---|---|
| r 2 | r = 4.84094D + 00 | k = −1.84876D + 00 | B = 1.10500D − 03 |
| | C = −1.66493D − 05 | D = 5.13200D − 07 | E = −2.00144D − 08 |
| | F = 3.39222D − 10 | | |
| r 6 | r = 4.56367D + 00 | k = −2.26047D − 01 | B = −2.89482D − 04 |
| | C = −9.34418D − 06 | D = 1.07843D − 07 | E = −3.76119D − 08 |

Numerical Example 10:

| | | | |
|---|---|---|---|
| r 1 = 59.735 | d 1 = 1.30 | n 1 = 1.67470 | υ 1 = 54.9 |
| r 2 = 6.518* | d 2 = 2.02 | | |
| r 3 = 21.785 | d 3 = 0.80 | n 2 = 1.77250 | υ 2 = 49.6 |
| r 4 = 8.687 | d 4 = 1.48 | | |
| r 5 = 11.006 | d 5 = 2.00 | n 3 = 1.84666 | υ 3 = 23.9 |
| r 6 = 33.156 | d 6 = Variable | | |
| r 7 = Stop | d 7 = 0.80 | | |
| r 8 = 4.526* | d 8 = 2.20 | n 4 = 1.74330 | υ 4 = 49.3 |
| r 9 = 11.087 | d 9 = 0.60 | n 5 = 1.69895 | υ 5 = 30.1 |
| r10 = 3.873 | d10 = 0.75 | | |
| r11 = 10.369 | d11 = 0.50 | n 6 = 1.84666 | υ 6 = 23.9 |
| r12 = 6.401 | d12 = 1.80 | n 7 = 1.60311 | υ 7 = 60.6 |
| r13 = −19.975 | d13 = Variable | | |
| r14 = 12.110* | d14 = 1.50 | n 8 = 1.48749 | υ 8 = 70.2 |
| r15 = −54.317 | d15 = Variable | | |
| r16 = ∞ | d16 = 2.83 | n 9 = 1.51633 | υ 9 = 64.1 |
| r17 = ∞ | | | |

*: Aspheric Surface

| Variable | Focal Length | | |
|---|---|---|---|
| Separation | 5.00 | 9.79 | 14.98 |
| d 6 | 14.64 | 5.46 | 2.12 |
| d13 | 4.83 | 13.24 | 21.64 |
| d15 | 3.55 | 3.02 | 2.51 |

Aspheric Coefficients:

| | | | |
|---|---|---|---|
| r 2 | r = 6.51783D + 00 | k = 2.42523D − 01 | B = −5.97797D − 04 |
| | C = −1.56333D − 06 | D = −7.09941D − 07 | E = 2.27735D − 08 |
| | E = −6.39051D − 10 | | |
| r 8 | r = 4.52644D + 00 | k = −1.27422D − 01 | B = −3.12555D − 04 |
| | C = −9.46539D − 06 | D = 8.23854D − 08 | E = −3.89693D − 08 |
| r14 | r = 1.21103D + 01 | k = 0 | B = −1.72597D − 04 |
| | C = 7.00489D − 06 | D = −1.67824D − 07 | |

Numerical Example 11:

| | | | |
|---|---|---|---|
| r 1 = 156.481 | d 1 = 1.30 | n 1 = 1.80238 | υ 1 = 40.7 |
| r 2 = 5.435* | d 2 = 1.83 | | |
| r 3 = 9.697 | d 3 = 2.20 | n 2 = 1.84666 | υ 2 = 23.9 |
| r 4 = 34.098 | d 4 = Variable | | |
| r 5 = Stop | d 5 = 0.80 | | |
| r 6 = 4.588* | d 6 = 2.00 | n 3 = 1.74330 | υ 3 = 49.3 |
| r 7 = 13.399 | d 7 = 0.60 | n 4 = 1.69895 | υ 4 = 30.1 |
| r 8 = 3.929 | d 8 = 0.66 | | |
| r 9 = 11.757 | d 9 = 0.60 | n 5 = 1.84666 | υ 5 = 23.9 |
| r10 = 7.899 | d10 = 1.70 | n 6 = 1.60311 | υ 6 = 60.6 |
| r11 = −20.079 | d11 = Variable | | |
| r12 = 25.476 | d12 = 0.50 | n 7 = 1.60342 | υ 7 = 38.0 |
| r13 = 24.901 | d13 = 1.60 | n 8 = 1.49700 | υ 8 = 81.5 |
| r14 = −25.962 | d14 = Variable | | |
| r15 = ∞ | d15 = 2.80 | n 9 = 1.51633 | υ 9 = 64.1 |
| r16 = ∞ | | | |

*: Aspheric Surface

| Variable | Focal Length | | |
|---|---|---|---|
| Separation | 5.64 | 10.99 | 16.51 |
| d 4 | 18.32 | 6.10 | 2.69 |
| d11 | 3.11 | 9.75 | 18.27 |
| d14 | 4.42 | 4.42 | 2.54 |

Aspheric Coefficients:

| r 2 | r = 5.43534D + 00 | k = −2.28361D + 00 | B = 1.23160D − 03 |
|---|---|---|---|
| | C = −2.40093D − 05 | D = 8.92996D − 07 | E = −2.78071D − 08 |
| | F = 3.81774D − 10 | | |
| r 6 | r = 4.58844D + 00 | k = −1.27107D − 01 | B = −2.62331D − 04 |
| | C = −8.61678D − 06 | D = 1.99209D − 07 | E = −3.78975D − 08 |

Numerical Example 12:

f = 1–2.83    Fno = 2.87–4.90    2ω = 59.5°–22.8°

| r 1 = 10.855 | d 1 = 0.21 | n 1 = 1.802380 | υ 1 = 40.8 |
|---|---|---|---|
| r 2 = 0.830* | d 2 = 0.31 | | |
| r 3 = 1.545 | d 3 = 0.29 | n 2 = 1.846660 | υ 2 = 23.9 |
| r 4 = 4.768 | d 4 = Variable | | |
| r 5 = Stop | d 5 = 0.11 | | |
| r 6 = 0.885* | d 6 = 0.43 | n 3 = 1.802380 | υ 3 = 40.8 |
| r 7 = −5.079 | d 7 = 0.10 | n 4 = 1.698947 | υ 4 = 30.1 |
| r 8 = 0.720 | d 8 = 0.08 | | |
| r 9 = 2.210 | d 9 = 0.09 | n 5 = 1.698947 | υ 5 = 30.1 |
| r10 = 0.944 | d10 = 0.31 | n 6 = 1.603112 | υ 6 = 60.6 |
| r11 = −3.065 | d11 = Variable | | |
| r12 = 2.292 | d12 = 0.21 | n 7 = 1.518229 | υ 7 = 58.9 |
| r13 = 144.538 | d13 = 0.43 | | |
| r14 = ∞ | d14 = 0.44 | n 8 = 1.516330 | υ 8 = 64.1 |
| r15 = ∞ | | | |

*: Aspheric Surface

| Variable | Focal Length | | |
|---|---|---|---|
| Separation | 1.00 | 2.41 | 2.83 |
| d 4 | 2.57 | 0.54 | 0.32 |
| d11 | 0.87 | 2.62 | 3.11 |

Aspheric Coefficients:

| r 2 | k = −1.30000e + 00 | B = 1.19770e − 01 | C = 6.17069e − 02 |
|---|---|---|---|
| | D = −1.61837e − 01 | E = 1.55951e − 01 | F = −4.47577e − 02 |
| r 6 | k = −6.96530e − 02 | B = −6.61431e − 02 | C = −4.49055e − 02 |
| | D = −6.81707e − 02 | E = −4.05399e − 02 | E = 0.00000e + 00 |

Numerical Example 13:

f = 1–2.83    Fno = 2.86–4.90    2ω = 59.5°–22.8°

| r 1 = 9.686 | d 1 = 0.21 | n 1 = 1.802380 | υ 1 = 40.8 |
|---|---|---|---|
| r 2 = 0.838* | d 2 = 0.31 | | |
| r 3 = 1.532 | d 3 = 0.29 | n 2 = 1.846660 | υ 2 = 23.9 |
| r 4 = 4.456 | d 4 = Variable | | |
| r 5 = Stop | d 5 = 0.11 | | |
| r 6 = 0.884* | d 6 = 0.44 | n 3 = 1.743300 | υ 3 = 49.3 |
| r 7 = −3.817 | d 7 = 0.10 | n 4 = 1.603420 | υ 4 = 38.0 |
| r 8 = 0.715 | d 8 = 0.09 | | |
| r 9 = 2.243 | d 9 = 0.09 | n 5 = 1.698947 | υ 5 = 30.1 |
| r10 = 0.828 | d10 = 0.33 | n 6 = 1.603112 | υ 6 = 60.6 |
| r11 = −3.729 | d11 = Variable | | |
| r12 = 2.648 | d12 = 0.21 | n 7 = 1.603112 | υ 7 = 60.6 |
| r13 = 44.247 | d13 = 0.43 | | |
| r14 = ∞ | d14 = 0.44 | n 8 = 1.516330 | υ 8 = 64.1 |
| r15 = ∞ | | | |

*: Aspheric Surface

| Variable | Focal Length | | |
|---|---|---|---|
| Separation | 1.00 | 2.40 | 2.83 |
| d 4 | 2.60 | 0.54 | 0.32 |
| d11 | 0.77 | 2.54 | 3.05 |

Aspheric Coefficients:

| r 2 | k = −1.30000e + 00 | B = 1.18880e − 01 | C = 8.30828e − 02 |
|---|---|---|---|
| | D = −2.46182e − 01 | E = 3.32011e − 01 | F = −1.68932e − 01 |
| r 6 | k = −9.46702e − 02 | B = −7.14402e − 02 | C = −3.93806e − 02 |
| | D = −9.10926e − 02 | E = −4.05399e − 02 | F = 0.00000e + 00 |

Numerical Example 14:

f = 1–2.83    Fno = 2.86–4.90    2ω = 58.0°–22.2°

| r 1 = 40.701 | d 1 = 0.21 | n 1 = 1.806100 | υ 1 = 40.7 |
|---|---|---|---|
| r 2 = 0.876* | d 2 = 0.28 | | |
| r 3 = 1.641 | d 3 = 0.31 | n 2 = 1.846660 | υ 2 = 23.9 |
| r 4 = 7.676 | d 4 = Variable | | |
| r 5 = Stop | d 5 = 0.11 | | |
| r 6 = 0.797* | d 6 = 0.37 | n 3 = 1.743300 | υ 3 = 49.3 |
| r 7 = 38.519 | d 7 = 0.08 | n 4 = 1.647689 | υ 4 = 33.8 |
| r 8 = 0.674 | d 8 = 0.09 | | |
| r 9 = 2.419 | d 9 = 0.07 | n 5 = 1.846660 | υ 5 = 23.9 |
| r10 = 1.359 | d10 = 0.25 | n 6 = 1.603112 | υ 6 = 60.6 |
| r11 = −2.632 | d11 = Variable | | |
| r12 = 3.108* | d12 = 0.24 | n 7 = 1.589130 | υ 7 = 61.3 |
| r13 = −25.016 | d13 = 0.42 | | |
| r14 = ∞ | d14 = 0.43 | n 8 = 1.516330 | υ 8 = 64.1 |
| r15 = ∞ | | | |

*: Aspheric Surface

| Variable | Focal Length | | |
|---|---|---|---|
| Separation | 1.00 | 2.39 | 2.83 |
| d 4 | 2.58 | 0.51 | 0.27 |
| d11 | 0.72 | 2.55 | 3.04 |

Aspheric Coefficients:

| r 2 | k = −2.25821e + 00 | B = 2.69487e − 01 | C = −1.72442e − 01 |
|---|---|---|---|
| | D = 1.53228e − 01 | E = −1.20333e − 01 | F = 4.19943e − 02 |
| r 6 | k = −9.88795e − 02 | B = −7.77363e − 02 | C = −4.83226e − 02 |
| | D = −1.69170e − 01 | E = 7.89854e − 03 | F = 0.00000e + 00 |
| r12 | k = −2.86549e + 00 | B = −2.19540e − 02 | C = 1.90603e − 01 |
| | D = −6.03124e − 01 | E = 7.17200e − 01 | F = −5.29660e − 02 |

Numerical Example 15:

f = 1–2.95    Fno = 2.77–4.80    2ω = 61.7°–22.9°

| r 1 = 11.859 | d 1 = 0.23 | n 1 = 1.802380 | υ 1 = 40.7 |
|---|---|---|---|
| r 2 = 0.886* | d 2 = 0.35 | | |
| r 3 = 1.689 | d 3 = 0.38 | n 2 = 1.846660 | υ 2 = 23.9 |
| r 4 = 5.373 | d 4 = Variable | | |
| r 5 = Stop | d 5 = 0.12 | | |
| r 6 = 0.868* | d 6 = 0.40 | n 3 = 1.743300 | υ 3 = 49.3 |
| r 7 = 2.419 | d 7 = 0.11 | n 4 = 1.647689 | υ 4 = 33.8 |
| r 8 = 0.732 | d 8 = 0.12 | | |
| r 9 = 1.890 | d 9 = 0.09 | n 5 = 1.846660 | υ 5 = 23.9 |
| r10 = 1.093 | d10 = 0.33 | n 6 = 1.603112 | υ 6 = 60.6 |
| r11 = −3.344 | d11 = Variable | | |
| r12 = 2.445 | d12 = 0.27 | n 7 = 1.487490 | υ 7 = 70.2 |
| r13 = −37.684 | d13 = 0.45 | | |
| r14 = ∞ | d14 = 0.46 | n 8 = 1.516330 | υ 8 = 64.1 |
| r15 = ∞ | | | |

*: Aspheric Surface

| Variable | Focal Length | | |
|---|---|---|---|
| Separation | 1.00 | 2.50 | 2.95 |
| d 4 | 2.98 | 0.60 | 0.35 |
| d11 | 0.83 | 2.82 | 3.36 |

Aspheric Coefficients:

| r 2 | k = −1.55665e + 00 | B = 1.47610e − 01 | C = −2.95829e − 02 |
|---|---|---|---|
| | D = 3.79213e − 02 | E = −5.88716e − 02 | F = 3.154797e − 02 |
| r 6 | k = −1.02390e − 01 | B = −5.07761e − 02 | C = −3.18134e − 02 |
| | D = −5.79304e − 02 | E = −2.08294e − 02 | F = 0.00000e + 00 |

-continued

Numerical Example 16:

| | | | |
|---|---|---|---|
| f = 8.30–23.47 | Fno = 2.5–2.7 | 2ω = 51.4°–19.4° | |
| r 1 = 46.215 | d 1 = 1.20 | n 1 = 1.80518 | υ 1 = 25.4 |
| r 2 = 19.163 | d 2 = 3.80 | n 2 = 1.60311 | υ 2 = 60.6 |
| r 3 = 116.984 | d 3 = 0.15 | | |
| r 4 = 19.039 | d 4 = 2.80 | n 3 = 1.88300 | υ 3 = 40.8 |
| r 5 = 42.230 | d 5 = Variable | | |
| r 6 = 26.271 | d 6 = 0.80 | n 4 = 1.80400 | υ 4 = 46.6 |
| r 7 = 6.303 | d 7 = 3.30 | | |
| r 8 = −25.212 | d 8 = 0.80 | n 5 = 1.80400 | υ 5 = 46.6 |
| r 9 = 23.457 | d 9 = 0.15 | n 6 = 1.8466 | υ 6 = 23.9 |
| r10 = 13.195 | d10 = 1.90 | n 6 = 1.84666 | υ 6 = 23.9 |
| r11 = −1851.608 | d11 = Variable | | |
| r12 = ∞(Stop) | d12 = 0.70 | | |
| r13 = 5.603* | d13 = 2.00 | n 7 = 1.80610 | υ 7 = 40.7 |
| r14 = −4400.826 | d14 = 0.70 | n 8 = 1.64769 | υ 8 = 33.8 |
| r15 = 4.657 | d15 = 0.76 | | |
| r16 = 12.303 | d16 = 0.70 | n 9 = 1.84666 | υ 9 = 23.9 |
| r17 = 5.465 | d17 = 2.20 | n10 = 1.69680 | υ10 = 55.5 |
| r18 = −19.981 | d18 = Variable | | |
| r19 = ∞ | d19 = 3.60 | n11 b = 1.51633 | υ11 = 64.1 |
| r20 = ∞ | | | |

*: Aspheric Surface

| Variable | Focal Length | | |
|---|---|---|---|
| Separation | 8.30 | 13.20 | 23.47 |
| d 5 | 0.78 | 4.89 | 12.37 |
| d11 | 13.91 | 7.13 | 1.98 |
| d18 | 8.37 | 9.68 | 9.36 |

Aspheric Coefficients:

| | | | |
|---|---|---|---|
| r13 | r = 5.60310D + 00 | k = −7.53743D − 02 | B = −2.55782D − 04 |
| | C = −1.90029D − 06 | D = −2.81043D − 07 | |

Numerical Example 17:

| | | | |
|---|---|---|---|
| f = 8.16–23.52 | Fno = 2.8–3.0 | 2ω = 52.2° 14 19.4– | |
| r 1 = 28.153 | d 1 = 1.20 | n 1 = 1.84666 | υ 1 = 23.9 |
| r 2 = 14.663 | d 2 = 3.80 | n 2 = 1.60311 | υ 2 = 60.6 |
| r 3 = 49.137 | d 3 = 0.15 | | |
| r 4 = 18.704 | d 4 = 2.80 | n 3 = 1.88300 | υ 3 = 40.8 |
| r 5 = 79.862 | d 5 = Variable | | |
| r 6 = 49.193 | d 6 = 0.80 | n 4 = 1.80400 | υ 4 = 46.6 |
| r 7 = 5.507 | d 7 = 2.38 | | |
| r 8 = −23.025 | d 8 = 0.80 | n 5 = 1.80400 | υ 5 = 46.6 |
| r 9 = 19.732 | d 9 = 0.15 | | |
| r10 = 10.899 | d10 = 1.90 | n 6 = 1.84666 | υ 6 = 23.9 |
| r11 = 285.136 | d11 = Variable | | |
| r12 = ∞(Stop) | d12 = 0.70 | | |
| r13 = 5.514* | d13 = 2.20 | n 7 = 1.80610 | υ 7 = 40.7 |
| r14 = 20.631 | d14 = 0.70 | n 8 = 1.64769 | υ 8 = 33.8 |
| r15 = 4.853 | d15 = 0.86 | | |
| r16 = 14.460 | d16 = 0.70 | n 9 = 1.84666 | υ 9 = 23.9 |
| r17 = 5.262 | d17 = 2.20 | n10 = 1.69680 | υ10 = 55.5 |
| r18 = −15.102 | d18 = 0.48 | | |
| r19 = 19.154 | d19 = 1.20 | n11 = 1.60311 | υ11 = 60.6 |
| r20 = 38.780 | d20 = Variable | | |
| r21 = ∞ | d21 = 3.60 | n12 = 1.51633 | υ12 = 64.1 |
| r22 = ∞ | | | |

*: Aspheric Surface

| Variable | Focal Length | | |
|---|---|---|---|
| Separation | 8.16 | 14.43 | 23.52 |
| d 5 | 1.34 | 5.66 | 9.97 |
| d11 | 10.09 | 4.60 | 0.93 |
| d20 | 6.48 | 7.66 | 7.02 |

Aspheric Coefficients:

| | | | |
|---|---|---|---|
| r13 | r = 5.51421D + 00 | k = 2.29022D − 04 | B = −3.80676D − 04 |
| | C = −8.14505D − 07 | D = −8.43970D − 07 | E = 9.39788D − 09 |

Numerical Example 18:

| | | | |
|---|---|---|---|
| f = 6.536–19.472 | Fno = 2.4–4.3 | 2ω = 31.5°–11.6° | |
| r 1 = 24.829 | d 1 = 3.50 | n 1 = 1.51633 | υ 1 = 64.1 |
| r 2 = −78.406 | d 2 = Variable | | |
| r 3 = −45.531 | d 3 = 1.50 | n 2 = 1.80610 | υ 2 = 40.7 |
| r 4 = 4.868* | d 4 = 1.47 | | |
| r 5 = 8.390 | d 5 = 2.50 | n 3 = 1.84666 | υ 3 = 23.9 |
| r 6 = 26.870 | d 6 = Variable | | |
| r 7 = Stop | d 7 = 0.70 | | |
| r 8 = 4.610* | d 8 = 2.30 | n 4 = 1.73077 | υ 4 = 40.5 |
| r 9 = −19.983 | d 9 = 0.60 | n 5 = 1.69895 | υ 5 = 30.1 |
| r10 = 3.921 | d10 = 0.71 | | |
| r11 = 11.628 | d11 = 0.60 | n 6 = 1.84666 | υ 6 = 23.9 |
| r12 = 7.423 | d12 = 2.20 | n 7 = 1.69680 | υ 7 = 55.5 |
| r13 = −25.786 | d13 = Variable | | |
| r14 = 17.234* | d14 = 1.80 | n 8 = 1.58913 | υ 8 = 61.1 |
| r15 = −244.275 | d15 = Variable | | |
| r16 = ∞ | d16 = 2.80 | n 9 = 1.51633 | υ 9 = 64.2 |
| r17 = ∞ | | | |

*: Aspheric Surface

| Variable | Focal Length | | |
|---|---|---|---|
| Separation | 6.54 | 9.41 | 19.47 |
| d 2 | 1.22 | 1.37 | 3.61 |
| d 6 | 14.34 | 7.82 | 1.63 |
| d13 | 3.12 | 5.56 | 16.48 |
| d15 | 3.00 | 2.67 | 2.00 |

Aspheric Coefficients:

| | | | |
|---|---|---|---|
| r 4 | r = 4.86800D + 00 | k = −1.11787D + 00 | B = 4.72504D − 04 |
| | C = −7.93706D − 07 | D = 4.38068D − 08 | E = −1.11306D − 09 |
| r 8 | r = 4.60970D + 09 | k = −2.51848D − 01 | B = −1.73777D − 04 |
| | C = −1.86458D − 06 | D = −2.42243D − 07 | E = 0 |
| r14 | r = 1.72337D + 01 | k = 8.29916D + 00 | B = −1.53985D − 04 |
| | C = −7.43125D − 07 | D = −2.10170D − 07 | E = 0 |

Numerical Example 19:

| | | | |
|---|---|---|---|
| f = 6.578–19.447 | Fno = 2.6–4.5 | 2ω = 31.3°–11.6° | |
| r 1 = 28.716 | d 1 = 3.0b | n 1 = 1.56732 | υ 1 = 42.8 |
| r 2 = −1281.581 | d 2 = Variable | | |
| r 3 = 1000.000 | d 3 = 1.50 | n 2 = 1.80610 | υ 2 = 40.7 |
| r 4 = 5.403* | d 4 = 2.19 | | |
| r 5 = 9.291 | d 5 = 2.50 | n 3 = 1.84666 | υ 3 = 23.9 |
| r 6 = 20.048 | d 6 = Variable | | |
| r 7 = Stop | d 7 = 0.70 | | |
| r 8 = 4.854* | d 8 = 2.60 | n 4 = 1.74330 | υ 4 = 49.3 |
| r 9 = −38.097 | d 9 = 0.60 | n 5 = 1.64789 | υ 5 = 33.8 |
| r10 = 3.844 | d10 = 0.81 | | |
| r11 = 13.467 | d11 = 0.60 | n 6 = 1.84666 | υ 6 = 23.9 |
| r12 = 7.570 | d12 = 1.80 | n 7 = 1.80400 | υ 7 = 46.6 |
| r13 = −104.325 | d13 = Variable | | |
| r14 = 14.137* | d14 = 1.80 | n 8 = 1.58913 | υ 8 = 61.3 |
| r15 = −244.275 | d15 = Variable | | |
| r16 = ∞ | d16 = 2.80 | n 9 = 1.51633 | υ 9 = 64.2 |
| r17 = ∞ | | | |

*: Aspheric Surface

-continued

| Variable Separation | Focal Length | | |
|---|---|---|---|
| | 6.58 | 9.83 | 19.45 |
| d 2 | 1.56 | 2.44 | 2.58 |
| d 6 | 15.96 | 9.13 | 1.65 |
| d13 | 4.19 | 7.93 | 18.37 |
| d15 | 3.00 | 2.67 | 2.00 |

Aspheric Coefficients:

| r 4 | r = 5.40288D + 00 | k = −1.34028D + 00 | B = 5.92113D − 04 |
|---|---|---|---|
| | C = −5.67615D − 07 | D = 4.91986D − 08 | E = −2.86852D − 10 |
| r 8 | r = 4.85425D + 00 | k = −2.39569D − 01 | B = −1.68862D − 04 |
| | C = −1.06360D − 06 | D = −2.57826D − 07 | E = 0 |
| r14 | r = 1.41367D + 01 | k = 4.64118D + 00 | B = −2.00943D − 04 |
| | C = 2.29287D − 06 | D = −2.44803D − 07 | E = 0 |

Numerical Example 20:

f = 7.053–20.962   Fno = 2.8–4.8   2ω = 29.6°–10.8°

| r 1 = 38.893 | d 1 = 2.50 | n 1 = 1.51633 | υ 1 = 64.1 |
|---|---|---|---|
| r 2 = 694.191 | d 2 = Variable | | |
| r 3 = 546.993 | d 3 = 1.40 | n 2 = 1.80610 | υ 2 = 40.7 |
| r 4 = 5.701* | d 4 = 1.71 | | |
| r 5 = 9.484 | d 5 = 2.80 | n 3 = 1.80518 | υ 3 = 25.4 |
| r 6 = 34.922 | d 6 = Variable | | |
| r 7 = Stop | d 7 = 0.50 | | |
| r 8 = 4.606* | d 8 = 2.30 | n 4 = 1.74330 | υ 4 = 49.3 |
| r 9 = 38.291 | d 9 = 0.60 | n 5 = 1.64769 | υ 5 = 33.8 |
| r10 = 3.638 | d10 = 0.73 | | |
| r11 = 11.739 | d11 = 0.50 | n 6 = 1.84666 | υ 6 = 23.9 |
| r12 = 6.453 | d12 = 2.20 | n 7 = 1.77250 | υ 7 = 46.6 |
| r13 = −3576.271 | d13 = Variable | | |
| r14 = 18.906* | d14 = 1.60 | n 8 = 1.74330 | υ 8 = 49.3 |
| r15 = 723.882 | d15 = Variable | | |
| r16 = ∞ | d16 = 2.80 | n 9 = 1.51633 | υ 9 = 64.2 |
| r17 = ∞ | | | |

*: Aspheric Surface

| Variable Separation | Focal Length | | |
|---|---|---|---|
| | 7.05 | 9.98 | 20.96 |
| d 2 | 1.26 | 3.75 | 6.28 |
| d 6 | 18.03 | 11.25 | 1.46 |
| d13 | 4.12 | 7.24 | 17.27 |
| d15 | 3.75 | 3.24 | 1.90 |

Aspheric Coefficients:

| r 4 | r = 5.70084D + 00 | k = −1.36249D + 00 | B = 4.81312D − 04 |
|---|---|---|---|
| | C = −5.89681D − 07 | D = 3.10192D − 08 | E = −4.41943D − 10 |
| r 8 | r = 4.60565D + 00 | k = −1.40692D − 01 | B = −2.29960D − 04 |
| | C = −2.47556D − 06 | D = −6.05192D − 07 | E = 0 |
| r14 | r = 1.89058D + 01 | k = 1.03434D + 01 | B = −2.02440D − 04 |
| | C = 1.84121D − 06 | D = −2.56630D − 07 | E = 0 |

Numerical Example 21:

f = 7.21–21.6   Fno = 2.8–4.6   2ω = 63.0°–23.2°

| r 1 = 49.699 | d 1 = 3.40 | n 1 = 1.60342 | υ 1 = 38.0 |
|---|---|---|---|
| r 2 = −214.041 | d 2 = Variable | | |
| r 3 = −191.155 | d 3 = 1.60 | n 2 = 1.80610 | υ 2 = 40.7 |
| r 4 = 6.821* | d 4 = 2.43 | | |
| r 5 = 11.461 | d 5 = 2.60 | n 3 = 1.84666 | υ 3 = 23.9 |
| r 6 = 26.782 | d 6 = Variable | | |
| r 7 = ∞(Stop) | d 7 = 0.80 | | |
| r 8 = 6.125* | d 8 = 2.80 | n 4 = 1.74330 | υ 4 = 49.3 |
| r 9 = −57.878 | d 9 = 0.70 | n 5 = 1.60342 | υ 5 = 38.0 |
| r10 = 4.994 | d10 = 0.80 | | |
| r11 = 29.228 | d11 = 0.60 | n 6 = 1.84666 | υ 6 = 23.9 |
| r12 = 7.323 | d12 = 2.00 | n 7 = 1.80610 | υ 7 = 40.9 |
| r13 = −58.719 | d13 = 0.60 | | |
| r14 = −157.380 | d14 = 1.20 | n 8 = 1.60311 | υ 8 = 60.6 |
| r15 = −36.163 | d15 = Variable | | |
| r16 = 22.737* | d16 = 2.00 | n 9 = 1.73077 | υ 9 = 40.5 |
| r17 = −317.035 | d17 = Variable | | |
| r18 = ∞ | d18 = 2.80 | n10 = 1.51633 | υ 10 = 64.1 |
| r19 = ∞ | | | |

*: Aspheric Surface

| Variable Separation | Focal Length | | |
|---|---|---|---|
| | 7.21 | 14.39 | 21.60 |
| d 2 | 2.87 | 5.59 | 7.25 |
| d 6 | 21.03 | 6.28 | 2.08 |
| d15 | 4.20 | 10.27 | 18.32 |
| d17 | 4.15 | 4.68 | 3.23 |

Aspheric Coefficients:

| r 4 | r = 6.82146D + 00 | k = −1.23185D + 00 | B = 2.30209D − 04 |
|---|---|---|---|
| | C = 1.19423D − 06 | D = −2.94742D − 08 | E = 5.59925D − 10 |
| | F = −3.90809D − 12 | | |
| r 8 | r = 6.12494D + 00 | k = −1.41958D − 02 | B = −2.36407D − 04 |
| | C = −3.85490D − 06 | D = −1.03385D − 07 | E = −1.53766D − 09 |
| r16 | r = 2.27375D + 01 | k = 3.32586D + 00 | B = −4.66734D − 05 |
| | C = 2.44124D − 06 | D = −1.27510D − 07 | E = 2.36357D − 09 |

Numerical Example 22:

f = 1–2.95   Fno = 2.83–4.80   2ω = 62.4°–23.2°

| r 1 = 4.018 | d 1 = 0.32 | n 1 = 1.622992 | υ 1 = 58.2 |
|---|---|---|---|
| r 2 = 10.226 | d 2 = Variable | | |
| r 3 = 47.992 | d 3 = D.23 | n 2 = 1.806100 | υ 2 = 40.7 |
| r 4 = 0.877* | d 4 = 0.33 | | |
| r 5 = 1.592 | d 5 = 0.36 | n 3 = 1.846660 | υ 3 = 23.9 |
| r 6 = 4.394 | d 6 = Variable | | |
| r 7 = Stop | d 7 = 0.12 | | |
| r 8 = 0.804* | d 8 = 0.39 | n 4 = 1.743300 | υ 4 = 49.3 |
| r 9 = −1.886 | d 9 = 0.09 | n 5 = 1.603420 | υ 5 = 38.0 |
| r10 = 0.615 | d10 = 0.09 | | |
| r11 = 2.172 | d11 = 0.08 | n 6 = 1.846660 | υ 6 = 23.9 |
| r12 = 1.026 | d12 = 0.27 | n 7 = 1.804000 | υ 7 = 46.6 |
| r13 = 18.152 | d13 = Variable | | |
| r14 = 2.399* | d14 = 0.27 | n 8 = 1.589130 | υ 8 = 61.3 |
| r15 = −8.095 | d15 = 0.41 | | |
| r16 = ∞ | d16 = 0.47 | n 9 = 1.516330 | υ 9 = 64.2 |
| r17 = ∞ | | | |

*: Aspheric Surface

| Variable Separation | Focal Length | | |
|---|---|---|---|
| | 1.00 | 1.99 | 2.95 |
| d 2 | 0.18 | 1.02 | 0.70 |
| d 6 | 2.70 | 0.99 | 0.27 |
| d13 | 0.70 | 1.62 | 2.74 |

Aspheric Coefficients:

| r 4 | k = −1.26225D + 00 | B = 1.01038D − 01 | C = 7.59121D − 03 |
|---|---|---|---|
| | D = 2.30215D − 03 | E = −6.32251D − 03 | |
| r 8 | k = 7.26365D − 03 | B = −1.19013D − 01 | C = −6.01750D − 02 |
| | D = −4.49477D − 01 | | |
| r14 | k = 3.32586D + 00 | B = −6.59871D − 02 | C = 1.52782D − 01 |
| | D = −3.26786D − 01 | E = 2.26755D − 01 | |

Numerical Example 23:

f = 1–2.95   Fno = 2.88–4.80   2ω = 61.7°–22.8°

| r 1 = 7.028 | d 1 = 0.31 | n 1 = 1.603112 | υ 1 = 60.6 |
|---|---|---|---|
| r 2 = 149.254 | d 2 = Variable | | |
| r 3 = 64.955 | d 3 = 0.22 | n 2 = 1.806100 | υ 2 = 40.7 |
| r 4 = 0.888* | d 4 = 0.33 | | |
| r 5 = 1.581 | d 5 = 0.36 | n 3 = 1.846660 | υ 3 = 23.9 |

-continued

| | | | |
|---|---|---|---|
| r 6 = 4.507 | d 6 = Variable | | |
| r 7 = Stop | d 7 = 0.12 | | |
| r 8 = 0.813* | d 8 = 0.39 | n 4 = 1.743300 | ν 4 = 49.3 |
| r 9 = −2.241 | d 9 = 0.09 | n 5 = 1.603420 | ν 5 = 38.0 |
| r10 = 0.631 | d10 = 0.09 | | |
| r11 = 2.984 | d11 = 0.07 | n 6 = 1.805181 | ν 6 = 25.4 |
| r12 = 1.034 | d12 = 0.27 | n 7 = 1.804000 | ν 7 = 46.6 |
| r13 = −16.115 | d13 = Variable | | |
| r14 = 2.304* | d14 = 0.27 | n 8 = 1.589130 | ν 8 = 61.3 |
| r15 = −13.595 | d15 = 0.40 | | |
| r16 = ∞ | d16 = 0.46 | n 9 = 1.516330 | ν 9 = 64.2 |
| r17 = ∞ | | | |

*: Aspheric Surface

| Variable Separation | Focal Length | | |
|---|---|---|---|
| | 1.00 | 1.98 | 2.95 |
| d 2 | 0.18 | 1.17 | 0.98 |
| d 6 | 2.87 | 1.05 | 0.27 |
| d13 | 0.96 | 1.82 | 2.81 |

Aspheric Coefficients:

| | | | |
|---|---|---|---|
| r 4 | k = −1.35018D + 00 | B = 1.22012D − 01 | C = −8.79868D − 05 |
| | D = −3.82588D − 04 | E = −2.36866D − 03 | |
| r 8 | k = 2.65977D − 02 | B = −1.15320D − 01 | C = −6.86278D − 02 |
| | D = −3.93127D − 01 | | |
| r14 | k = 4.15872D + 00 | B = −6.00707D − 02 | C = 1.01896D − 01 |
| | D = −3.44503D − 01 | E = 2.93165D − 01 | |

Numerical Example 24:

f = 1–3.00  Fno = 2.88–4.80  2ω = 62.4°–22.8°

| | | | |
|---|---|---|---|
| r 1 = 4.066 | d 1 = 0.32 | n 1 = 1.622992 | ν 1 = 58.2 |
| r 2 = 6.949 | d 2 = Variable | | |
| r 3 = 16.963 | d 3 = 0.23 | n 2 = 1.806100 | ν 2 = 40.7 |
| r 4 = 0.881* | d 4 = 0.33 | | |
| r 5 = 1.524 | d 5 = 0.36 | n 3 = 1.846660 | ν 3 = 23.9 |
| r 6 = 3.620 | d 6 = Variable | | |
| r 7 = Stop | d 7 = 0.12 | | |
| r 8 = 0.814* | d 8 = 0.39 | n 4 = 1.743300 | ν 4 = 49.3 |
| r 9 = −1.905 | d 9 = 0.09 | n 5 = 1.603420 | ν 5 = 38.0 |
| r10 = 0.626 | d10 = 0.09 | | |
| r11 = 2.009 | d11 = 0.08 | n 6 = 1.846660 | ν 6 = 23.9 |
| r12 = 0.948 | d12 = 0.27 | n 7 = 1.785896 | ν 7 = 44.2 |
| r13 = 52.991 | d13 = Variable | | |
| r14 = 3.625 | d14 = 0.27 | n 8 = 1.603112 | ν 8 = 60.6 |
| r15 = −6.999 | d15 = 0.41 | | |
| r16 = ∞ | d16 = 0.47 | n 9 = 1.516330 | ν 9 = 64.2 |
| r17 = ∞ | | | |

*: Aspheric Surface

| Variable Separation | Focal Length | | |
|---|---|---|---|
| | 1.00 | 1.97 | 3.00 |
| d 2 | 0.21 | 1.35 | 1.11 |
| d 6 | 2.87 | 1.00 | 0.27 |
| d13 | 0.85 | 1.50 | 2.58 |

Aspheric Coefficients:

| | | | |
|---|---|---|---|
| r 4 | k = −1.58458D + 00 | B = 1.72052D − 01 | C = −7.61801D − 03 |
| | D = −4.03704D − 03 | E = 1.72721D − 03 | |
| r 8 | k = 3.07356D − 02 | B = −1.21990D − 01 | C = −6.46347D − 02 |
| | D = −4.35232D − 01 | | |

TABLE 1

| | Condition | Numerical Example | | |
|---|---|---|---|---|
| | | 3 | 4 | 5 |
| (6) | nd22 | 1.64769 | 1.62004 | 1.69895 |
| (7) | νd22 | 33.8 | 36.3 | 30.1 |
| | X1 | 0.35 | 2.44 | 1.16 |
| (4) | X3 | 1.69 | 0.38 | 0.33 |
| | \|X1/X3\| | 0.21 | 6.45 | 3.53 |
| (5) | L1 | 4.60 | 4.76 | 4.38 |
| | L2 | 5.65 | 5.41 | 5.39 |
| | L3 | 1.60 | 1.50 | 1.60 |
| | L | 35.28 | 31.25 | 31.97 |
| | (L1 + L2 + L3)/L | 0.34 | 0.37 | 0.36 |
| (8) | ΣA2 | 0.65 | 0.61 | 0.59 |
| | ΣD2 | 5.65 | 5.41 | 5.39 |
| | ΣA2/ΣD2 | 0.12 | 0.11 | 0.11 |
| (1) | ndn1 | 1.73077 | 1.80610 | 1.80610 |
| (2) | νdn1 | 40.5 | 40.7 | 40.7 |
| (3) | R21 | 4.411 | 4.215 | 4.132 |
| | R23 | 4.106 | 3.811 | 3.731 |
| | (R21 − R23)/(R21 + R23) | 0.036 | 0.050 | 0.051 |

| | Condition | Numerical Example | | |
|---|---|---|---|---|
| | | 6 | 7 | 8 |
| (6) | nd22 | 1.56732 | 1.68893 | 1.69895 |
| (7) | νd22 | 42.8 | 31.1 | 30.1 |
| | X1 | 3.70 | 1.82 | 2.44 |
| (4) | X3 | −0.63 | −1.38 | 1.33 |
| | \|X1/X3\| | 5.92 | 1.32 | 1.83 |
| (5) | L1 | 5.53 | 4.36 | 4.32 |
| | L2 | 6.40 | 5.04 | 6.67 |
| | L3 | 1.50 | 2.10 | 1.5 |
| | L | 37.33 | 31.39 | 30.14 |
| | (L1 + L2 + L3)/L | 0.36 | 0.37 | 0.41 |
| (8) | ΣA2 | 0.80 | 0.64 | 0.77 |
| | ΣD2 | 6.40 | 5.04 | 6.67 |
| | ΣA2/ΣD2 | 0.13 | 0.13 | 0.12 |
| (1) | ndn1 | — | 1.80610 | 1.80238 |
| (2) | νdn1 | — | 40.7 | 40.7 |
| (3) | R21 | 5.462 | 4.193 | 4.239 |
| | R23 | 5.125 | 3.922 | 3.738 |
| | (R21 − R23)/(R21 + R23) | 0.032 | 0.033 | 0.063 |

TABLE 2

| | Condition | lower limit | upper limit | Numerical Example | | |
|---|---|---|---|---|---|---|
| | | | | 9 | 10 | 11 |
| (9) | ndp3 | | 1.5 | 1.48749 | 1.48749 | 1.49700 |
| (10) | νdp3 | 70 | | 70.2 | 70.2 | 81.5 |
| (11) | ndn1 | 1.7 | | 1.80238 | | 1.80238 |
| (12) | νdn1 | 35 | | 40.7 | | 40.7 |
| (13) | R21 | | | 4.564 | 4.526 | 4.588 |
| | R23 | | | 3.878 | 3.873 | 3.929 |
| | (R21 − R23)/(R21 + R23) | 0.5 | 0.15 | 0.081 | 0.078 | 0.077 |
| (14) | nd21 | 1.7 | | 1.74330 | 1.74330 | 1.74330 |
| (15) | νd21 | | 40 | 49.3 | 49.3 | 49.3 |
| (16) | L1 | | | 5.27 | 7.60 | 5.33 |
| | L2 | | | 5.82 | 5.85 | 5.56 |
| | L3 | | | 1.40 | 1.50 | 2.10 |
| | L | | | 41.74 | 45.78 | 41.28 |
| | (L1 + L2 + L3)/L | 0.25 | 0.45 | 0.30 | 0.33 | 0.31 |
| (17) | ΣA2 | | | 0.72 | 0.75 | 0.66 |
| | ΣD2 | | | 5.82 | 5.85 | 5.56 |
| | ΣA2/ΣD2 | 0.05 | 0.2 | 0.12 | 0.13 | 0.12 |

TABLE 3

| | numerical Example | | | |
|---|---|---|---|---|
| Condition | 12 | 13 | 14 | 15 |
| (18) M3/fw | 0.173 | 0.241 | 0.324 | 0.173 |
| (19) \|f1/ft\| | 0.838 | 0.855 | 0.890 | 0.857 |
| (20) f3/ft | 1.588 | 1.648 | 1.665 | 1.600 |
| (21) f2/ft | 0.719 | 0.720 | 0.725 | 0.759 |
| (22) (R3f + R3r)/(R3f − R3r) | −1.032 | −1.127 | — | −0.878 |

TABLE 4

| | Numerical Example | | | |
|---|---|---|---|---|
| Condition | 18 | 19 | 20 | 21 |
| (23) L12t | 3.61 | 2.58 | 6.28 | 7.25 |
| Lt | 45.60 | 46.73 | 47.35 | 49.18 |
| L12t/Lt | 0.08 | 0.06 | 0.13 | 0.15 |
| (25) f3 | 12.00 | 12.73 | 13.42 | 15.19 |
| fw | 6.53 | 6.58 | 7.05 | 7.21 |
| f3/fw | 1.84 | 1.93 | 1. | 2.1 |
| (24) L12t | 3.61 | 2.58 | 6.28 | 7.25 |
| ft | 19.47 | 19.45 | 20.96 | 21.6 |
| L12t/ft | 0.19 | 0.13 | 0.30 | 0.34 |
| (26) n4 | 1.73077 | 1.74330 | 1.74330 | 1.73077 |
| (27) ν4 | 40.5 | 49.3 | 49.3 | 49.3 |

TABLE 5

| | Numerical Example | | |
|---|---|---|---|
| Condition | 22 | 23 | 24 |
| (28) (R11 + R12)/(R11 − R12) | −2.295 | −1.099 | −3.579 |
| (29) f3/fw | 2.070 | 2.090 | 1.970 |
| (30) \|f2/fw\| | 2.137 | 2.210 | 2.191 |
| (31) β4t | 0.705 | 0.720 | 0.772 |
| (32) ν41 | 61.28 | 61.28 | 60.64 |
| (33) N3 | 1.77370 | 1.7737 | 1.7646 |

The zoom lens according to the numerical example 1 shown in FIG. 1 is a zoom lens having the variable magnification ratio of 2 and the aperture ratio of 2.8–3.9 or thereabout.

The zoom lens according to the numerical example 2 shown in FIG. 5 is a zoom lens having the variable magnification ratio of 2 and the aperture ratio of 2.9–4.0 or thereabout.

The zoom lens according to the numerical example 3 shown in FIG. 9 is a zoom lens having the variable magnification ratio of 2.5 and the aperture ratio of 2.6–4.0 or thereabout.

The zoom lens according to the numerical example 4 shown in FIG. 13 is a zoom lens having the variable magnification ratio of 2 and the aperture ratio of 2.8–4.0 or thereabout.

In the zoom lens according to the numerical example 4, a negative lens disposed on the most object side in the first lens unit is a lens both lens surfaces of which are aspheric, thereby correcting distortion at the wide-angle end and improving the performance of formation of a marginal image. Further, during zooming from the wide-angle end to the telephoto end, the first lens unit makes a reciprocating motion convex toward the image side, the second lens unit moves toward the object side, and the third lens unit moves with a locus convex toward the object side.

The zoom lens according to the numerical example 5 shown in FIG. 17 is a zoom lens having the variable magnification ratio of 2 and the aperture ratio of 2.8–4.0 or thereabout.

In the zoom lens according to the numerical example 5, during zooming from the wide-angle end to the telephoto end, the first lens unit makes a reciprocating motion convex toward the image side, the second lens unit moves toward the object side, and the third lens unit moves toward the object side.

In the zoom lens according to the numerical example 6 shown in FIG. 21, during zooming from the wide-angle end to the telephoto end, the first lens unit makes a reciprocating motion convex toward the image side, the second lens unit moves toward the object side, and the third lens unit moves with a locus convex toward the object side.

In the zoom lens according to the numerical example 6, the first lens unit comprises three lenses, i.e., in order form the object side to the image side, a negative lens 11 of meniscus form, a negative lens 12 of meniscus form and a positive lens 13 of meniscus form, and a lens surface on the image side of the negative lens 11 is formed into such an aspheric surface that a negative refractive power becomes progressively weaker as going away from the optical axis, so that it is possible to make a wide angle of view and a high variable magnification ratio compatible with each other.

The zoom lens according to the numerical example 6 is a zoom lens having the variable magnification ratio of 2.2 and the aperture ratio of 2.6–4.0 or thereabout.

In the zoom lens according to the numerical example 7 shown in FIG. 25, during zooming from the wide-angle end to the telephoto end, the first lens unit makes a reciprocating motion convex toward the image side, the second lens unit moves toward the object side, and the third lens unit moves with a locus convex toward the object side.

Further, in the numerical example 7, each of a lens surface on the image side of the negative lens 11 of meniscus form and a lens surface on the object side of the positive lens 12 of meniscus form in the first lens unit is formed into an aspheric surface, thereby correcting distortion and curvature of field, in particular, at the wide-angle end. Further, the third lens unit is a cemented lens composed of a negative lens of meniscus form and a positive lens of bi-convex form, thereby having the function of correcting chromatic aberration sufficiently in conjunction with two cemented lens of the second lens unit.

The zoom lens according to the numerical example 7 is a zoom lens having the variable magnification ratio of 2.0 and the aperture ratio of 2.8–4.0 or thereabout.

In the zoom lens according to the numerical example 8 shown in FIG. 29, during zooming from the wide-angle end to the telephoto end, the first lens unit makes a reciprocating motion convex toward the image side, the second lens unit moves toward the object side, and the third lens unit moves with a locus convex toward the object side.

Further, in the numerical example 8, in the second lens unit, one negative lens is disposed on the image side of two cemented lenses, so that the principal point position of the second lens unit is moved toward the object side. Accordingly, it becomes possible to shorten the principal point interval between the first lens unit and the second lens unit, and, as a result, it becomes possible to reduce the diameter of the first lens unit.

The zoom lens according to the numerical example 8 is a zoom lens having the variable magnification ratio of 2.0 and the aperture ratio of 2.8–4.0 or thereabout.

The zoom lens according to the numerical example 9 shown in FIG. 33 is a zoom lens having the variable magnification ratio of 3 and the aperture ratio of 2.7–4.8 or thereabout.

In the zoom lens according to the numerical example 10 shown in FIG. 37, during zooming from the wide-angle end to the telephoto end, the first lens unit makes a reciprocating motion convex toward the image side, the second lens unit moves toward the object side, and the third lens unit moves toward the image side.

Further, the first lens unit comprises, in order from the object side to the image side, a negative lens 11 of meniscus form, a negative lens 12 of meniscus form and a positive lens 13 of meniscus form, thereby easily attaining a further wide angle view as compared with a zoom lens in which a first lens unit is composed of two lenses.

The zoom lens according to the numerical example 10 is a zoom lens having the variable magnification ratio of 3 and the aperture ratio of 2.6–4.8 or thereabout.

In the zoom lens according to the numerical example 11 shown in FIG. 41, during zooming from the wide-angle end to the telephoto end, the first lens unit makes a reciprocating motion convex toward the image side, the second lens unit moves toward the object side, and the third lens unit moves toward the image side.

Further, the third lens unit is constructed with a cemented lens composed of a negative lens of meniscus form and a positive lens of bi-convex form, thereby sufficiently correcting chromatic aberration in conjunction with two cemented lenses of the second lens unit.

The zoom lens according to the numerical example 11 is a zoom lens having the variable magnification ratio of 3.0 and the aperture ratio of 2.7–4.8 or thereabout.

Figure 45:
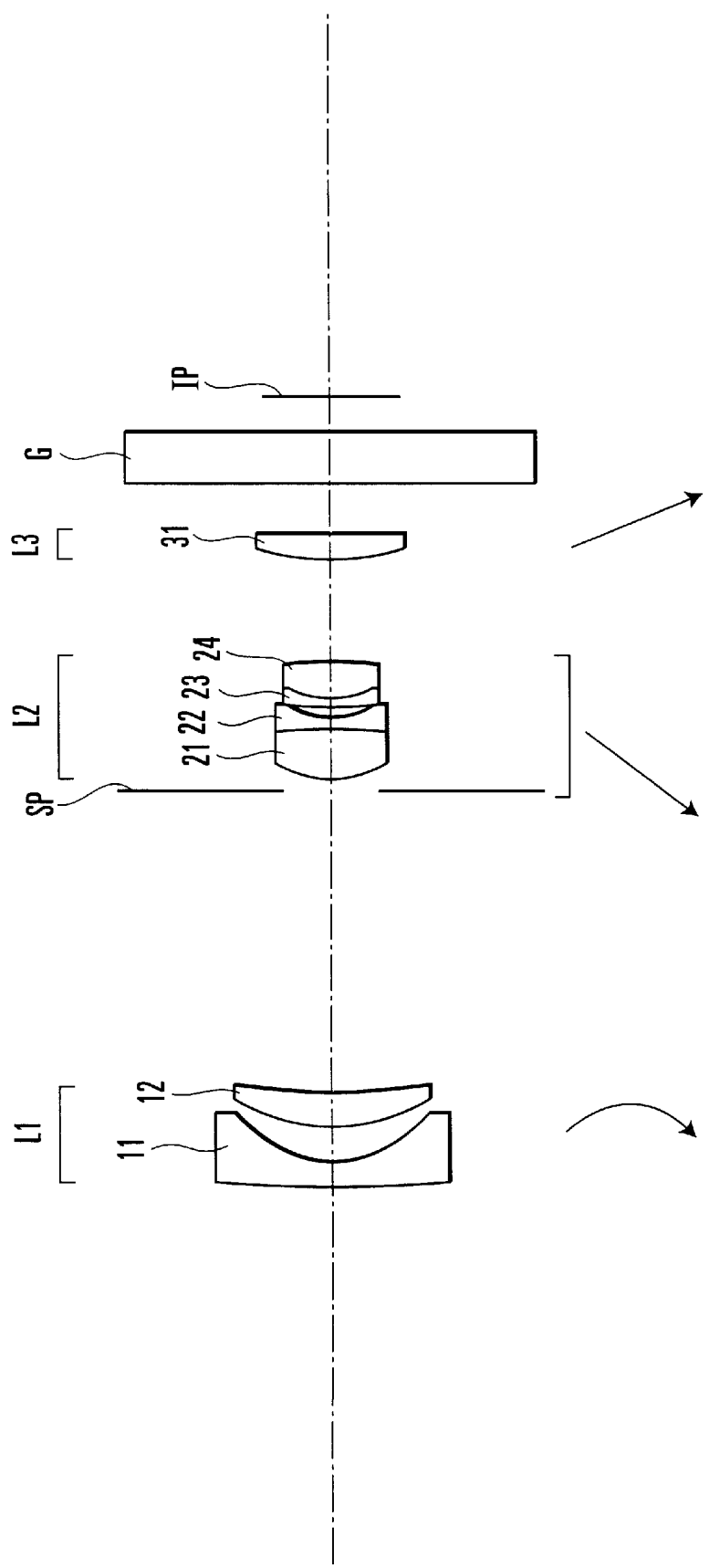
FIG. 45 is a lens block diagram showing a zoom lens at the wide-angle end according to a numerical example 12 of the invention.
Figure 46A:
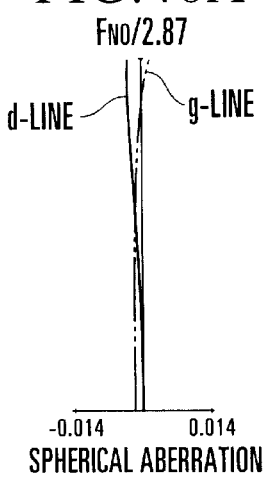
FIGS. 46A to 46D are graphs showing aberration curves at the wide-angle end in the zoom lens according to the numerical example 12 of the invention.
Figure 46B:
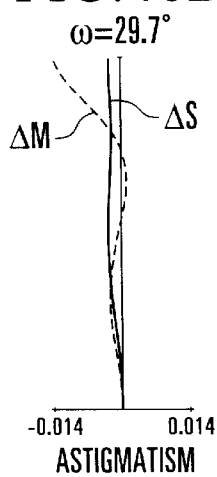
Figure 46C:
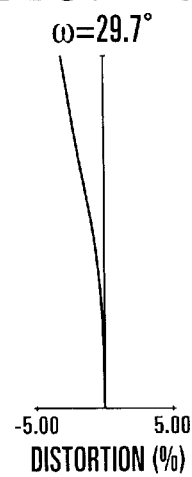
Figure 46D:
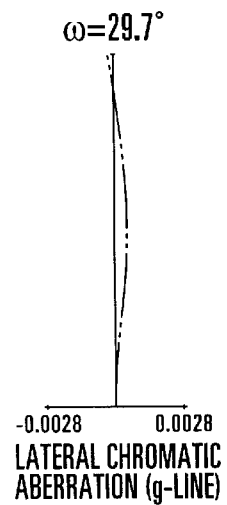
Figure 47A:
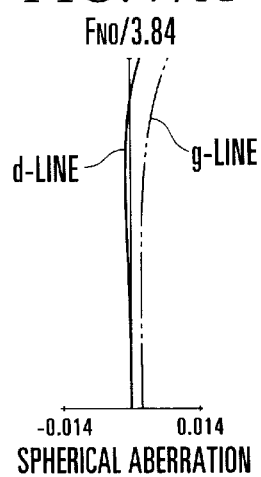
FIGS. 47A to 47D are graphs showing aberration curves at the middle focal length position in the zoom lens according to the numerical example 12 of the invention.
Figure 47B:
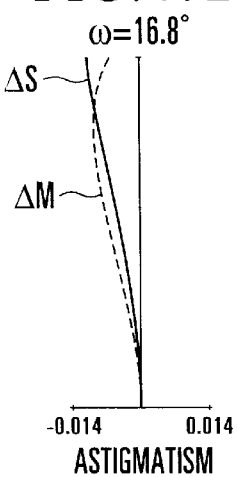
Figure 47C:
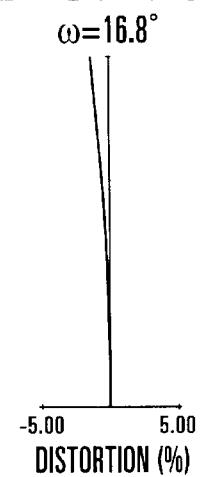
Figure 47D:
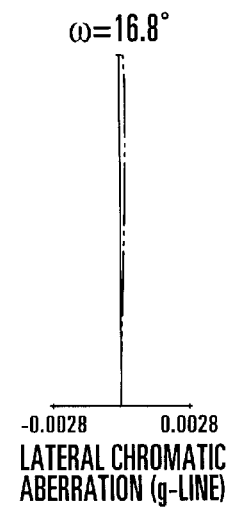
Figure 48A:
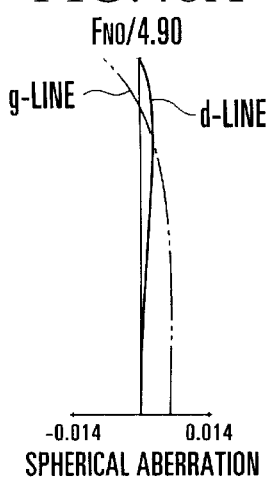
FIGS. 48A to 48D are graphs showing aberration curves at the telephoto end in the zoom lens according to the numerical example 12 of the invention.
Figure 48B:
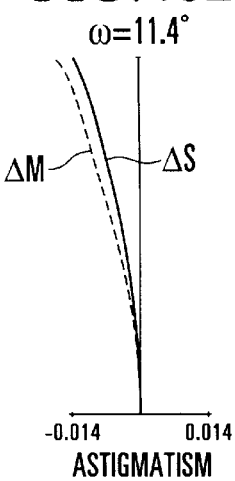
Figure 48C:
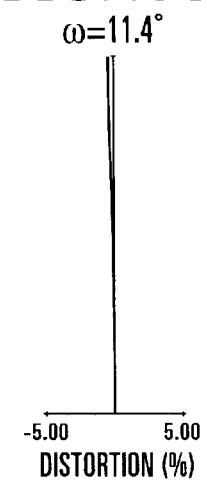
Figure 48D:
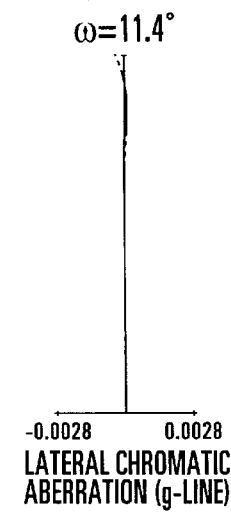

The zoom lens according to the numerical example 12 shown in FIG. 45 is a zoom lens having the variable magnification ratio of 2.8 and the aperture ratio of 2.9–4.9 or thereabout.

Figure 49:
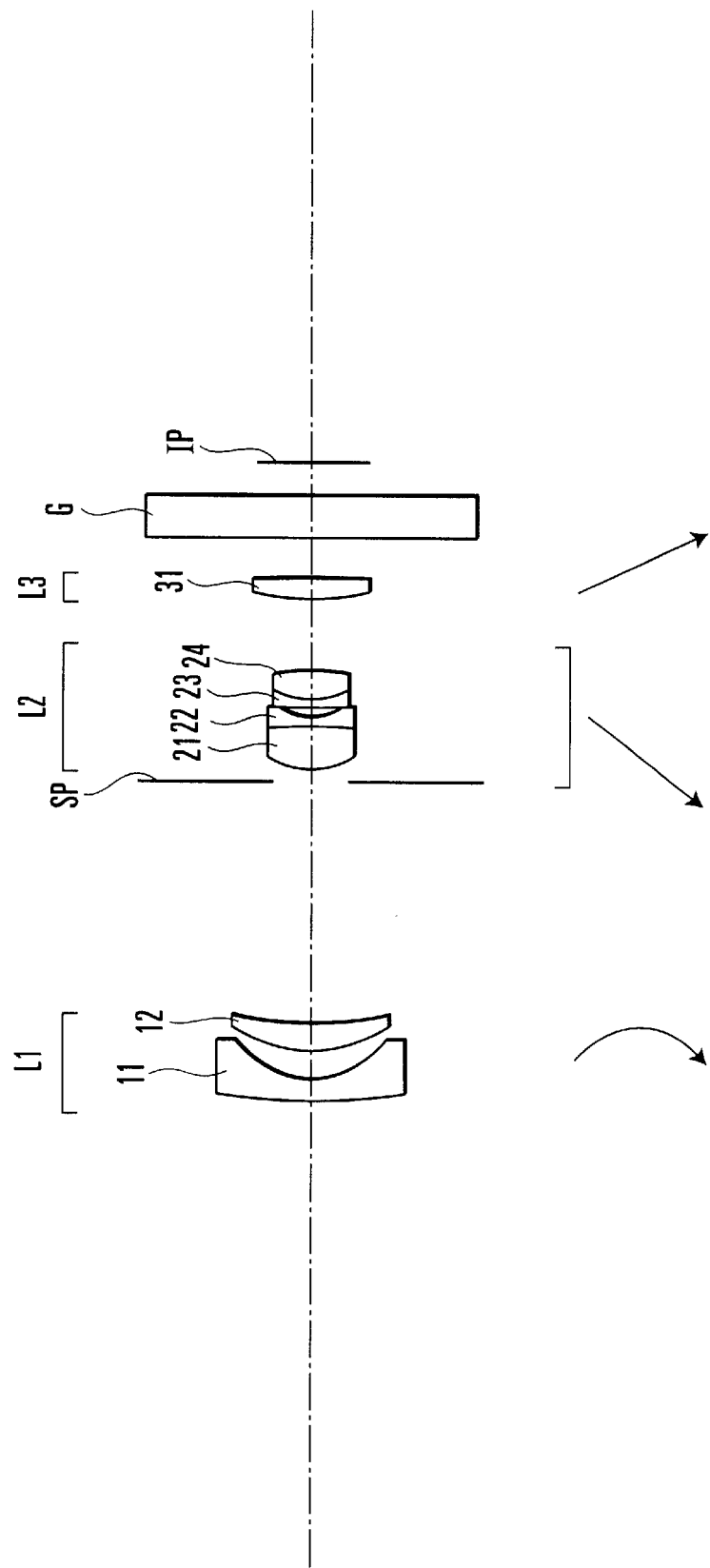
FIG. 49 is a lens block diagram showing a zoom lens at the wide-angle end according to a numerical example 13 of the invention.

The zoom lens according to the numerical example 13 shown in FIG. 49 is a zoom lens having the variable magnification ratio of 2.8 and the aperture ratio of 2.9–4.9 or thereabout.

Figure 53:
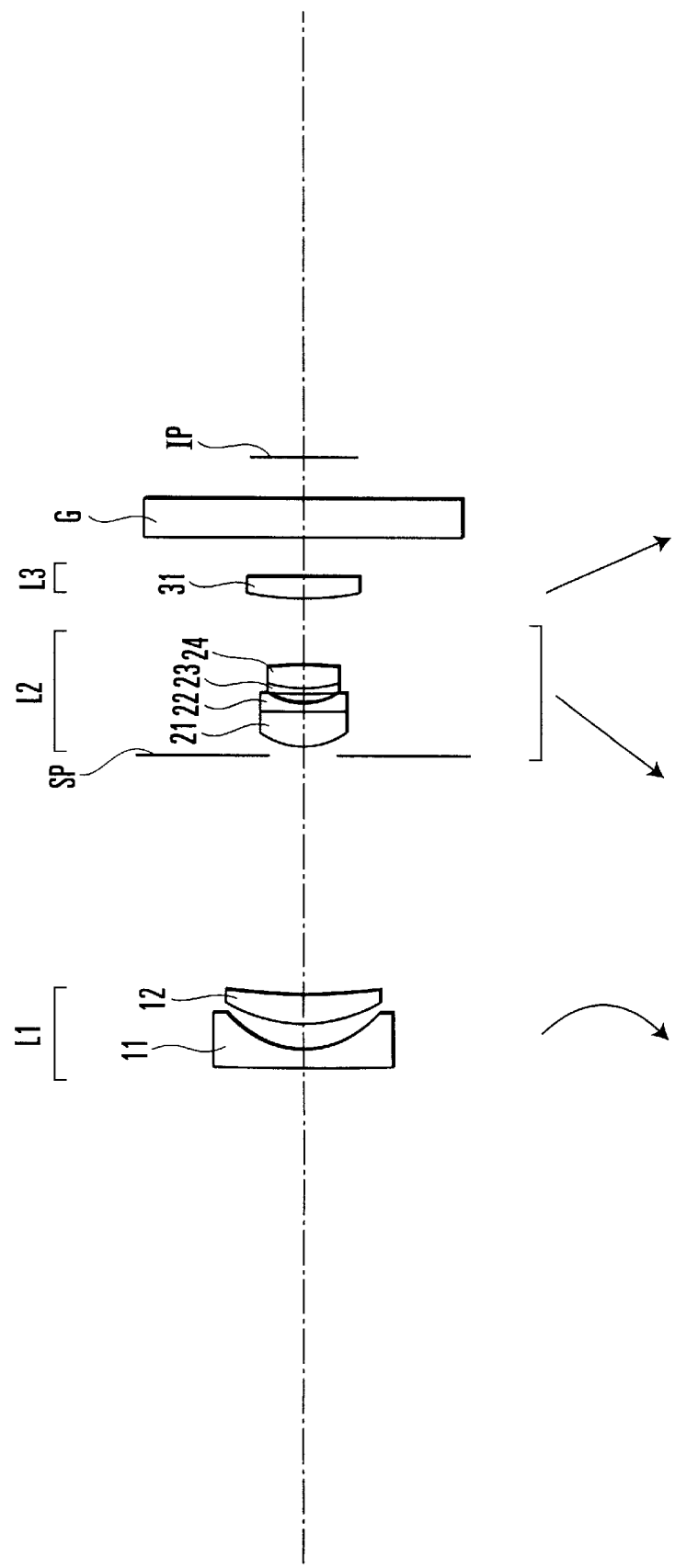
FIG. 53 is a lens block diagram showing a zoom lens at the wide-angle end according to a numerical example 14 of the invention.
Figure 54A:
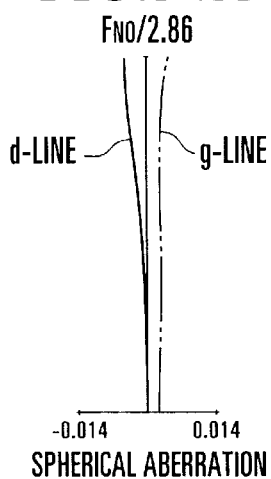
FIGS. 54A to 54D are graphs showing aberration curves at the wide-angle end in the zoom lens according to the numerical example 14 of the invention.
Figure 54B:
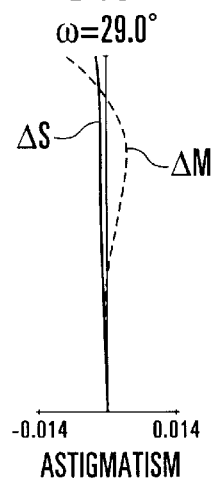
Figure 54C:
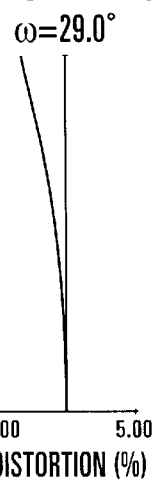
Figure 54D:
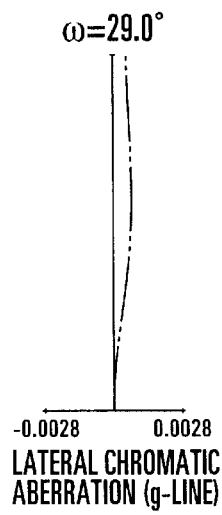
Figure 55A:
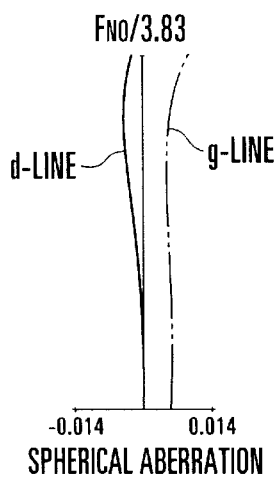
FIGS. 55A to 55D are graphs showing aberration curves at the middle focal length position in the zoom lens according to the numerical example 14 of the invention.
Figure 55B:
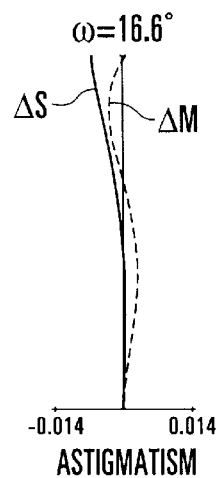
Figure 55C:
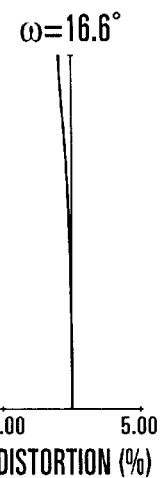
Figure 55D:
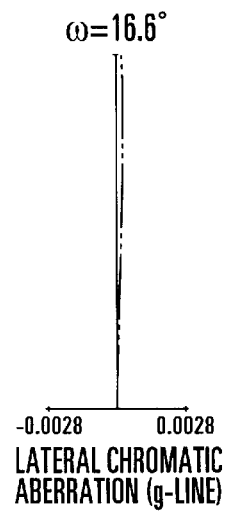
Figure 56A:
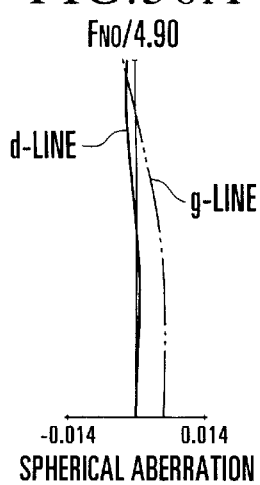
FIGS. 56A to 56D are graphs showing aberration curves at the telephoto end in the zoom lens according to the numerical example 14 of the invention.
Figure 56B:
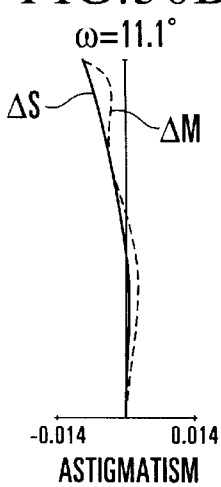
Figure 56C:
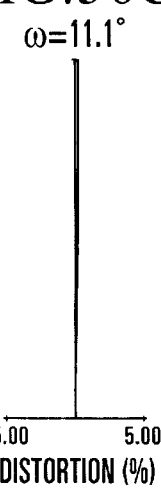
Figure 56D:
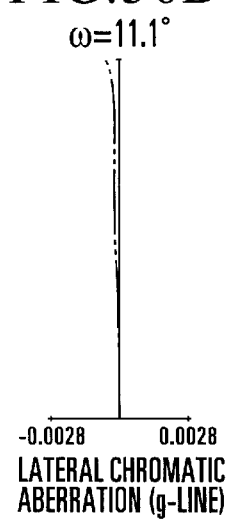

The zoom lens according to the numerical example 14 shown in FIG. 53 is a zoom lens having the variable magnification ratio of 2.8 and the aperture ratio of 2.9–4.9 or thereabout.

The zoom lens according to the numerical example 15 shown in FIG. 57 is a zoom lens having the variable magnification ratio of 3 and the aperture ratio of 2.8–4.8 or thereabout.

The zoom lens according to the numerical example 16 shown in FIG. 61 is a zoom lens having the variable magnification ratio of 2.8 and the aperture ratio of 2.5–2.7 or thereabout.

The zoom lens according to the numerical example 17 shown in FIG. 65 is a zoom lens having the variable magnification ratio of 2.9 and the aperture ratio of 2.8–3.0 or thereabout.

Figure 69:
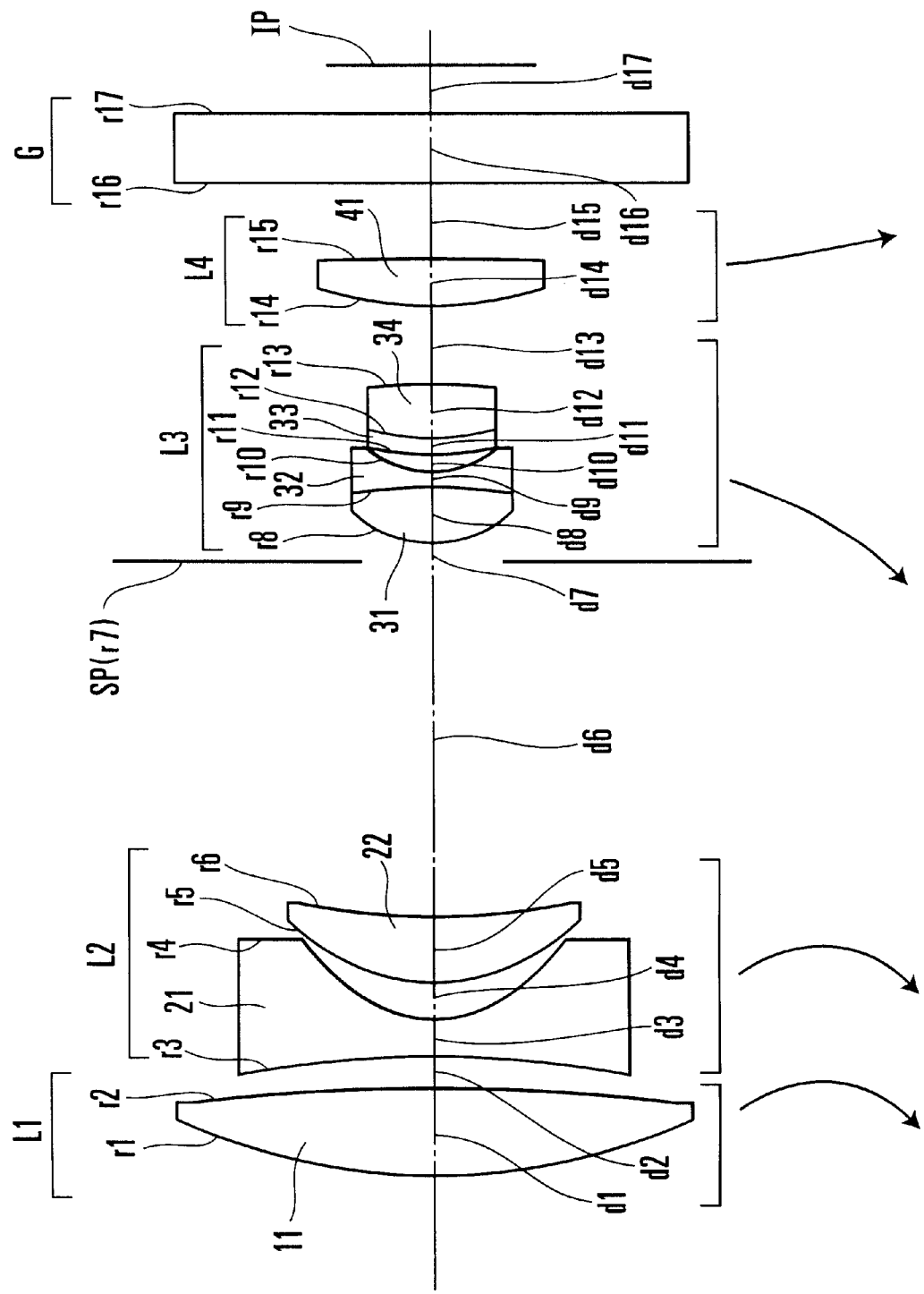
FIG. 69 is a lens block diagram showing a zoom lens at the wide-angle end according to a numerical example 18 of the invention.

The zoom lens according to the numerical example 18 shown in FIG. 69 comprises, in order from the object side to the image side, a first lens unit of positive refractive power, a second lens unit of negative refractive power, a third lens unit of positive refractive power, and a fourth lens unit of positive refractive power. During zooming from the wide-angle end to the telephoto end, the first lens unit makes a reciprocating motion convex toward the image side, the second lens unit makes a reciprocating motion convex toward the image side, the third lens unit moves monotonically toward the object side, and the fourth lens unit moves with a locus convex toward the object side.

In the zoom lens according to the numerical example 18, the main variation of magnification is effected by the movement of the third lens unit of positive refractive power, and the shift of an image point due to the variation of magnification is compensated for by the reciprocating motion of the first lens unit of positive refractive power and the second lens unit of negative refractive power and the movement of the fourth lens unit of positive refractive power with a locus convex toward the object side.

The fourth lens unit shares the increase of a refractive power of the photographic lens due to the reduction in size of the image sensor, and performs the telecentric image formation on the image side necessary for the photographing apparatus using the image sensor or the like. Thus, the fourth lens unit has the roll of a field lens.

Further, the stop SP is disposed on the most object side of the third lens unit, thereby shortening the distance between the entrance pupil and the first lens unit on the wide-angle side, so that the increase of the diameter of lenses constituting the first lens unit can be prevented. In addition, the various off-axial aberrations are canceled by the second lens unit and the third lens unit across the stop SP disposed on the object side of the third lens unit, so that good optical performance can be obtained without increasing the number of constituent lenses.

Further, in the numerical example 18, the first lens unit of positive refractive power comprises a positive lens 11 of bi-convex form having a convex surface facing the object side which is stronger in power than an opposite surface thereof. The second lens unit of negative refractive power comprises two lenses, i.e., in order from the object side to the image side, a negative lens 21 of bi-concave form having a concave surface facing the image side which is stronger in power than an opposite surface thereof, and a positive lens 22 of meniscus form having a convex surface facing the object side. The third lens unit of positive refractive power comprises four lenses, i.e., in order from the object side to the image side, a positive lens 31 of bi-convex form, a negative lens 32 of bi-concave form having a concave surface facing the image side which is stronger in power than an opposite surface thereof, a negative lens 33 of meniscus form having a convex surface facing the object side, and a positive lens 34 of bi-convex form. Then, the positive lens 31 and the negative lens 32 are formed into a cemented lens and the negative lens 33 and the positive lens 34 are formed into a cemented lens, so that the third lens unit is composed of two cemented lenses. The fourth lens unit of positive refractive power comprises a positive lens 41 of bi-convex form having a convex surface facing the object side which is stronger in power than an opposite surface thereof.

As described above, the respective lens units are formed into such a lens construction as to make the desired refractive power arrangement and the correction of aberrations compatible with each other, so that it is possible to attain the compactness of the entire lens system while keeping good optical performance.

The second lens unit of negative refractive power has the role of causing an off-axial principal ray to be pupil-imaged on the center of the stop SP. In particular, since the amount of refraction of the off-axial principal ray is large on the wide-angle side, the various off-axial aberrations, particularly, astigmatism and distortion, tend to occur.

Therefore, similarly to the ordinary wide-angle lens, the second lens unit is made to have such a construction as to be composed of a negative lens and a positive lens, which can suppress the increase of the diameter of a lens disposed on the most object side. In addition, a lens surface on the image side of the negative lens 21 is formed into such an aspheric surface that a negative refractive power becomes progressively weaker toward a marginal portion of the lens surface. Accordingly, astigmatism and distortion are corrected in a well-balanced manner, and the second lens unit is composed of such a small number of lens elements as two, so that the compactness of the entire lens system can be attained.

Further, lenses constituting the second lens unit have respective shapes close to concentric spherical surfaces centered on a point at which the stop and the optical axis intersect, so as to suppress the occurrence of off-axial aberration caused by the refraction of an off-axial principal ray.

In the third lens unit of positive refractive power, the positive lens 31 having a strong convex surface facing the object side is disposed on the most object side of the third lens unit, so that the third lens unit has such a shape as to lessen the angle of refraction of an off-axial principal ray having exited from the second lens unit, thereby preventing the various off-axial aberrations from occurring.

Further, the positive lens 31 is a lens arranged to allow an on-axial ray to pass at the largest height, and is concerned with the correction of, mainly, spherical aberration and coma. Further, a lens surface on the object side of the positive lens 31 is such an aspheric surface that a positive refractive power becomes progressively weaker toward a marginal portion of the lens surface. By this arrangement, it is possible to correct well spherical aberration and coma.

The negative lens 32 disposed on the image side of the positive lens 31 is made to have a concave surface facing the image side, so that a negative air lens is formed by the concave surface on the image side of the negative lens 32 and a convex surface on the object side of the negative lens 33, which is disposed subsequent to the negative lens 32. Accordingly, it is possible to correct spherical aberration.

In addition, in order to cope with the reduction of the amount of chromatic aberration, which is required according to the increased number of pixels and the minimization of cell pitches of a solid-state image sensor such as a CCD, the third lens unit is made to be composed of two cemented lenses. By this arrangement, it is possible to correct well longitudinal chromatic aberration and lateral chromatic aberration.

The zoom lens according to the numerical example 18 is a zoom lens having the variable magnification ratio of 3.0 and the aperture ratio of 2.4—4.3 or thereabout.

Figure 73:
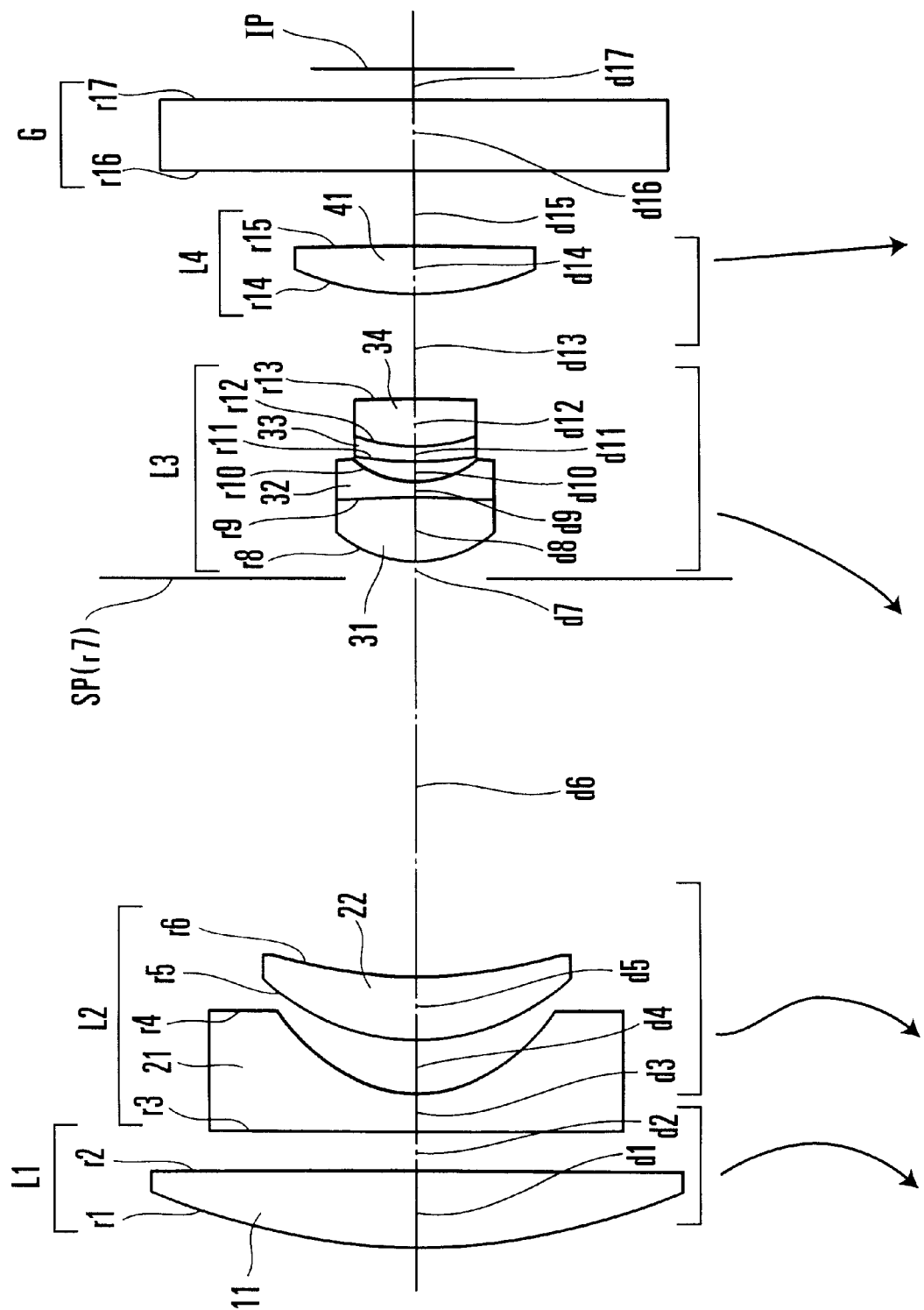
FIG. 73 is a lens block diagram showing a zoom lens at the wide-angle end according to a numerical example 19 of the invention.

In the zoom lens according to the numerical example 19 shown in FIG. 73, a negative lens disposed on the most object side of the second lens unit is formed into a negative lens of meniscus form having a concave surface facing the image side which is stronger in power than an opposite surface thereof. Further, during zooming from the wide-angle end to the telephoto end, the first lens unit makes a reciprocating motion convex toward the image side, the second lens unit makes a reciprocating motion convex toward the image side after moving once toward the object side, and the third lens unit moves monotonically toward the image side.

The other arrangement of the zoom lens according to the numerical example 19 is the same as that of the zoom lens according to the numerical example 18.

The zoom lens according to the numerical example 19 is a zoom lens having the variable magnification ratio of 3 and the aperture ratio of 2.6–4.5 or thereabout.

Figure 77:
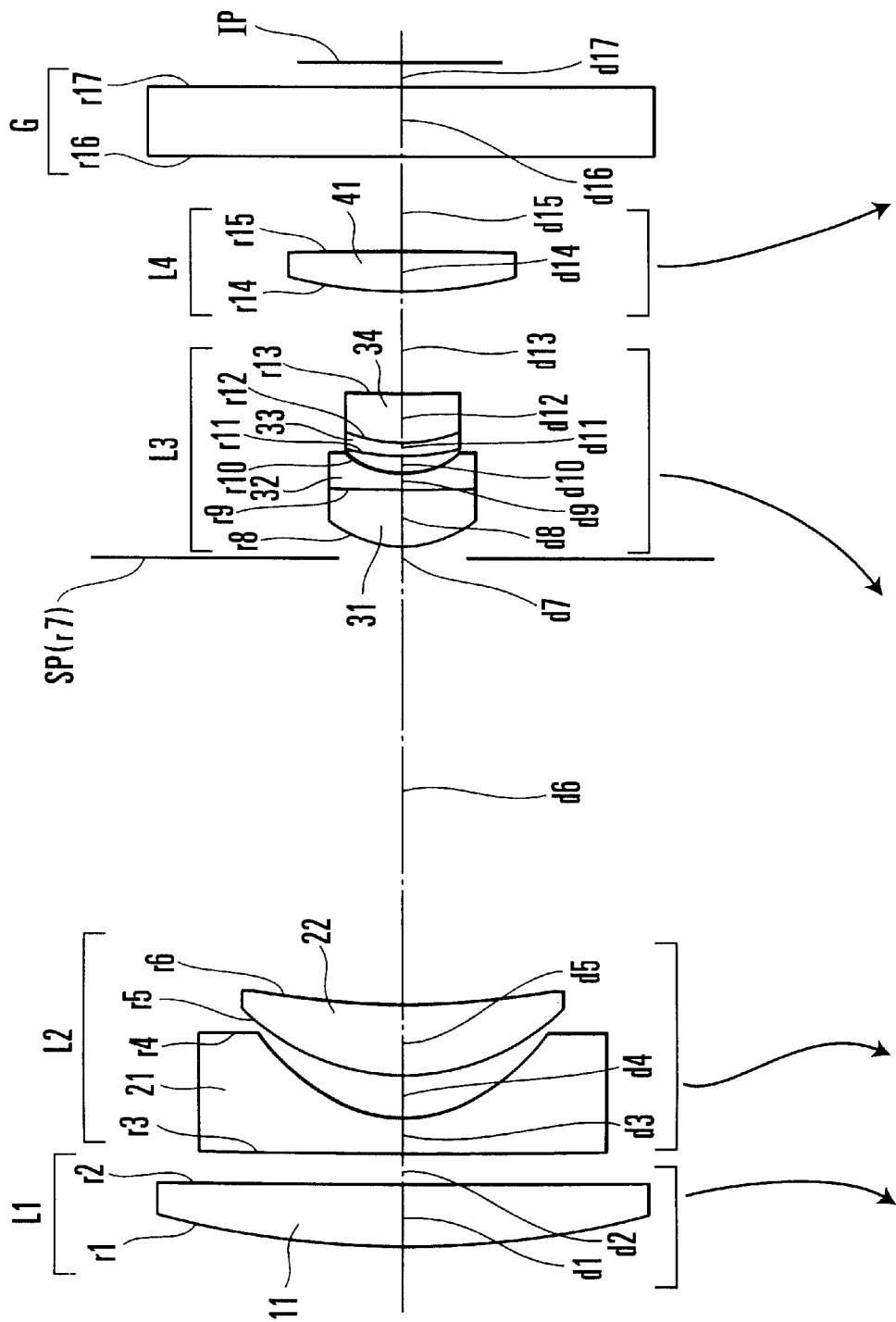
FIG. 77 is a lens block diagram showing a zoom lens at the wide-angle end according to a numerical example 20 of the invention.

In the zoom lens according to the numerical example 20 shown in FIG. 77, a positive lens disposed on the most object side of the first lens unit is formed into a positive lens of meniscus form having a convex surface facing the object side which is stronger in power than an opposite surface thereof, a positive lens disposed on the most object side of the third lens unit is formed into a positive lens of meniscus form having a convex surface facing the object side which is stronger in power than an opposite surface thereof, and a positive lens disposed on the most object side of the fourth lens unit is formed into a positive lens of meniscus form having a convex surface facing the object side which is stronger in power than an opposite surface thereof.

Further, during zooming from the wide-angle end to the telephoto end, the first lens unit makes a reciprocating motion convex toward the image side, the second lens unit makes a reciprocating motion convex toward the image side after moving once toward the object side, and the third lens unit moves monotonically toward the image side.

The other arrangement of the zoom lens according to the numerical example 20 is the same as that of the zoom lens according to the numerical example 19.

The zoom lens according to the numerical example 20 is a zoom lens having the variable magnification ratio of 3 and the aperture ratio of 2.8–4.8 or thereabout.

Figure 81:
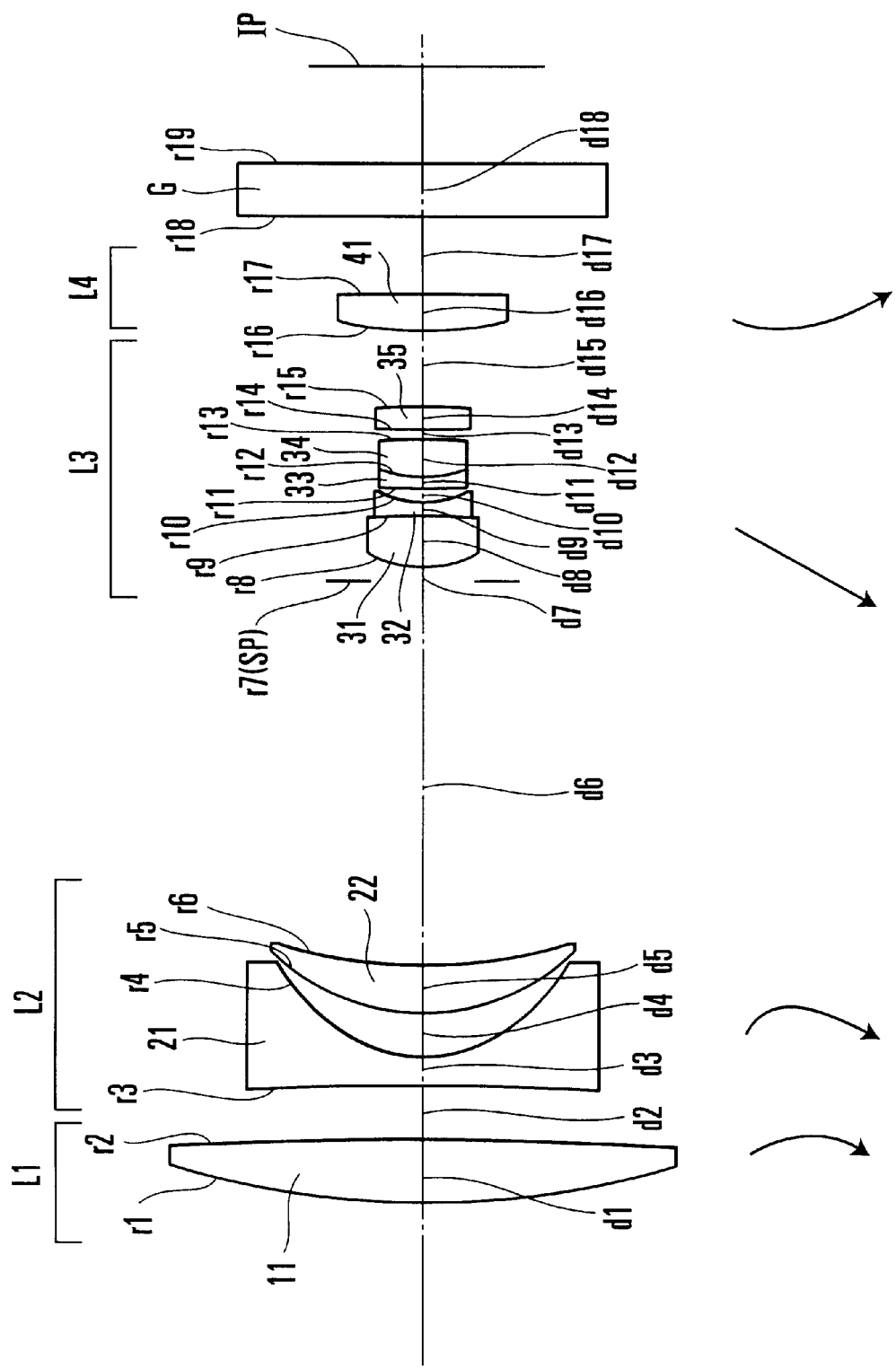
FIG. 81 is a lens block diagram showing a zoom lens at the wide-angle end according to a numerical example 21 of the invention.
Figure 82A:
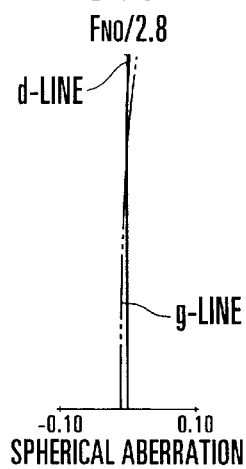
FIGS. 82A to 82D are graphs showing aberration curves at the wide-angle end in the zoom lens according to the numerical example 21 of the invention.
Figure 82B:
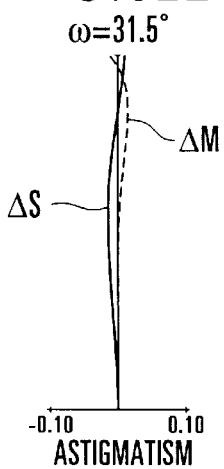
Figure 82C:
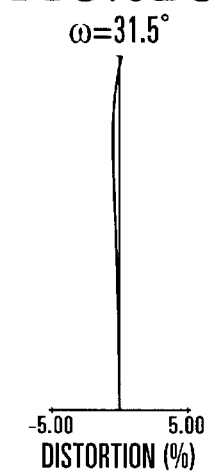
Figure 82D:
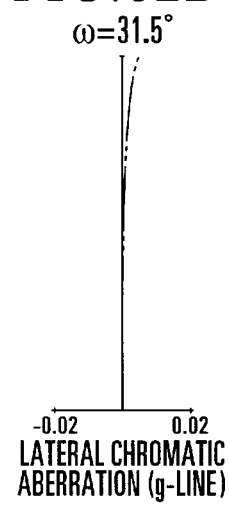
Figure 83A:
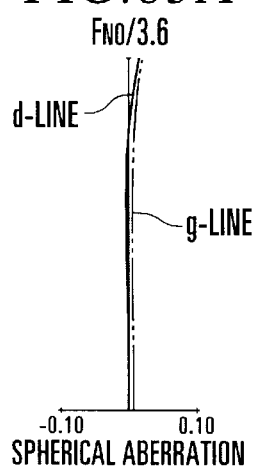
FIGS. 83A to 83D are graphs showing aberration curves at the middle focal length position in the zoom lens according to the numerical example 21 of the invention.
Figure 83B:
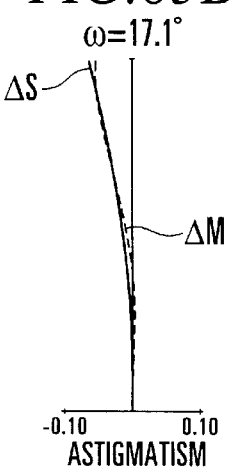
Figure 83C:
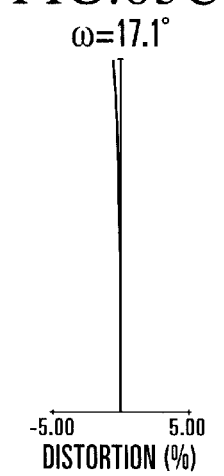
Figure 83D:
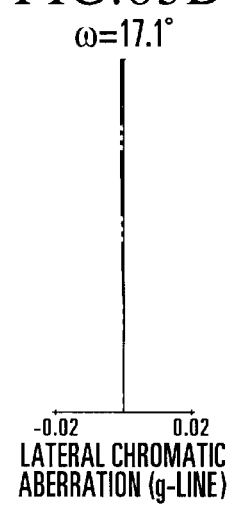
Figure 84A:
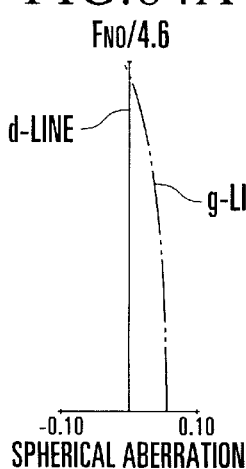
FIGS. 84A to 84D are graphs showing aberration curves at the telephoto end in the zoom lens according to the numerical example 21 of the invention.
Figure 84B:
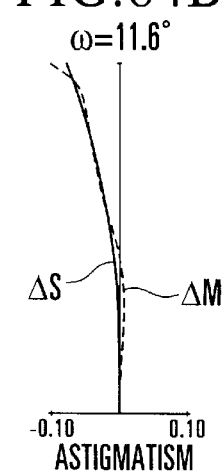
Figure 84C:
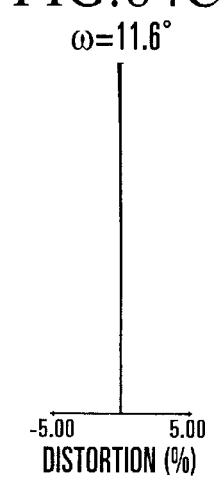
Figure 84D:
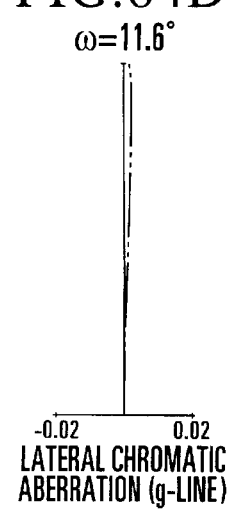

In the zoom lens according to the numerical example 21 shown in FIG. 81, in the third lens unit, one positive meniscus lens having a convex surface facing the object side which is stronger in power than an opposite surface thereof is disposed on the image side of two cemented lenses, thereby further correcting well the various aberrations due to the variation of magnification.

Further, during zooming from the wide-angle end to the telephoto end, the first lens unit makes a reciprocating motion convex toward the image side, the second lens unit makes a reciprocating motion convex toward the image side, the third lens unit moves monotonically toward the object side, and the fourth lens unit makes a reciprocating motion convex toward the object side.

The other arrangement of the zoom lens according to the numerical example 21 is the same as that of the zoom lens according to the numerical example 18.

The zoom lens according to the numerical example 21 is a zoom lens having the variable magnification ratio of 3 and the aperture ratio of 2.8–4.6 or thereabout.

The zoom lens according to the numerical example 22 shown in FIG. 85 is a zoom lens having the variable magnification ratio of 3 and the aperture ratio of 2.8–4.8 or thereabout.

The zoom lens according to the numerical example 23 shown in FIG. 89 is a zoom lens having the variable magnification ratio of 3 and the aperture ratio of 2.9–4.8 or thereabout.

The zoom lens according to the numerical example 24 shown in FIG. 93 is a zoom lens having the variable magnification ratio of 2.9 and the aperture ratio of 2.9–4.8 or thereabout.

What is claimed is:

1. A zoom lens comprising:
    a lens unit A of negative refractive power; and
    a lens unit B of positive refractive power disposed on an image side of said lens unit A, said lens unit B comprising two cemented lens components and consisting of not more than five lens elements,
    wherein the separation between said lens unit A and said lens unit B varies during zooming.

2. A zoom lens according to claim 1, wherein said zoom lens comprises, in order from an object side to the image side:
    a first lens unit of negative refractive power disposed on the most object side, said first lens unit being said lens unit A; and a second lens unit of positive refractive power, said second lens unit being said lens unit B, wherein the separation between said first lens unit and said second lens unit varies during zooming.

3. A zoom lens according to claim 2, further comprising:

a third lens unit of positive refractive power disposed on the image side of said second lens unit, wherein the separation between said second lens unit and said third lens unit varies during zooming.

4. A zoom lens according to claim 3, wherein said zoom lens satisfies the following condition:

$$0.25 < (L1+L2+L3)/L < 0.45$$

where L is a distance, at a telephoto end, from a lens surface vertex on the object side of a lens element disposed on the most object side of said first lens unit to an image plane, L1 is a distance from the lens surface vertex on the object side of the lens element disposed on the most object side of said first lens unit to a lens surface vertex on the image side of a lens element disposed on the most image side of said first lens unit, L2 is a distance from a lens surface vertex on the object side of a lens element disposed on the most object side of said second lens unit to a lens surface vertex on the image side of a lens element disposed on the most image side of said second lens unit, and L3 is a distance from a lens surface vertex on the object side of a lens element disposed on the most object side of said third lens unit to a lens surface vertex on the image side of a lens element disposed on the most image side of said third lens unit.

5. A zoom lens according to claim 3, wherein said third lens unit has at least one lens element of positive refractive power, and said zoom lens satisfies the following condition:

$$ndp3 < 1.50$$

$$vdp3 > 70.0$$

where ndp3 and vdp3 are a refractive index and Abbe number, respectively, of material of the lens element of said third lens unit.

6. A zoom lens according to claim 3, wherein said third lens unit moves during zooming, and said zoom lens satisfies the following condition:

$$0.08 < M3/fw < 0.4$$

where M3 is an amount of movement of said third lens unit during zooming from a wide-angle end to a telephoto end, and fw is the focal length of said zoom lens at the wide-angle end.

7. A zoom lens according to claim 3, wherein said zoom lens satisfies the following condition:

$$0.7 < |f1/ft| < 1.0$$

where f1 is the focal length of said first lens unit, and ft is the focal length of said zoom lens at a telephoto end.

8. A zoom lens according to claim 3, wherein said zoom lens satisfies the following condition:

$$0.63 < f2/ft < 0.8$$

where f2 is the focal length of said second lens unit, and ft is the focal length of said zoom lens at a telephoto end.

9. A zoom lens according to claim 3, wherein said zoom lens satisfies the following condition:

$$1.45 < f3/ft < 2.0$$

where f3 is the focal length of said third lens unit, and ft is the focal length of said zoom lens at a telephoto end.

10. A zoom lens according to claim 3, wherein said third lens unit consists of one lens element of positive refractive power, and said zoom lens satisfies the following condition:

$$-1.5 < (R3f+R3r)/(R3f-R3r) < -0.5$$

where R3f is a radius of curvature of a lens surface on the object side of the lens element of said third lens unit, and R3r is a radius of curvature of a lens surface on the image side of the lens element of said third lens unit.

11. A zoom lens according to claim 1, wherein said zoom lens comprises, in order from an object side to the image side:

a first lens unit of positive refractive power disposed on the most object side;

a second lens unit of positive refractive power, said second lens unit being said lens unit A; and a third lens unit of positive refractive power, said third lens unit being said lens unit B, wherein the separation between said first lens unit and said second lens unit and the separation between the said second lens unit and said third lens unit vary during zooming.

12. A zoom lens according to claim 11, further comprising:

a fourth lens unit of positive refractive power disposed on the image side of said third lens unit, wherein the separation between said third lens unit and said fourth lens unit varies during zooming.

13. A zoom lens according to claim 12, wherein said zoom lens satisfies the following condition:

$$L12t/Lt < 0.15$$

where Lt is the total length of said zoom lens at a telephoto end, and L12t is the separation between said first lens unit and said second lens unit at the telephoto end.

14. A zoom lens according to claim 12, wherein said zoom lens satisfies the following condition:

$$L12t/ft < 0.5$$

where ft is the focal length of said zoom lens at a telephoto end, and L12t is the separation between said first lens unit and said second lens unit at the telephoto end.

15. A zoom lens according to claim 12, wherein said zoom lens satisfies the following condition:

$$1.0 < f3/fw < 2.0$$

where fw is the focal length of said zoom lens at the wide-angle end, and f3 is the focal length of said third lens unit.

16. A zoom lens according to claim 12, wherein said first lens unit consists of one lens element of positive refractive power, and said zoom lens satisfies the following condition:

$$-4.5 < (R11+R12)/(R11-R12) < -0.8$$

where R11 and R12 are radii of curvature of surfaces on the object side and the image side, respectively, of the lens element of said first lens unit.

17. A zoom lens according to claim 1, wherein said lens unit A comprises a first lens element of negative refractive power of meniscus form having a concave surface facing the image side, and a second lens element of positive refractive power of meniscus form having a convex surface facing an object side.

18. A zoom lens according to claim 17, wherein the surface on the image side of the first lens element of said lens unit A is such an aspheric surface that a negative refractive power becomes weaker at a marginal portion thereof than at a central portion thereof.

19. A zoom lens according to claim 17, wherein said zoom lens satisfies the following conditions:

$$ndn1 > 1.70$$

$$vdn1 > 35.0$$

where $ndn1$ and $vdn1$ are a refractive index and Abbe number, respectively, of material of the second lens element of said lens unit A.

20. A zoom lens according to claim 1, wherein said lens unit B comprises, in order from an object side to the image side, a first lens element of positive refractive power of bi-convex form, a second lens element of negative refractive power of bi-concave form, a third lens element of negative refractive power of meniscus form having a convex surface facing the object side, and a fourth lens element of positive refractive power of bi-convex form, and wherein said two cemented lens components are respectively composed of the first lens element and the second lens element and composed of the third lens element and the fourth lens element.

21. A zoom lens according to claim 20, wherein a surface on the object side of the first lens element of said lens unit B is such an aspheric surface that a positive refractive power becomes weaker at a marginal portion thereof than at a central portion thereof.

22. A zoom lens according to claim 1, wherein said lens unit B comprises, in order from an object side to the image side, a first lens element of positive refractive power of meniscus form having a concave surface facing the image side, a second lens element of negative refractive power of meniscus form having a convex surface facing the object side, a third lens element of negative refractive power of meniscus form having a convex surface facing the object side, and a fourth lens element of positive refractive power of bi-convex form, and wherein said two cemented lens components are respectively composed of the first lens element and the second lens element and composed of the third lens element and the fourth lens element.

23. A zoom lens according to claim 22, wherein a surface on the object side of the first lens element of said lens unit B is such an aspheric surface that a positive refractive power becomes weaker at a marginal portion thereof than at a central portion thereof.

24. A zoom lens according to claim 1, wherein said zoom lens satisfies the following condition:

$$0 < (R21-R23)/(R21+R23) < 0.1$$

where $R21$ and $R23$ are radii of curvature of surfaces on an object side and the image side, respectively, of a cemented lens component disposed on the object side among said two cemented lens components included in said lens unit B.

25. A zoom lens according to claim 1, wherein said zoom lens satisfies the following conditions:

$$nd22 < 1.75$$

$$vd22 < 50.0$$

where $nd22$ and $vd22$ are a refractive index and Abbe number, respectively, of a lens element disposed on the most object side among lens elements of negative refractive power included in said lens unit B.

26. A zoom lens according to claim 1, wherein a lens element of positive refractive power is disposed on the most object side of said lens unit B, and said zoom lens satisfies the following conditions:

$$nd21 > 1.70$$

$$vd21 > 40.0$$

where $nd21$ and $vd21$ are a refractive index and Abbe number, respectively, of the lens element of positive refractive power.

27. A zoom lens according to claim 1, wherein said zoom lens satisfies the following condition:

$$0.05 < \Sigma A2/\Sigma D2 < 0.3$$

where $\Sigma D2$ is the sum of thicknesses on an optical axis of lens elements constituting said lens unit B, and $\Sigma A2$ is the sum of intervals between the respective lens elements constituting said lens unit B.

28. A camera comprising:
  a zoom lens according to claim 1; and
  a solid-state image sensor, said solid-state image sensor receiving an image formed by said zoom lens.

29. A zoom lens according to claim 1, wherein said zoom lens forms an image on a solid-state image sensor.

* * * * *